US010712490B2

(12) United States Patent
Woodgate et al.

(10) Patent No.: US 10,712,490 B2
(45) Date of Patent: Jul. 14, 2020

(54) BACKLIGHT HAVING A WAVEGUIDE WITH A PLURALITY OF EXTRACTION FACETS, ARRAY OF LIGHT SOURCES, A REAR REFLECTOR HAVING REFLECTIVE FACETS AND A TRANSMISSIVE SHEET DISPOSED BETWEEN THE WAVEGUIDE AND REFLECTOR

(71) Applicant: RealD Spark, LLC, Beverly Hills, CA (US)

(72) Inventors: Graham J. Woodgate, Henley on Thames (GB); Michael G. Robinson, Boulder, CO (US); Robert Ramsey, Boulder, CO (US); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/450,423

(22) Filed: Jun. 24, 2019

(65) Prior Publication Data
US 2019/0377129 A1 Dec. 12, 2019

Related U.S. Application Data

(62) Division of application No. 15/348,809, filed on Nov. 10, 2016, now Pat. No. 10,359,561.
(Continued)

(51) Int. Cl.
*F21V 8/00* (2006.01)
*G02F 1/295* (2006.01)
(Continued)

(52) U.S. Cl.
CPC ......... *G02B 6/0068* (2013.01); *G02B 6/0048* (2013.01); *G02B 30/26* (2020.01);
(Continued)

(58) Field of Classification Search
CPC .. G02B 6/0088; G02B 6/0068; G02B 6/0086; G02B 6/0073; G02B 6/0091;
(Continued)

(56) References Cited

U.S. PATENT DOCUMENTS 1,128,979 A 2/1915 Hess
1,970,311 A 8/1934 Ives
(Continued)

FOREIGN PATENT DOCUMENTS

CN 1142869 A 2/1997
CN 1377453 A 10/2002
(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
(Continued)

*Primary Examiner* — Robert J May
(74) *Attorney, Agent, or Firm* — Penny L. Lowry; Neil G. J. Mothew

(57) ABSTRACT

An imaging directional backlight apparatus includes a waveguide and light source array for providing large area directed illumination from localized light sources. The waveguide may include a stepped structure in which steps may include extraction features optically hidden to guided light, propagating in a forward direction. Returning light propagating in a backward direction may be refracted, diffracted, or reflected by the features to provide discrete illumination beams exiting from the top surface of the waveguide. Viewing windows are formed through imaging individual
(Continued)

light sources and defines the relative positions of system elements and ray paths. Alignment of the waveguide to mechanical and optical components may be provided by surface relief features of the waveguide arranged in regions adjacent the input surface and intermediate the light emitting regions of the light sources. Efficient, uniform operation may be achieved with low cross talk for application to autostereoscopic and privacy modes of operation.

11 Claims, 57 Drawing Sheets

Related U.S. Application Data

(60) Provisional application No. 62/255,270, filed on Nov. 13, 2015.

(51) Int. Cl.
*H04N 13/302* (2018.01)
*H04N 13/32* (2018.01)
*H04N 13/376* (2018.01)
*H04N 13/354* (2018.01)
*G02B 30/26* (2020.01)
*G02F 1/13* (2006.01)
*G02F 1/13357* (2006.01)
*G02F 1/133* (2006.01)
*H04N 13/30* (2018.01)

(52) U.S. Cl.
CPC ........... *G02F 1/295* (2013.01); *H04N 13/302* (2018.05); *H04N 13/32* (2018.05); *H04N 13/354* (2018.05); *H04N 13/376* (2018.05); *G02B 6/009* (2013.01); *G02F 1/1323* (2013.01); *G02F 1/133615* (2013.01); *G02F 2001/13312* (2013.01); *G02F 2201/503* (2013.01); *G02F 2203/12* (2013.01); *G02F 2203/62* (2013.01); *H04N 2013/40* (2018.05); *H04N 2013/403* (2018.05)

(58) Field of Classification Search
CPC .. G02B 6/0081; G02B 6/0065; G02B 6/0035; G02B 6/0036; G02B 6/004; G02B 6/0043; G02B 6/0055; G02B 6/0045; G02B 6/0038
See application file for complete search history.

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,688,035 A | 11/1997 | Kashima et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |

(56) References Cited

U.S. PATENT DOCUMENTS

| | | |
|---|---|---|
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |
| 8,752,995 B2 | 6/2014 | Park |
| 9,197,884 B2 | 11/2015 | Lee et al. |
| 9,256,019 B2 * | 2/2016 | Godbillon .............. G02B 6/001 |
| 9,350,980 B2 | 5/2016 | Robinson |
| 9,703,032 B2 * | 7/2017 | Wu ..................... G02B 6/0055 |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |

(56) References Cited

U.S. PATENT DOCUMENTS

| | | | |
|---|---|---|---|
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0294579 A1 | 11/2012 | Chen |
| 2012/0299913 A1 | 11/2012 | Robinson et al. |
| 2012/0314145 A1 | 12/2012 | Robinson |
| 2013/0101253 A1 | 4/2013 | Popovich et al. |
| 2013/0107340 A1 | 5/2013 | Wong et al. |
| 2013/0135588 A1 | 5/2013 | Popovich et al. |
| 2013/0137161 A1 | 5/2013 | Zhang et al. |
| 2013/0169701 A1 | 7/2013 | Whitehead et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0126238 A1 | 5/2014 | Kao et al. |
| 2014/0240828 A1 | 8/2014 | Robinson et al. |
| 2014/0340728 A1 | 11/2014 | Taheri |
| 2014/0368602 A1 | 12/2014 | Woodgate et al. |

FOREIGN PATENT DOCUMENTS

| | | | |
|---|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1823292 A | 8/2006 |
| CN | 1826553 A | 8/2006 |
| CN | 1866112 A | 11/2006 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| CN | 1910399 B | 5/2013 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 2003394 A2 | 12/2008 |
| EP | 1394593 B1 | 6/2010 |
| EP | 2451180 A2 | 5/2012 |
| EP | 1634119 B1 | 8/2012 |
| GB | 2405542 | 2/2005 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | 2000048618 A | 2/2000 |
| JP | 2000200049 A | 7/2000 |
| JP | 2001093321 A | 4/2001 |
| JP | 2001281456 | 10/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005116266 | 4/2005 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 | 11/2006 |
| JP | 3968742 | 8/2007 |
| JP | H3968742 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 20110216281 | 10/2011 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 A | 9/2005 |
| WO | 1994006249 B1 | 4/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2008045681 A1 | 4/2008 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |

OTHER PUBLICATIONS

AU-2011329639 Australia Patent Examination Report No. 1 dated Mar. 6, 2014.

(56) References Cited

OTHER PUBLICATIONS

AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 6, 2016.
EP-14754859.8 European Extended Search Report of European Patent Office dated Oct. 14, 2016.
EP-16150248.9 European Extended Search Report of European Patent Office dated Jun. 16, 2016.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
JP-2009538527 Reasons for rejection dated Jul. 17, 2012 with translation.
JP-200980150139.1 1st Office Action dated Feb. 11, 2014.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Robinson et al., U.S. Appl. No. 15/165,960 entitled "Wide Angle Imaging Directional Backlights" filed May 26, 2016.
Robinson et al., U.S. Appl. No. 15/290543 entitled "Wide angle imaging directional backlights" filed Oct. 11, 2016.
PCT/US2016/061428 International search report and written opinion of international searching authority dated Jan. 20, 2017.
JP-200980150139.1 2d Office Action dated Apr. 5, 2015.
JP-2013540083 Notice of reasons for rejection dated Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
KR-20117010839 1st Office action (translated) dated Aug. 28, 2015.
KR-20117010839 2d Office action (translated) dated Apr. 28, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Marjanovic, M.,"Interlace, Interleave, and Field Dominance," http://www.mir.com/DMG/interl.html, pp. 1-5 (2001).
PCT/DE98/02576 International search report and written opinion of international searching authority dated Mar. 4, 1999.
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.

(56) References Cited

OTHER PUBLICATIONS

PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.
PCT/US2016/034418 International search report and written opinion of the international searching authority dated Sep. 7, 2016.
Robinson et al., U.S. Appl. No. 14/751,878 entitled "Directional privacy display" filed Jun. 26, 2015.
Robinson et al., U.S. Appl. No. 15/097,750 entitled "Wide angle imaging directional backlights" filed Apr. 13, 2016.
Robinson et al., U.S. Appl. No. 15/098,084 entitled "Wide angle imaging directional backlights" filed Apr. 13, 2016.
Robinson, U.S. Appl. No. 13/300,293 entitled "Directional flat illuminators" filed Nov. 18, 2011.
EP-16865045.5 European Extended Search Report of the European Patent Office dated Jun. 18, 2019.
EP-16865045.5 European office action of the European Patent Office dated Jan. 20, 2020.

\* cited by examiner

BACKLIGHT HAVING A WAVEGUIDE WITH A PLURALITY OF EXTRACTION FACETS, ARRAY OF LIGHT SOURCES, A REAR REFLECTOR HAVING REFLECTIVE FACETS AND A TRANSMISSIVE SHEET DISPOSED BETWEEN THE WAVEGUIDE AND REFLECTOR

CROSS-REFERENCE TO RELATED APPLICATIONS

This application claims priority to U.S. Provisional Patent Appl. No. 62/255,270 entitled "Wide angle imaging directional backlights" filed Nov. 13, 2015, which is herein incorporated by reference in its entirety.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Patent Publ. No. 2012/0127573, which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. No light is directed to the respective viewing window from within the outer portion and the display will appear dark in this region. It may be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure there is provided a directional backlight comprising: a waveguide comprising first and second, opposed guide surfaces for guiding light along the waveguide and an input surface extending between the first and second guide surfaces; and an array of light sources arranged at different input positions along the input surface of the waveguide and arranged to input input light into the waveguide, the light sources having light emitting regions that are spaced apart, the waveguide further comprising a reflective end for reflecting input light from the light sources back along the waveguide, the second guide surface being arranged to deflect the reflected input light through the first guide surface as output light, and the directional backlight being arranged to direct the output light into optical windows in output directions that are distributed laterally in dependence on the input positions along the input surface of the light sources that inputted the input light, wherein the waveguide further comprises at least one surface relief feature formed either on at least one of the first and second guide surfaces in a location adjacent the input surface and intermediate the light emitting regions of the light sources, or on the input surface intermediate the light emitting regions of the light sources.

Said location of the surface relief feature may be within a region bounded by: a portion of the input surface intermediate the light emitting regions of a pair of adjacent light sources, and a pair of intersecting notional lines that extend from the respective edges of the light emitting regions of the pair of light sources that are adjacent the portion of the input surface, to the respective sides of the reflective end that extend between the first and second guide surfaces. The surface relief feature may be a mechanical fixing feature. The mechanical fixing feature may be fixed to a further component of the directional backlight.

Advantageously, mechanical registration of the waveguide to other optical and mechanical components of the system may be provided. Mechanical registration may be achieved conveniently in the region of increased thermal expansion.

A directional backlight may further comprise a rear reflector comprising a linear array of reflective facets arranged to reflect light from the light sources, that is transmitted through the plurality of facets second guide surface of the waveguide, back through the waveguide to exit through the first guide surface into said optical windows, the rear reflector being said further component to which the mechanical fixing feature is fixed.

Advantageously optical artefacts arising from movement of waveguide to the rear reflector may be reduced. Further, the rear reflector may be conveniently aligned with other components of the mechanical and optical system.

The surface relief feature may be a protrusion. Advantageously low visibility of input light coupling region and reduced cross talk for autostereoscopic and privacy modes of operation may be achieved.

The surface relief feature may be a recess. Advantageously increased mechanical strength of the mechanical alignment may be achieved.

The surface relief feature may be arranged to remove from the waveguide at least some of the reflected light that is incident thereon after reflection by the reflective end. Advantageously cross talk due to back reflections from the input surface may be further reduced.

The surface relief feature may be an identification mark. Advantageously traceability of components may be achieved without degradation to the optical path.

The input surface may be an end of the waveguide that is opposite to the reflective end. The input surface may be a side surface of the waveguide extending away from the reflective end. The first guide surface may be arranged to guide light by total internal reflection and the second guide surface may comprise a plurality of light extraction features oriented to direct light guided along the waveguide in directions allowing exit through the first guide surface as the output light and intermediate regions between the light extraction features that are arranged to guide light along the waveguide. The second guide surface may have a stepped shape in which said light extraction features are facets between the intermediate regions. The light extraction features may have positive optical power in a direction between the side surfaces of the waveguide that extend between the first and second guide surfaces. The reflective end may have positive optical power in a direction extending between the sides of the reflective end that extend between the first and second guide surfaces.

According to a second aspect of the present disclosure, a directional display device may comprise: a directional backlight according to the first aspect; and a transmissive spatial light modulator arranged to receive the output light from the waveguide and to modulate it to display an image.

According to a third aspect of the present disclosure, a directional display apparatus may comprise: a directional display device according to the second aspect; and a control system arranged to control the light sources.

Advantageously a directional display may be provided to achieve switchable directional operation including autostereoscopic, privacy, wide angle, high luminance, night-time and power savings functions.

According to a fourth aspect of the present disclosure a directional backlight may comprise: a waveguide comprising first and second, opposed guide surfaces for guiding light along the waveguide and an input surface extending between the first and second guide surfaces; an array of light sources arranged at different input positions along the input surface of the waveguide and arranged to input input light into the waveguide, the light sources having light emitting regions that are spaced apart, the waveguide further comprising a reflective end for reflecting input light from the light sources back along the waveguide, the second guide surface being arranged to deflect the reflected input light through the first guide surface as output light, and the waveguide being arranged to image the light sources so that the output light from the light sources is directed into respective optical windows in output directions that are distributed laterally in dependence on the input positions of the light sources; and at least one strip adhered to at least one of the first guide surface and the second guide surface of the waveguide and extending therealong adjacent to the input surface, the strip being arranged to reduce reflection of light incident thereon from inside the waveguide.

The light sources may have light emitting regions that are spaced apart, and the strip may extend along at least one of the first guide surface and the second guide surface across both locations adjacent to the light emitting regions of the light sources and locations intermediate the light emitting regions of the light sources. The strip may extend along only a part of at least one of the first guide surface and the second guide surface. Said part of at least one of the first guide surface and the second guide surface along which the strip extends may be offset from the center of the input surface. The strip may be an adhesive tape. The strip may be an adhesive material. The strip may have a refractive index that differs from the refractive index of the waveguide by no more than 0.02.

Advantageously in a privacy mode of operation such a display can provide reduced luminance for off axis viewing positions. Further the degree of luminance reduction can be controlled by means of control of width of the strip. Further light loss for input light can be reduced by control of size and location of the at least one strip.

The strip may have a refractive index that differs from the refractive index of the waveguide by no less than 0.08. Advantageously input light streaks may be reduced in intensity for small loss of head on luminance. Said part of at least one of the first guide surface and the second guide surface along which the strip extends may be across the center of the input surface. Advantageously the light streak visibility for off axis viewing positions in Privacy mode of operation may be reduced.

A directional backlight may further comprise a support which supports the array of light sources and may have a portion extending past the input surface of the waveguide across the first guide surface or the second guide surface of the waveguide, and wherein the at least one strip may comprise at least one strip adhered to the support and to one of the first guide surface and the second guide surface of the waveguide for holding the waveguide in position relative to the light sources supported on the support. The strip may be adhered to the support and to one of the first guide surface and the second guide surface of the waveguide. The strip may be adhered to the support and to the first or second guide surface of the waveguide.

Advantageously the waveguide may be provided in a substantially fixed alignment with an array of light sources. Further the alignment means may have further function of reducing light for privacy viewing positions and/or light streaks.

A directional backlight may further comprise at least one further strip provided on the other of the first guide surface and the second guide surface of the waveguide and extending therealong adjacent the input surface, the further strip may also be arranged to absorb light incident thereon from inside the waveguide. Advantageously the level of privacy and streak luminance may be further increased for waveguide regions outside of the active area, achieving reduced bezel width.

The at least one strip may comprise at least one strip adhered to the first guide surface of the waveguide and at least one strip adhered to the second guide surface of the waveguide. The strip may be absorptive of light, whereby the strip reduces reflection of light incident thereon from inside the waveguide by absorbing that light. The strip may be absorptive of light throughout the wavelength range of the light from the array of light sources. Advantageously scatter within the strip may be reduced.

The strip may be transmissive of light, whereby the strip reduces reflection of light incident thereon from inside the waveguide by coupling that light out of the waveguide. The support may be a flexible printed circuit. Advantageously conventional adhesive tape materials may be used, reducing cost and complexity.

A directional backlight may further comprise a rigid holder portion to which the support may be attached. The support may be a rigid holder portion. A directional backlight may further comprise a resilient member provided behind the light sources and resiliently biasing the light sources towards the waveguide.

Advantageously longitudinal alignment of the array of light sources and waveguide may be achieved in cooperation with improvement of privacy and light streak luminance.

According to a fifth aspect of the present disclosure a directional backlight may comprise: a waveguide comprising first and second, opposed guide surfaces for guiding light along the waveguide and an input end comprising an input surface extending between the first and second guide surfaces; an array of light sources arranged at different input positions along the input end of the waveguide and arranged to input input light into the waveguide, the light sources having light emitting regions that are spaced apart, the waveguide further comprising a reflective end for reflecting input light from the light sources back along the waveguide, the second guide surface being arranged to deflect the reflected input light through the first guide surface as output light, and the waveguide being arranged to image the light sources so that the output light from the light sources is directed into respective optical windows in output directions that are distributed laterally in dependence on the input positions of the light sources; a holder portion extending across the light sources and the waveguide, the holder portion holding the light sources and the waveguide in position relative to each other; and a resilient member provided behind the light sources and resiliently biasing the light sources towards the input end of the waveguide.

Advantageously longitudinal alignment of the array of light sources and waveguide may be achieved in arrangements where it may be undesirable to provide an adhesive strip between the waveguide and a support.

The directional backlight may further comprise a stop extending from the holder portion behind the resilient member, the resilient member engaging the stop. The stop may be an integral part of the holder portion. The directional backlight may further comprise a support which supports the array of light sources, the support being attached to the holder portion. The support may be a printed circuit. The printed circuit may be a flexible printed circuit.

Advantageously, the alignment and force on the light sources may be provided by cooperation of the stop and the resilient member, to reduce damage during dropping of the directional display and other high impact events.

The support may have a portion extending past the input end of the waveguide across the second guide surface of the waveguide, and the directional backlight may further comprise a light-absorptive adhesive strip adhered to the support and to the second guide surface of the waveguide for holding the waveguide in position relative to the light sources supported on the support, the light-absorptive adhesive strip extending along the second guide surface waveguide adjacent to the input end. Advantageously longitudinal alignment of the array of light sources and waveguide may be achieved in cooperation with improvement of privacy and light streak luminance.

According to a sixth aspect of the present disclosure a directional backlight may comprise a waveguide comprising first and second, opposed guide surfaces for guiding light along the waveguide, an input surface extending between the first and second guide surfaces for receiving input light, and a reflective end for reflecting input light from the light sources back along the waveguide; an array of light sources arranged at different input positions along the input surface of the waveguide and arranged to input the input light into the waveguide, wherein the first guide surface is arranged to guide light by total internal reflection and the second guide surface has a stepped shape comprising a plurality of extraction facets oriented to reflect input light from the light sources, after reflection from the reflective end, through the first guide surface as output light, and intermediate regions between the facets that are arranged to guide light along the waveguide, the waveguide being arranged to image the light sources so that the output light is directed into respective optical windows in output directions that are distributed laterally in dependence on the input positions of the light sources; a rear reflector comprising a linear array of reflective facets arranged to reflect light from the light sources, that is transmitted through the plurality of facets of the waveguide, back through the waveguide to exit through the first guide surface; and a transmissive sheet arranged between the rear reflector and the second guide surface of the waveguide.

The transmissive sheet may comprise plural layers. The plural layers may include a rear protective layer adjacent the rear reflector, the rear protective layer being made of a material that provides less damage to the rear reflector than the material of any other layer of the plural layers. The plural layers may include a front protective layer adjacent the waveguide, the front protective layer being made of a material that provides less damage to the waveguide than the material of any other layer of the plural layers. The plural layers include a reinforcing layer made of a material having a higher stiffness than the material than any other layer of the plural layers.

Advantageously damage of the rear reflector and waveguide second guiding surface may be reduced. Further contrast of Moiré between the facets of the rear reflector and waveguide respectively may be reduced.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
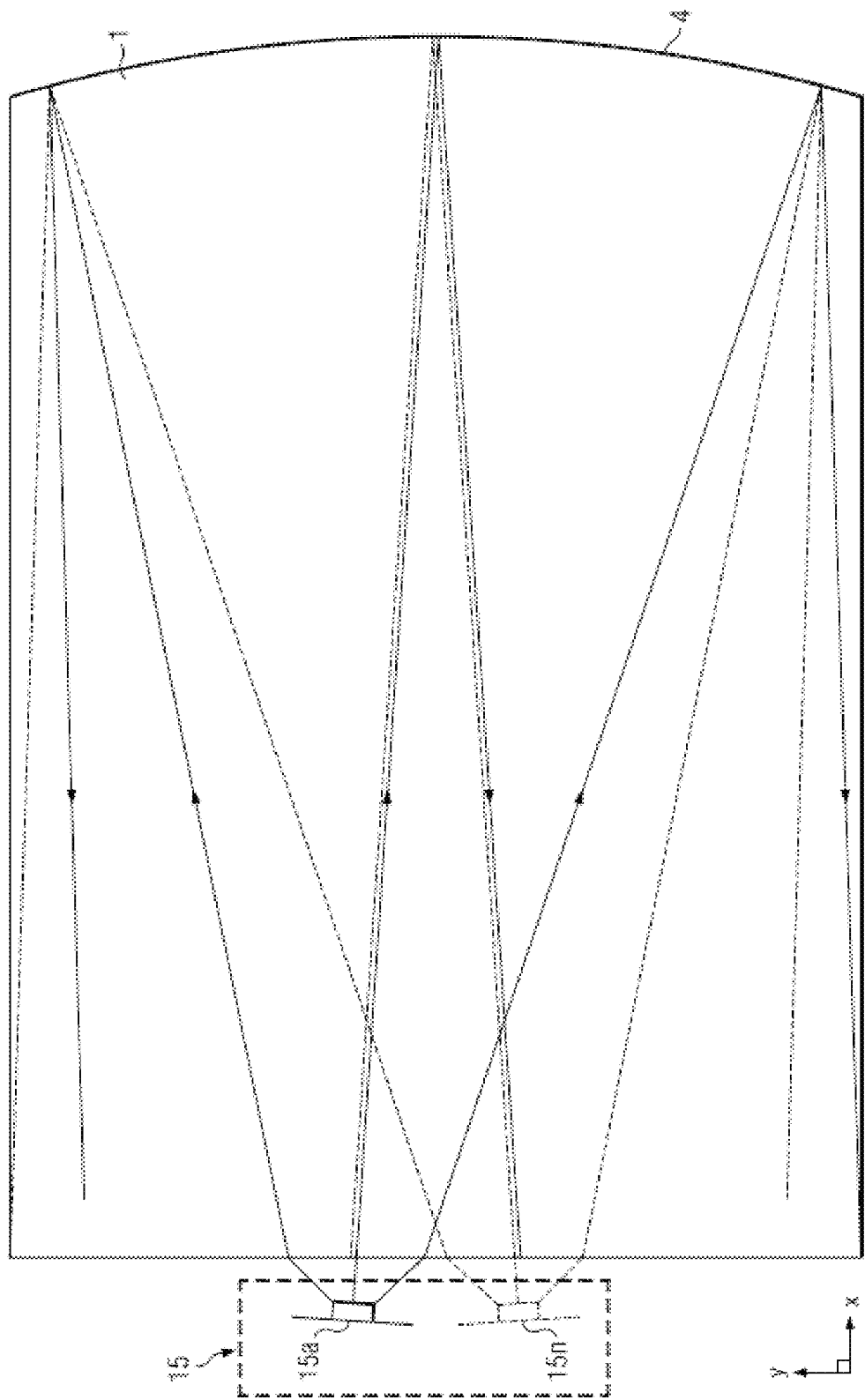
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. Patent Publ. No. 2012/0127573 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December, 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. Patent Publ. No. 2012/0127573, which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input surface to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight" by RealD, for example U.S. Patent Publ. No. 2012/0127573 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
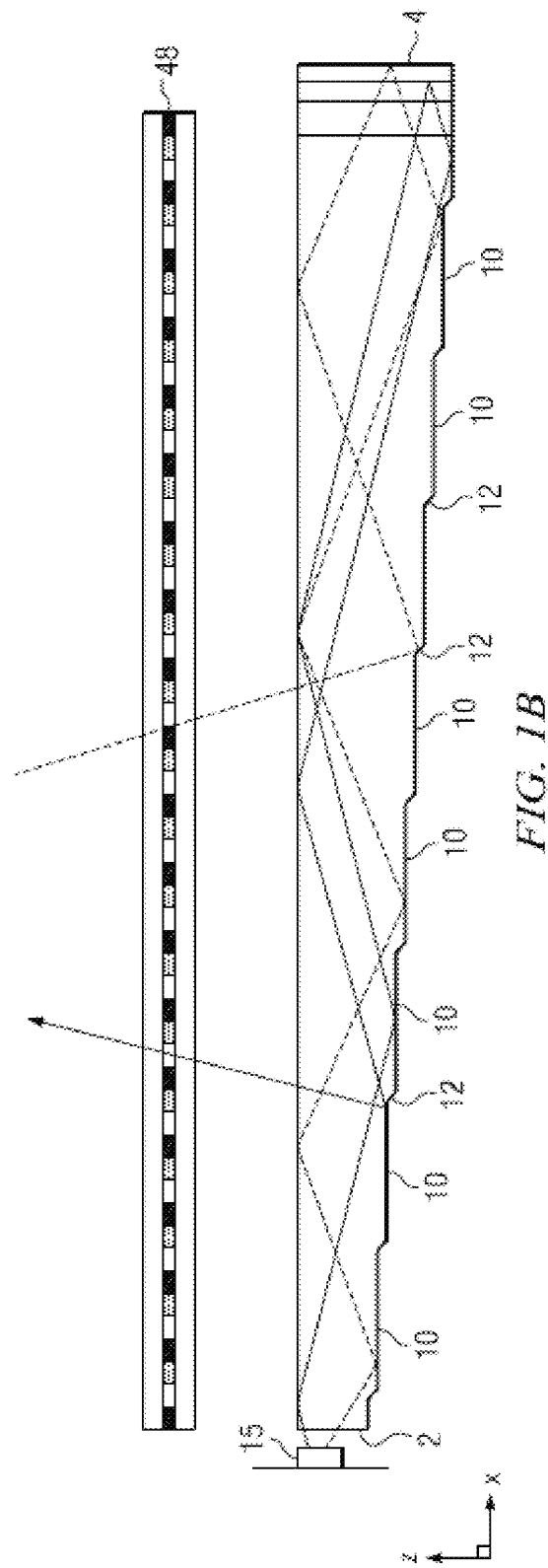
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
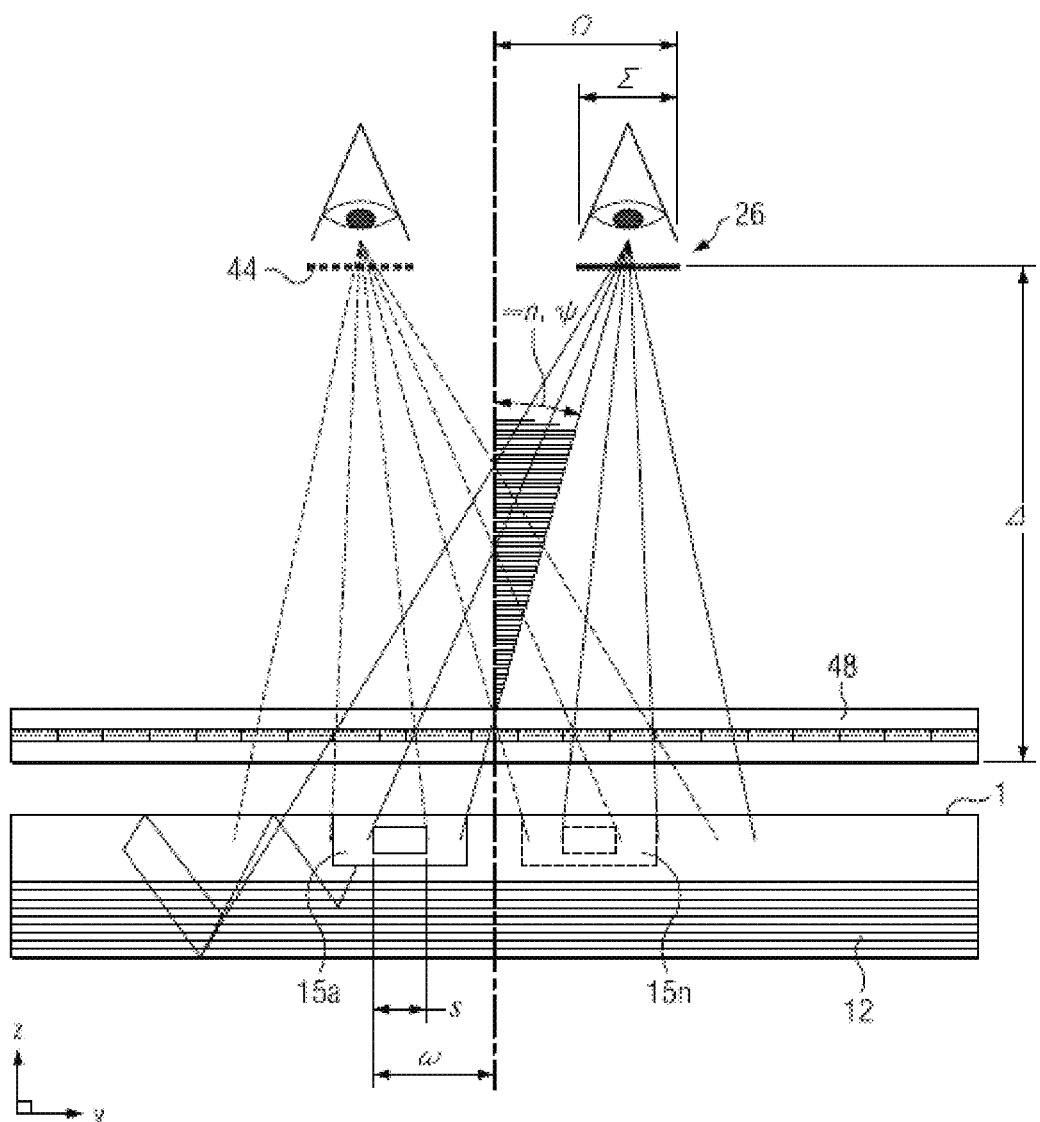
FIG. 2A is a schematic diagram illustrating in a top view of light propagation in another embodiment of a directional display device, in accordance with the present disclosure.
Figure 2B:
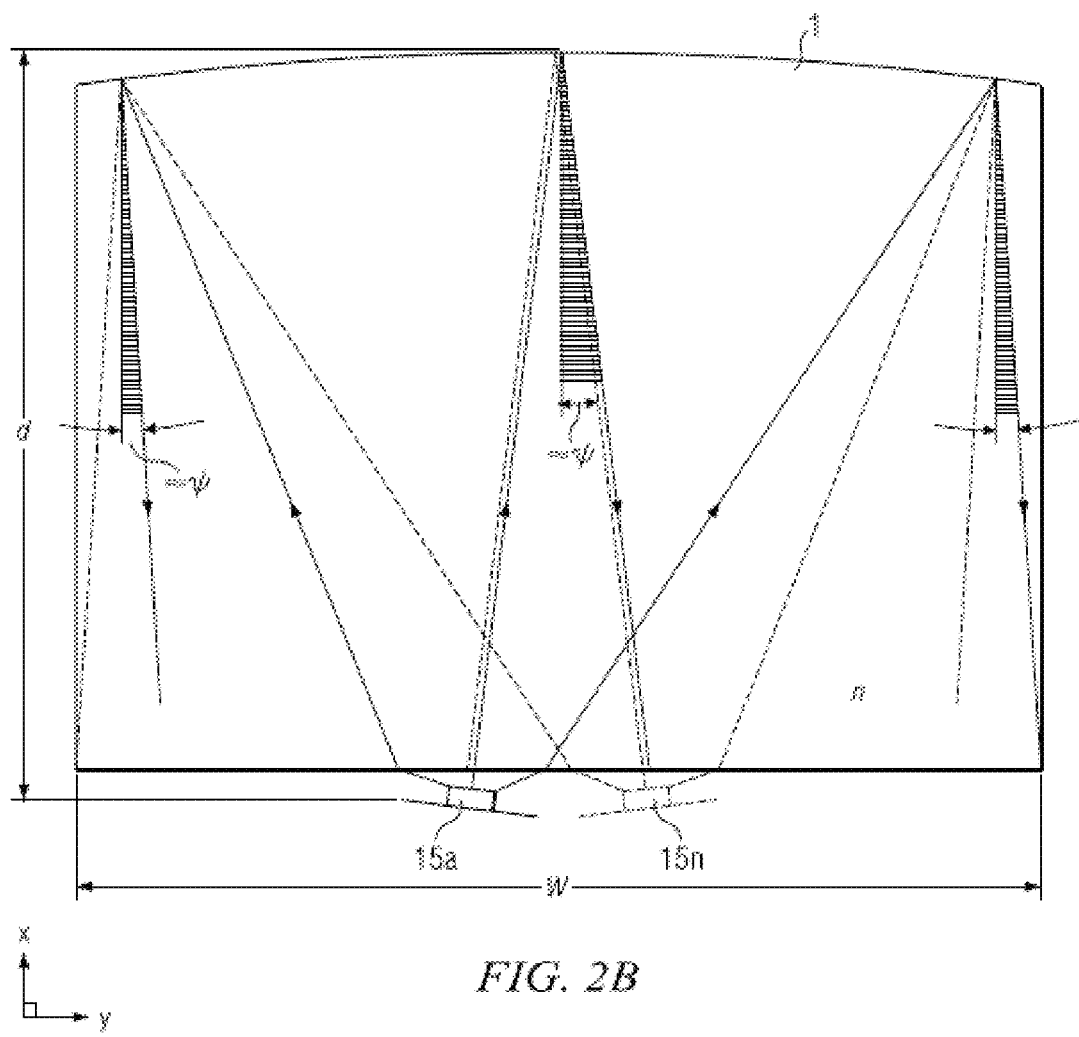
FIG. 2B is a schematic diagram illustrating light propagation in a front view of the directional display device of FIG. 2A, in accordance with the present disclosure.
Figure 2C:
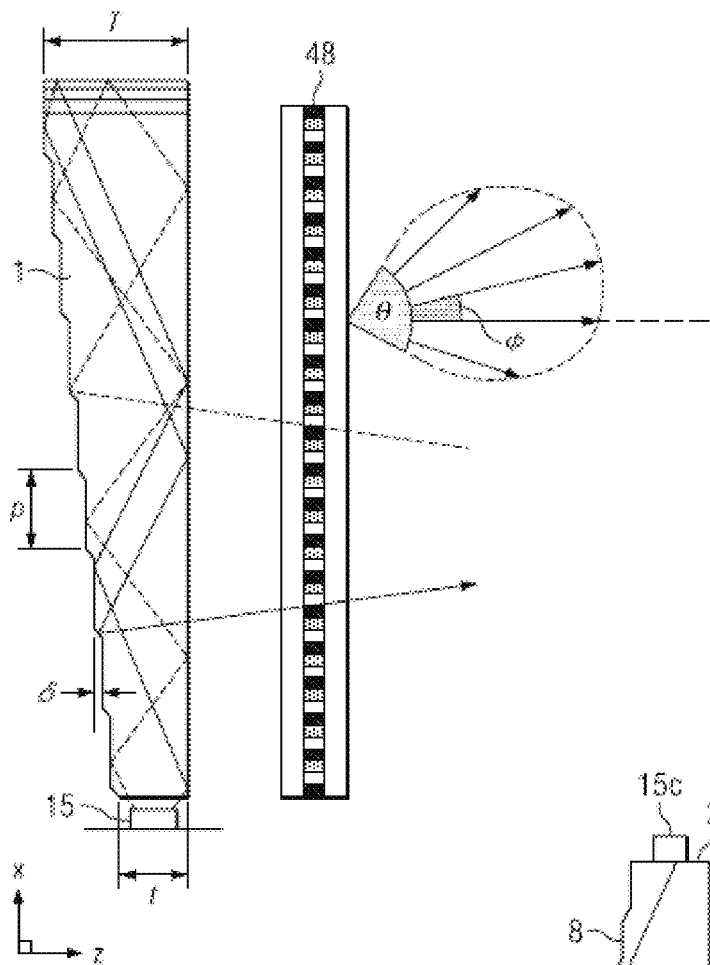
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide 14. In other words, the reflective end may have positive optical power in a direction extending between sides of the waveguide that extend between the first and second guide surfaces and between the input end and the reflective end. The light extraction features 12 may have positive optical power in a direction between sides of the waveguide that extend between the first and second guide surfaces 6,8 and between the input end 2 and the reflective end.

The waveguide 1 may further comprising a reflective end 4 for reflecting input light from the light sources back along the waveguide 1, the second guide surface 8 being arranged to deflect the reflected input light through the first guide surface 6 as output light, and the waveguide 1 being arranged to image the light sources 15*a-n* so that the output light from the light sources is directed into respective optical windows 26*a-n* in output directions that are distributed laterally in dependence on the input positions of the light sources.

In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
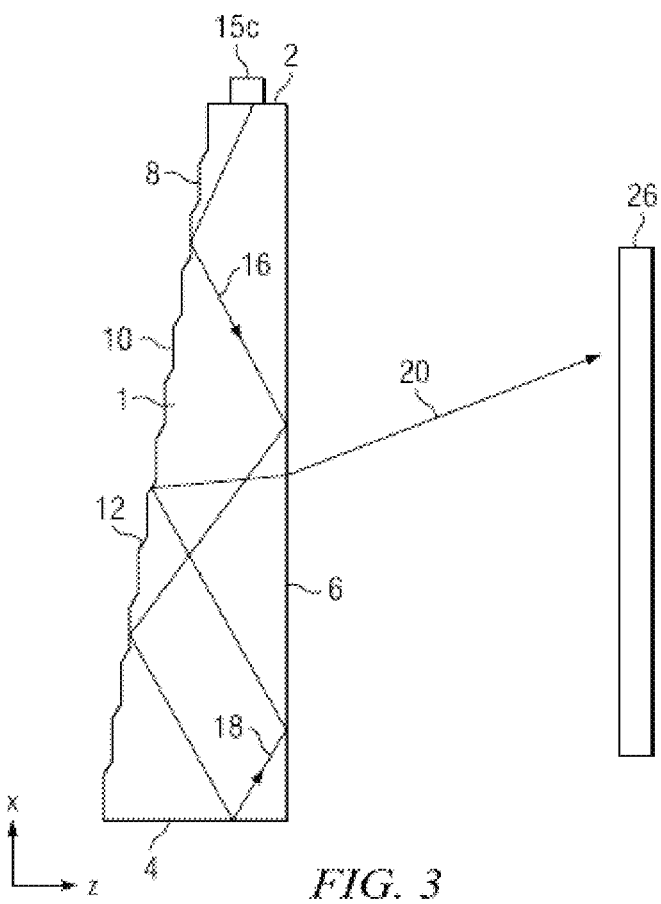
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15*c* of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
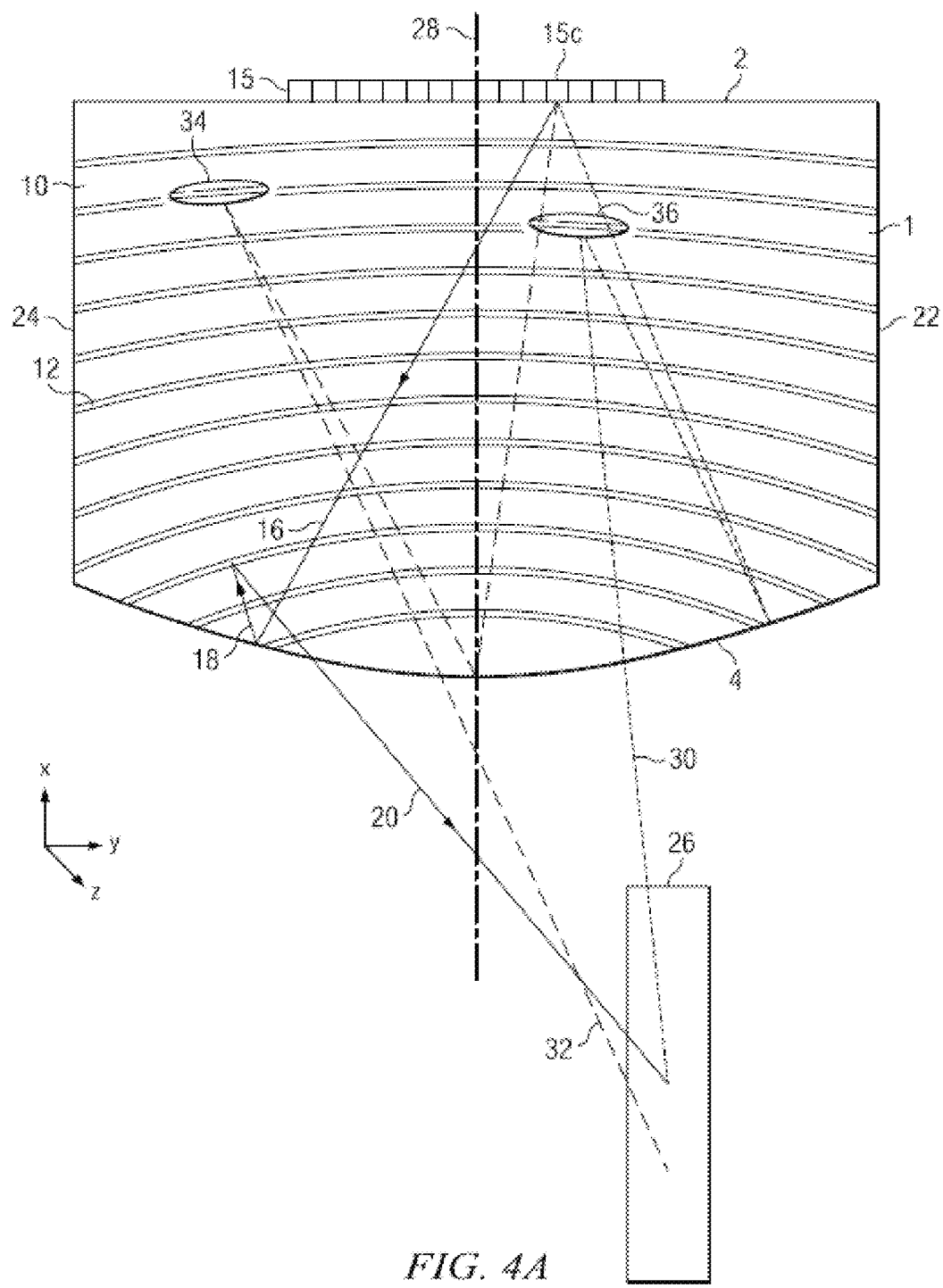
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15*c* of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
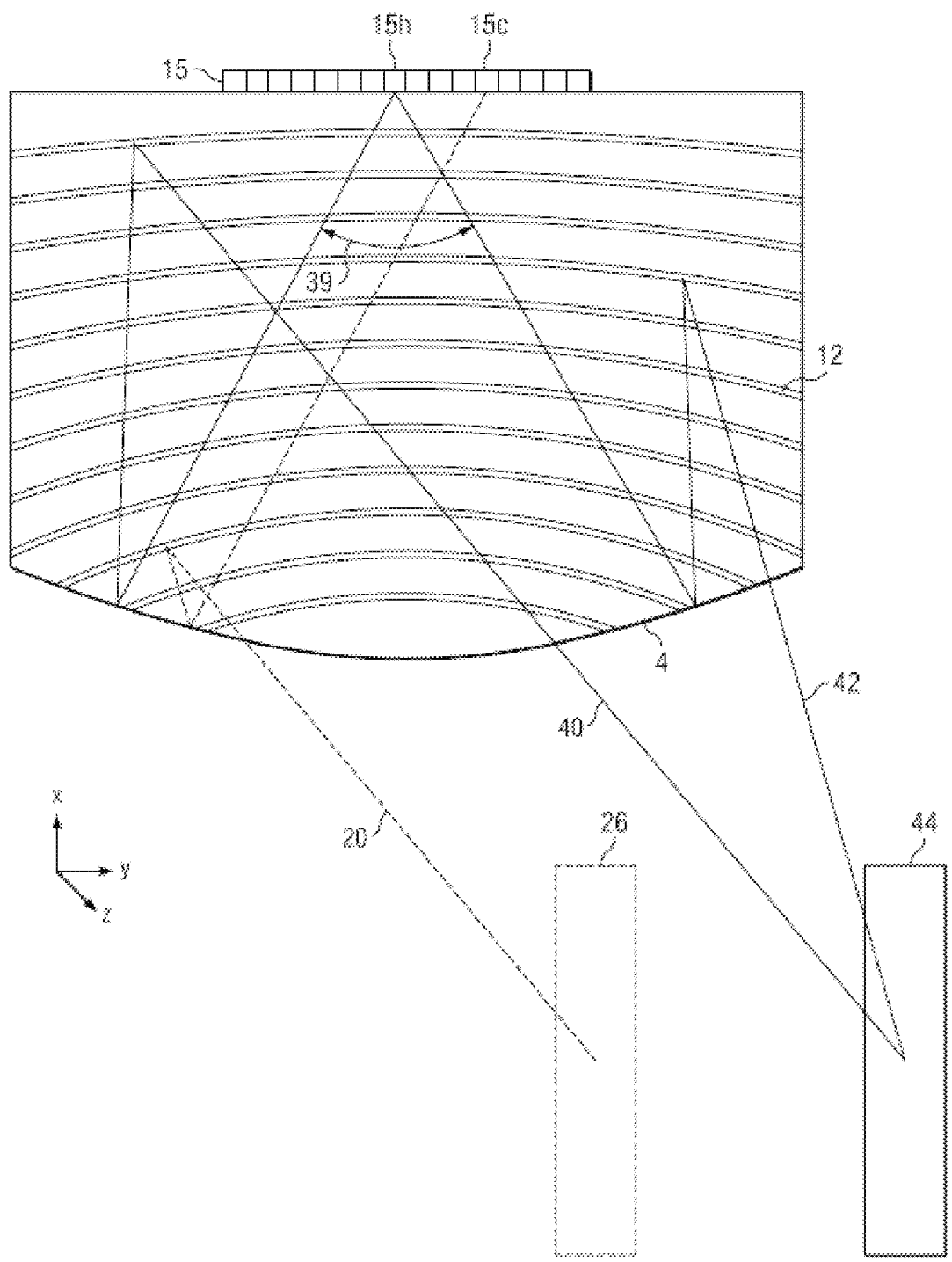
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15*h* of the illuminator array 15. The curvature of the reflective end on the side 4 and the light extraction features 12 cooperatively produce a second viewing window 44 laterally separated from the viewing window 26 with light rays from the illuminator element 15*h*.

Advantageously, the arrangement illustrated in FIG. 4B may provide a real image of the illuminator element 15*c* at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15*c* to lateral positions in viewing window 26. Improved aberrations may achieve an extended viewing freedom for an autostereoscopic display while achieving low cross talk levels.

Figure 5:
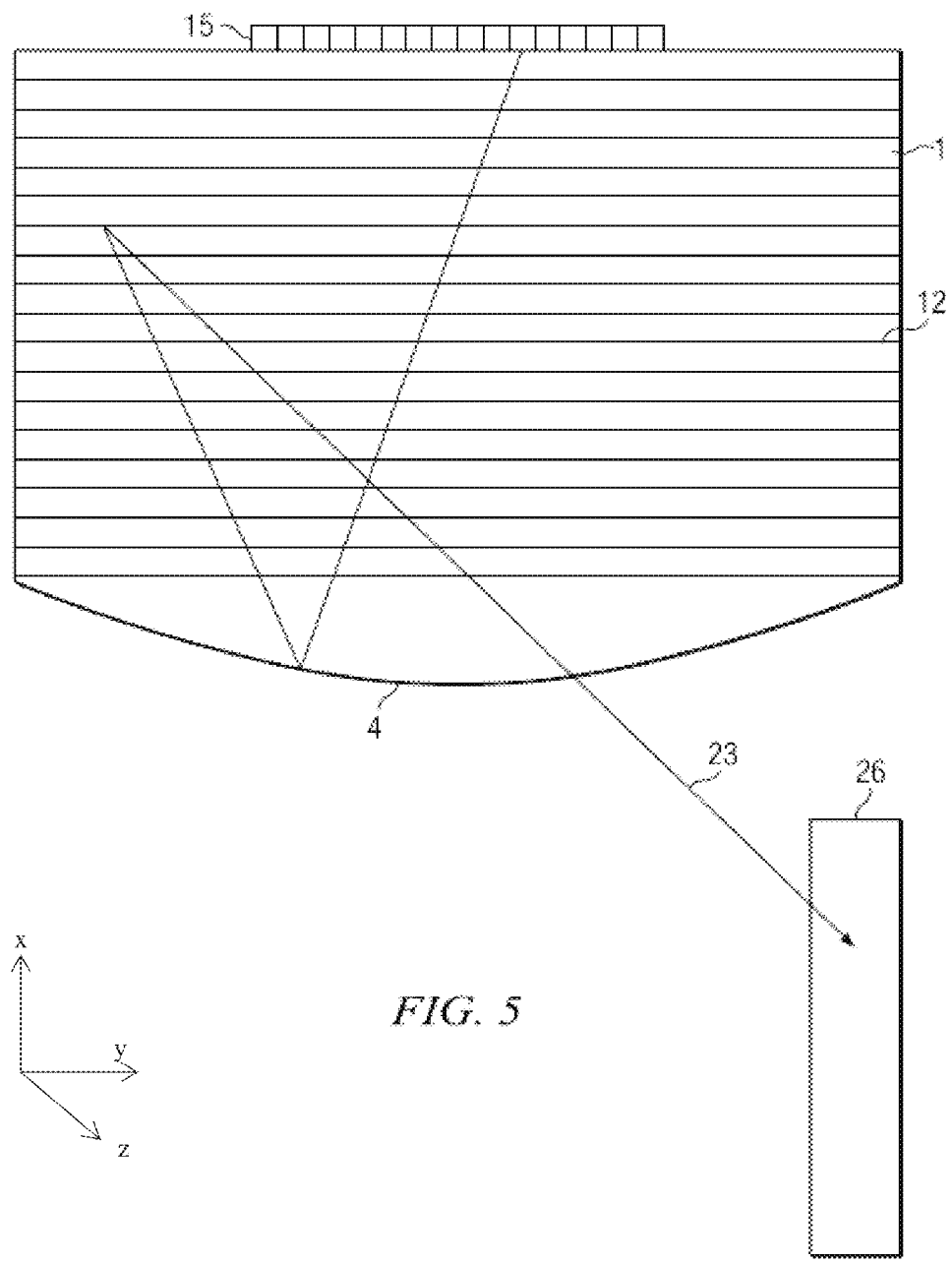
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
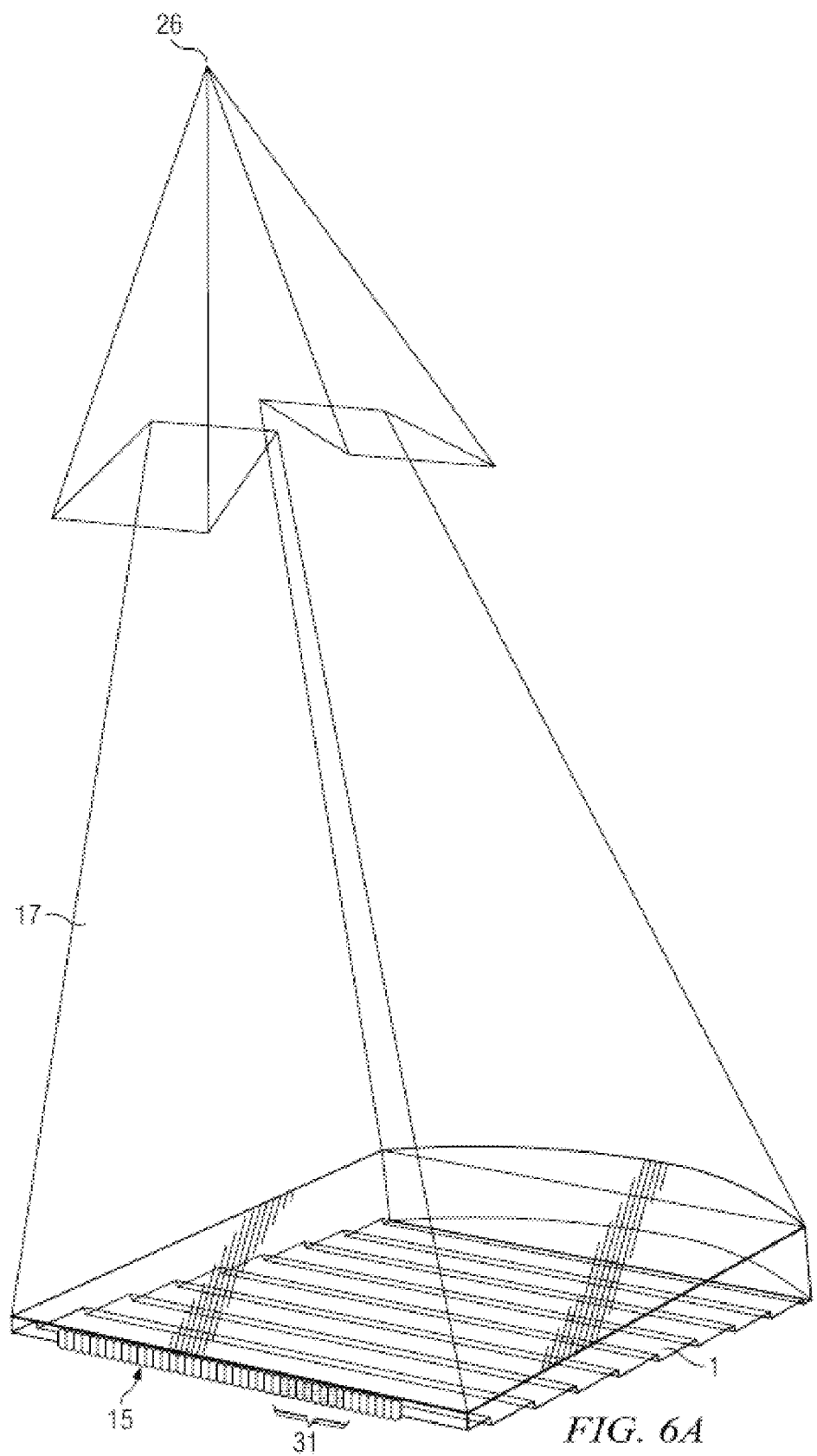
FIG. 6A is a schematic diagram illustrating one embodiment of the generation of a first viewing window in a time multiplexed directional display device in a first time slot, in accordance with the present disclosure.
Figure 6B:
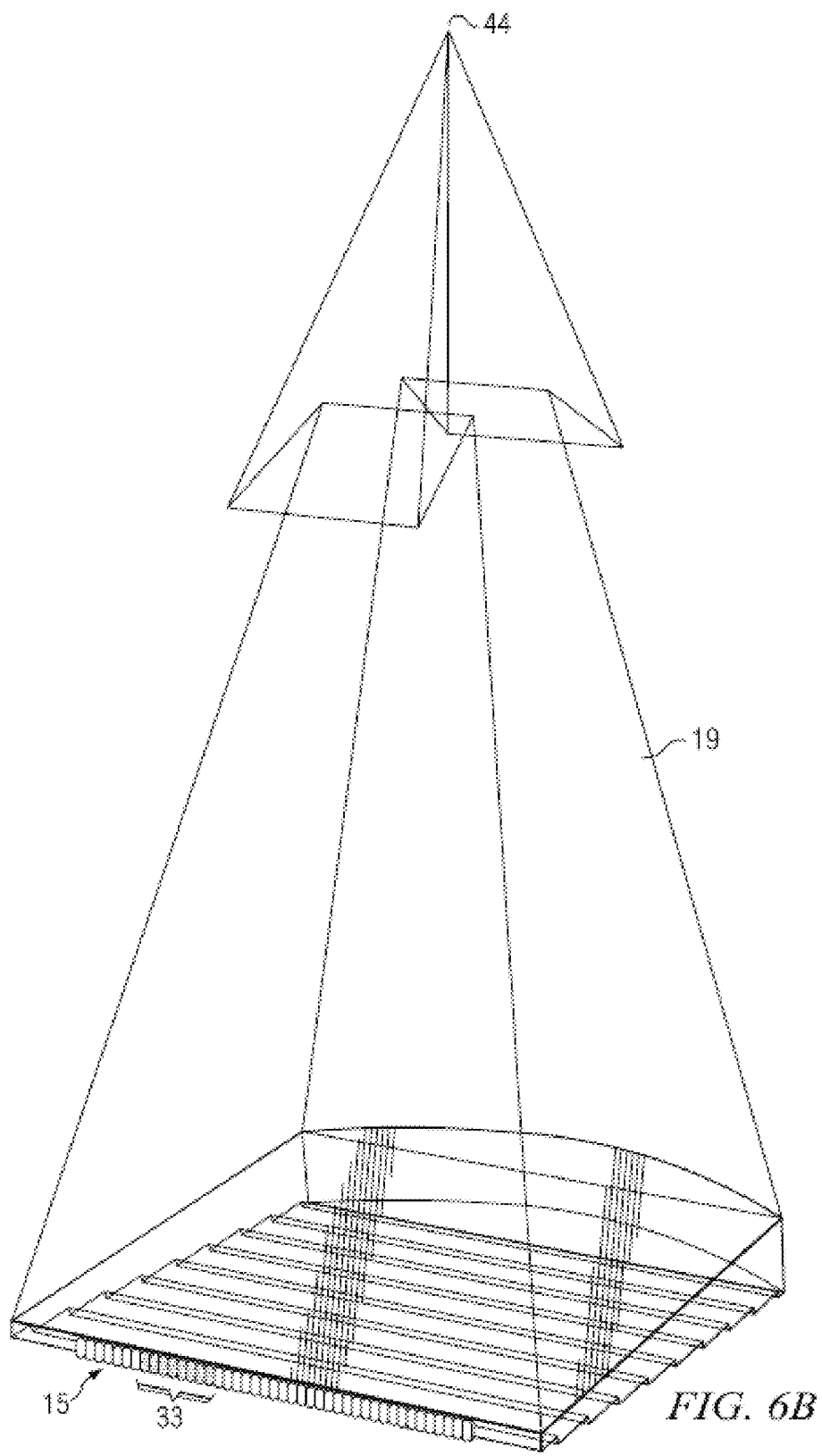
FIG. 6B is a schematic diagram illustrating another embodiment of the generation of a second viewing window in a time multiplexed directional display device in a second time slot, in accordance with the present disclosure.
Figure 6C:
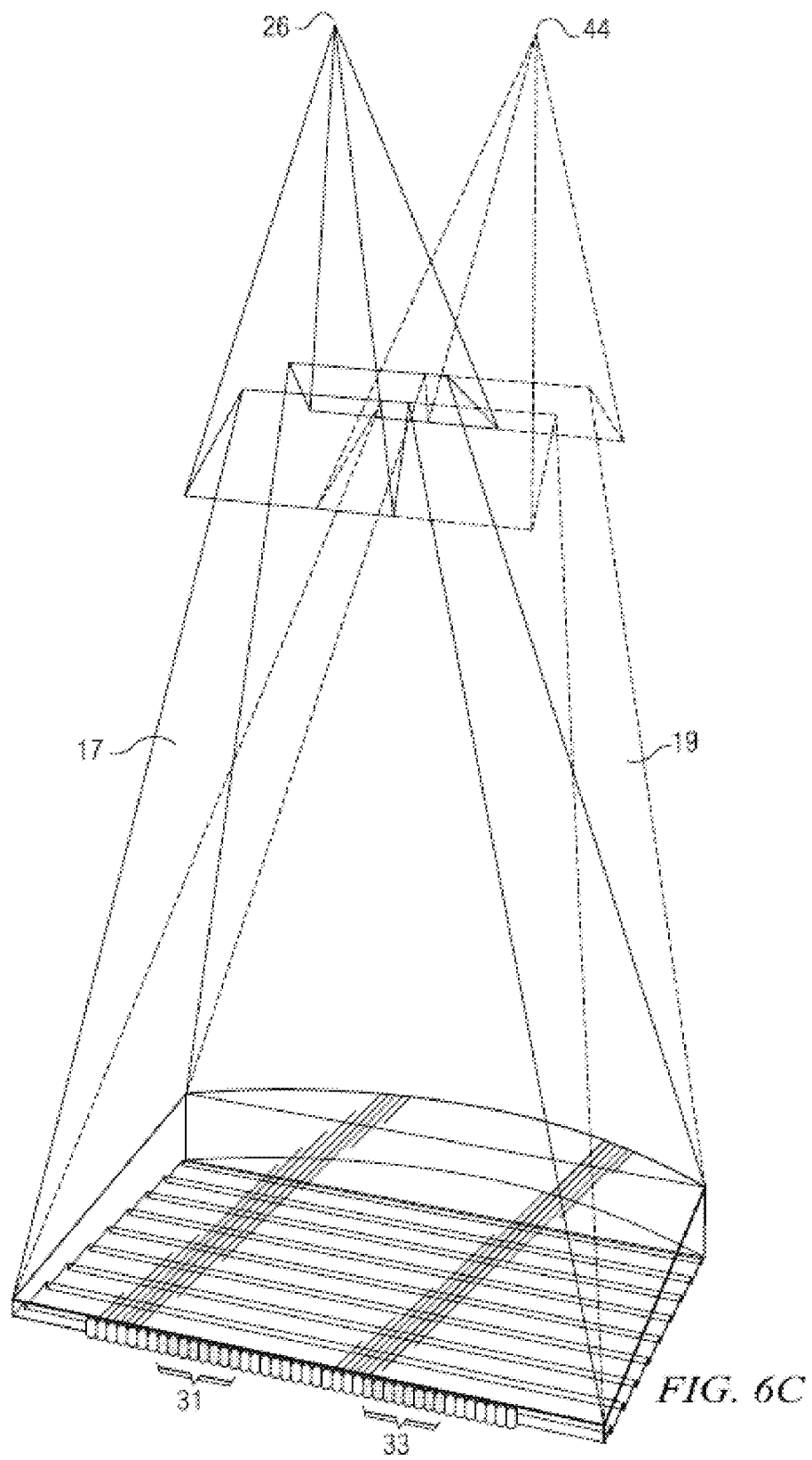
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
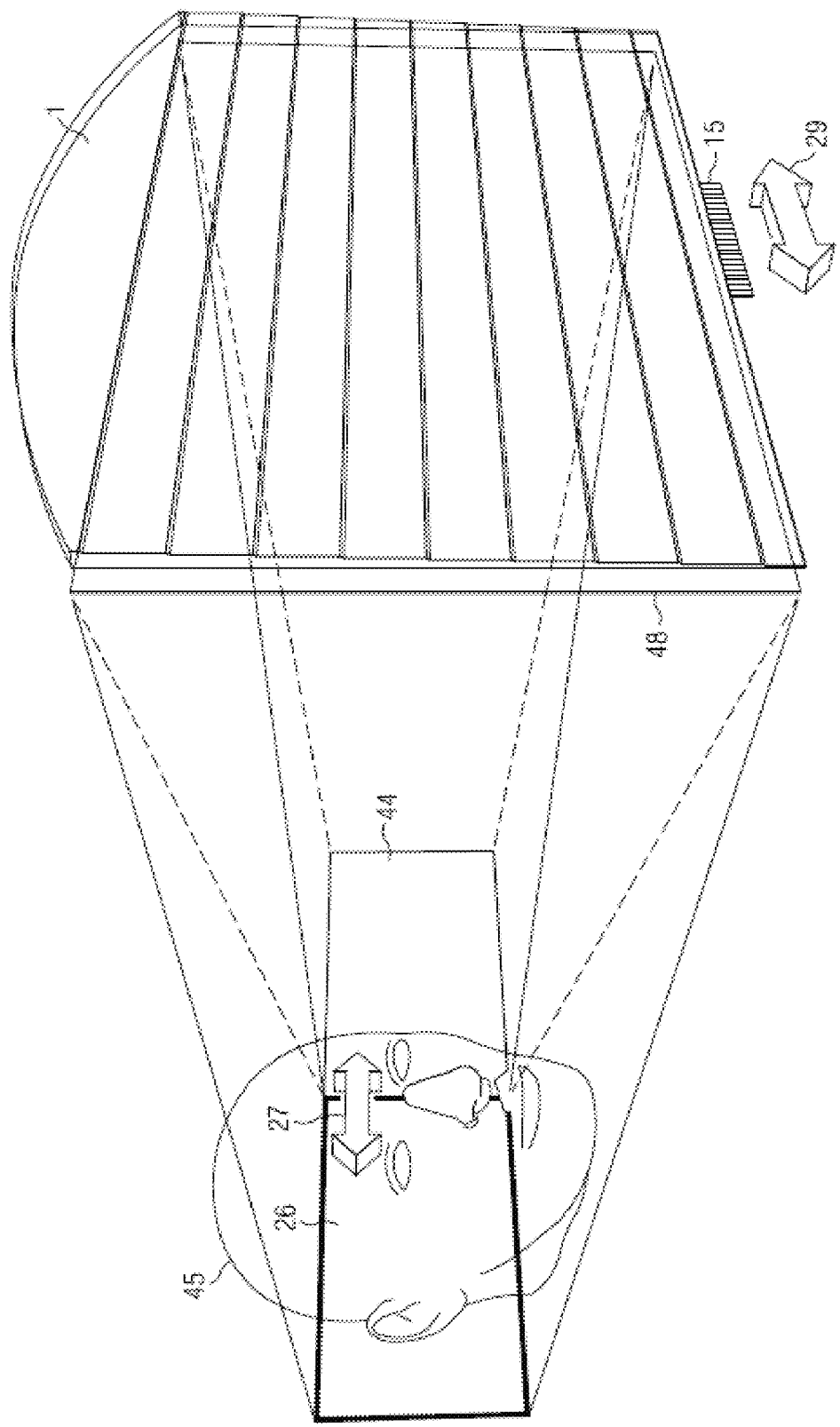
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
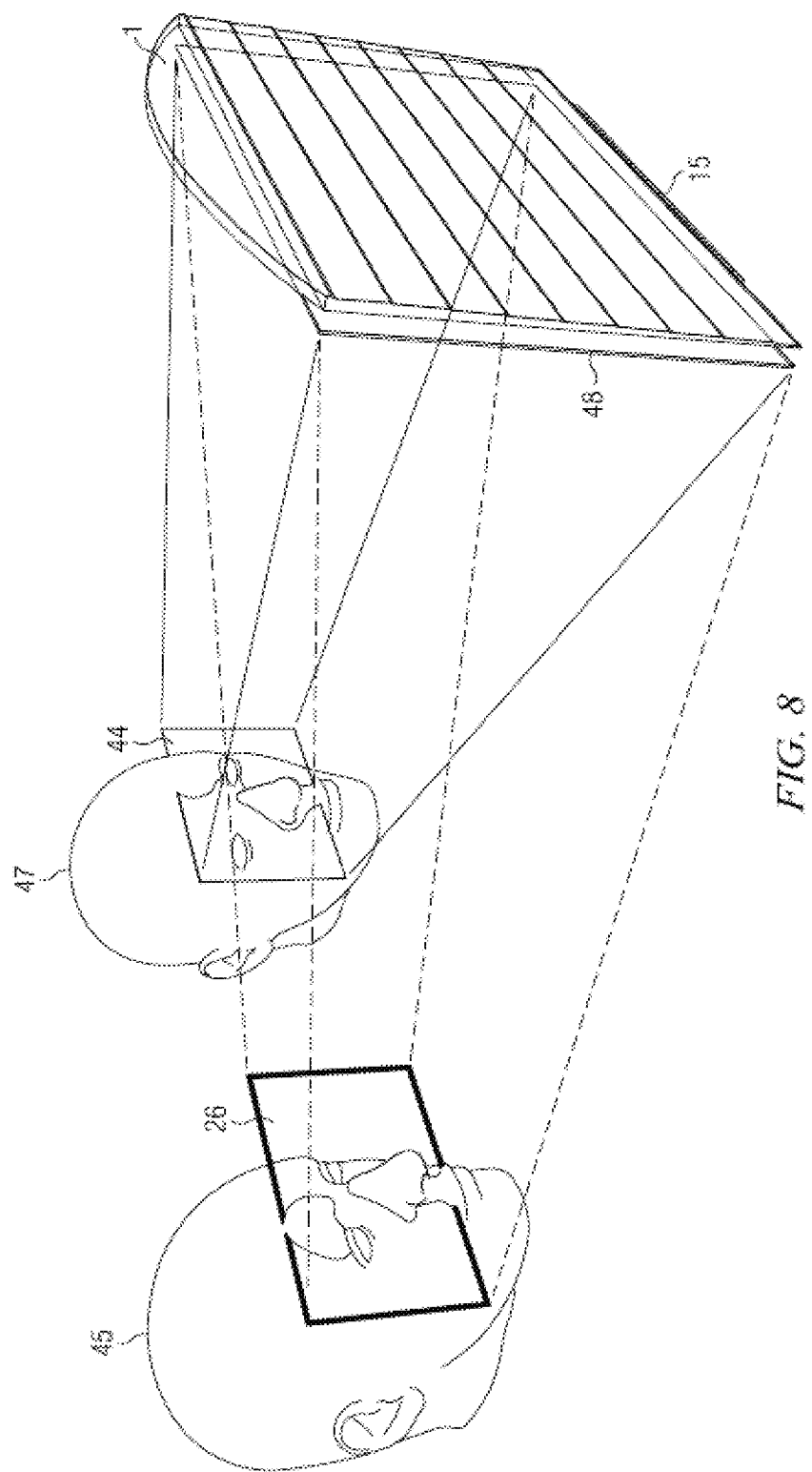
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
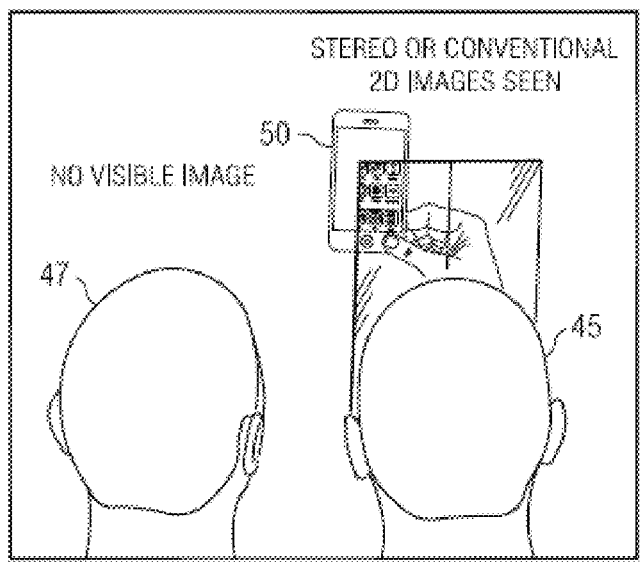
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
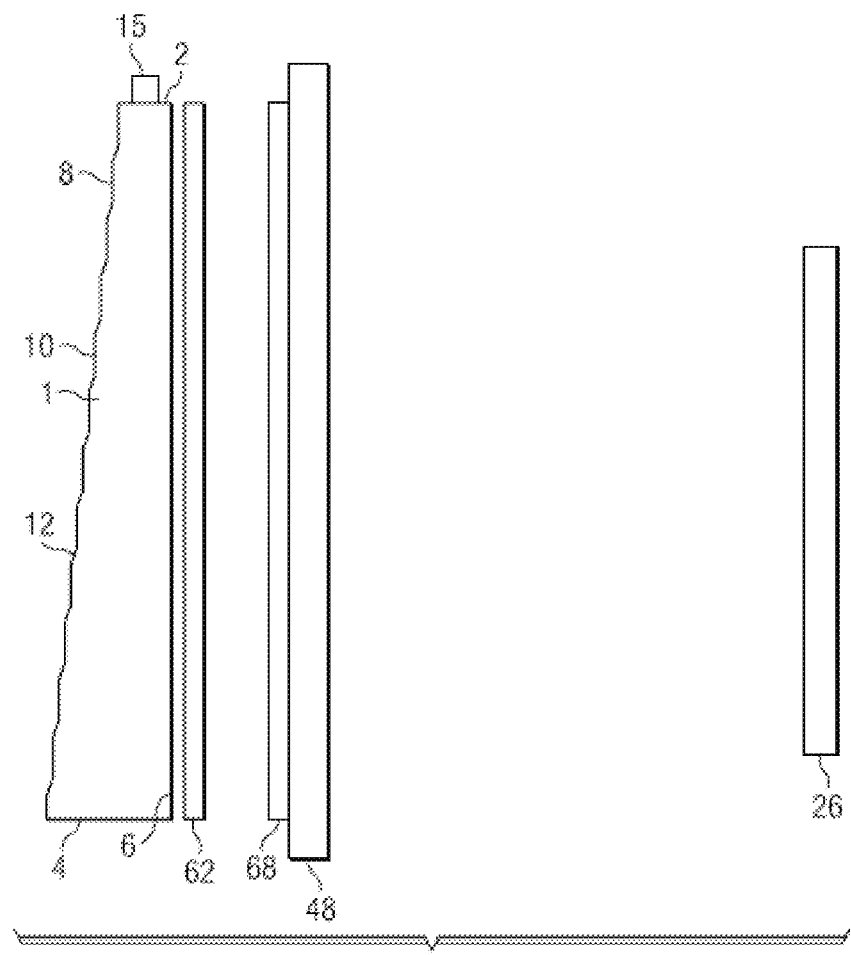
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
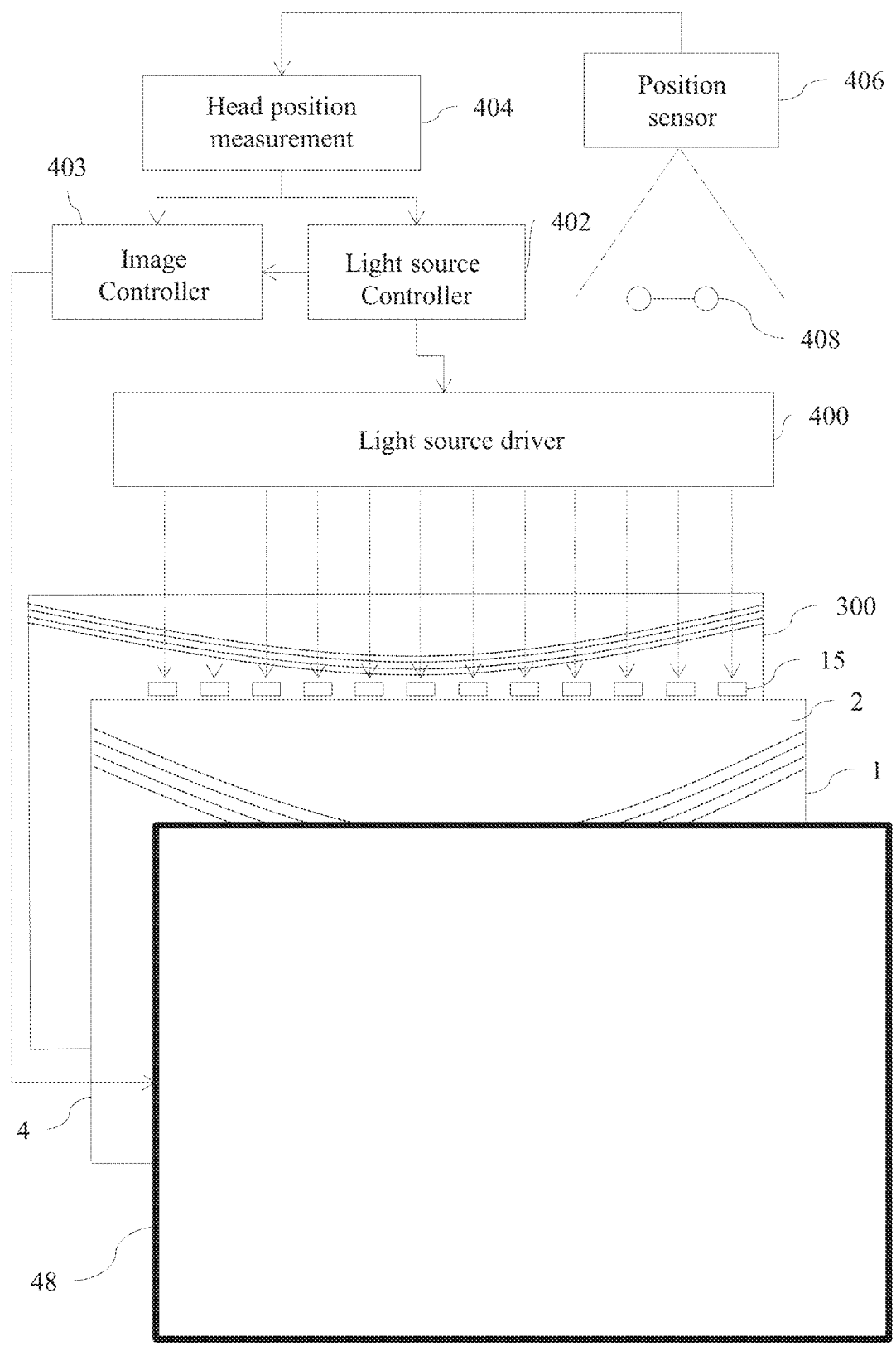
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Thus a directional display apparatus may comprise a directional display device and a control system arranged to control the light sources 15a-n.

Figure 12A:
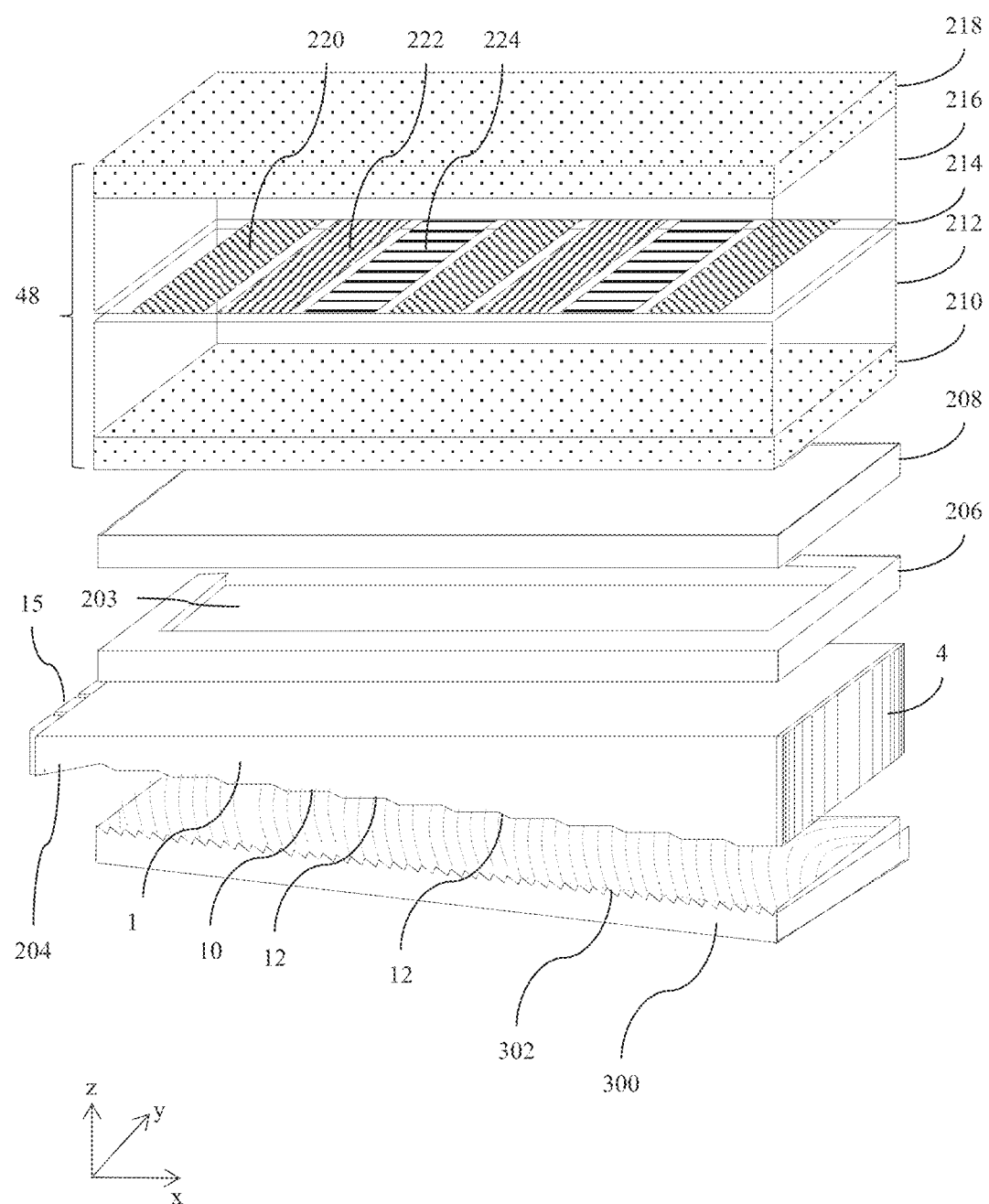
FIG. 12A is a schematic diagram illustrating a perspective view of a directional display apparatus optical stack comprising a directional waveguide with light input at a side that is opposite a reflective side, in accordance with the present disclosure.

FIG. 12A is a schematic diagram illustrating a perspective view of a directional display apparatus optical stack comprising a directional waveguide with light input at a side that is opposite a reflective side.

Reflective end 4 may be provided by a Fresnel mirror. Further taper region 204 may be arranged at the input to the waveguide 1 to increase input coupling efficiency from the light sources 15a-15n of the array of illuminator elements 15 and to increase illumination uniformity. Shading layer 206 with aperture 203 may be arranged to hide light scattering regions at the edge of the waveguide 1. Rear reflector 300 may comprise facets 302 that are curved and arranged to provide viewing windows from groups of optical windows provided by imaging light sources of the array 15 to the window plane. An optical stack 208 may comprise reflective polarizers, retarder layers and diffusers. Rear reflectors 300 and optical stack 208 are described further in U.S. Patent Publ. No. 2014/0240828, filed Feb. 21, 2014, entitled "Directional backlight" incorporated herein by reference in its entirety.

Spatial light modulator 48 may comprise a liquid crystal display that may comprise an input polarizer 210, TFT glass substrate 212, liquid crystal layer 214, color filter glass substrate 216 and output polarizer 218. Red pixels 220, green pixels 222 and blue pixels 224 may be arranged in an array at the liquid crystal layer 214. White, yellow, additional green or other color pixels (not shown) may be further arranged in the liquid crystal layer to increase transmission efficiency, color gamut or perceived image resolution.

Figure 12B:
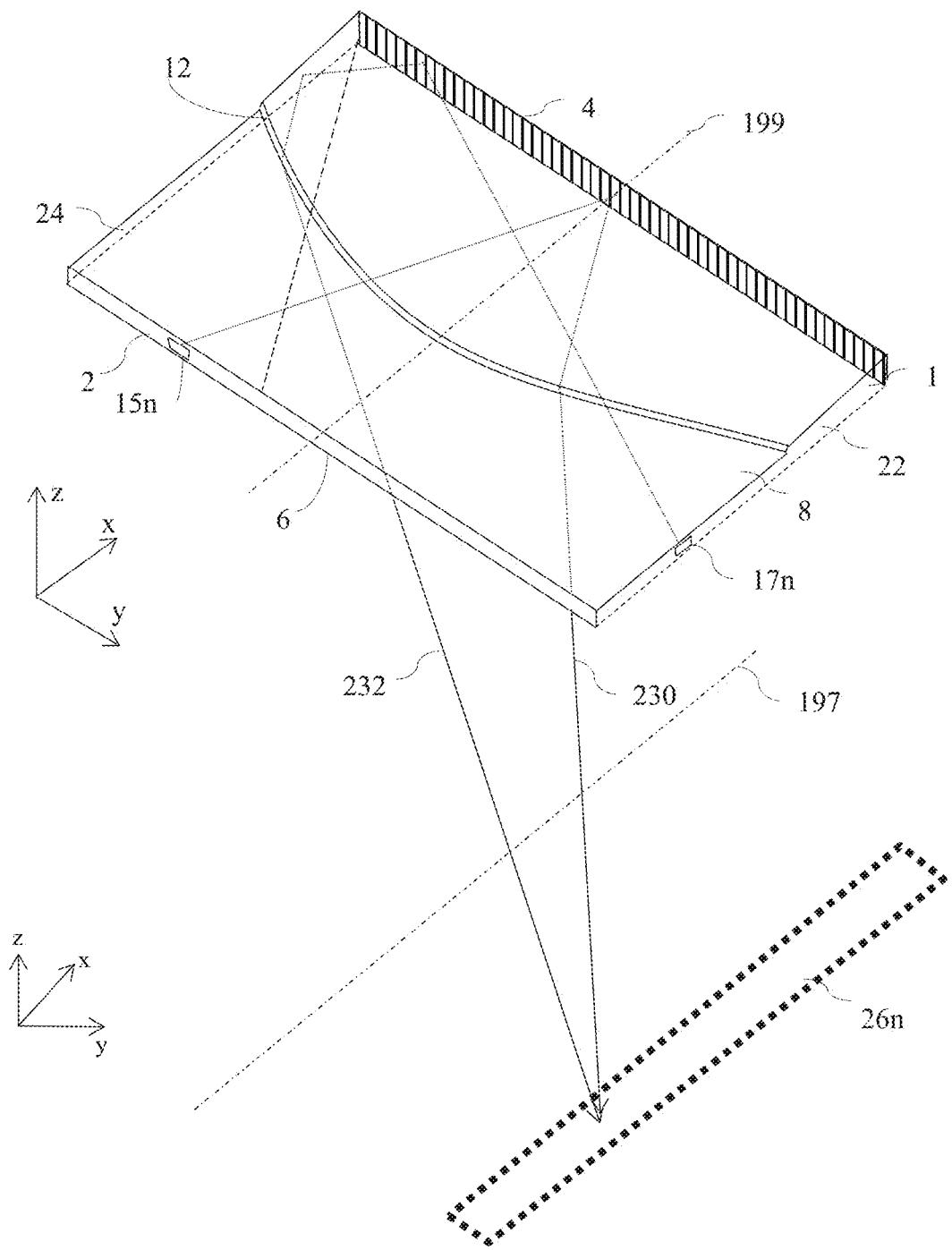
FIG. 12B is a schematic diagram illustrating a perspective view of the formation of optical windows by a directional display apparatus comprising a directional waveguide with light input at a side that is opposite a reflective side, in accordance with the present disclosure.

FIG. 12B is a schematic diagram illustrating a perspective view of the formation of optical windows by a directional display apparatus comprising a directional waveguide with light input at a side that is opposite a reflective side. The input surface 2 may thus be an end of the waveguide 1 may be opposite to the reflective end.

Figure 12C:
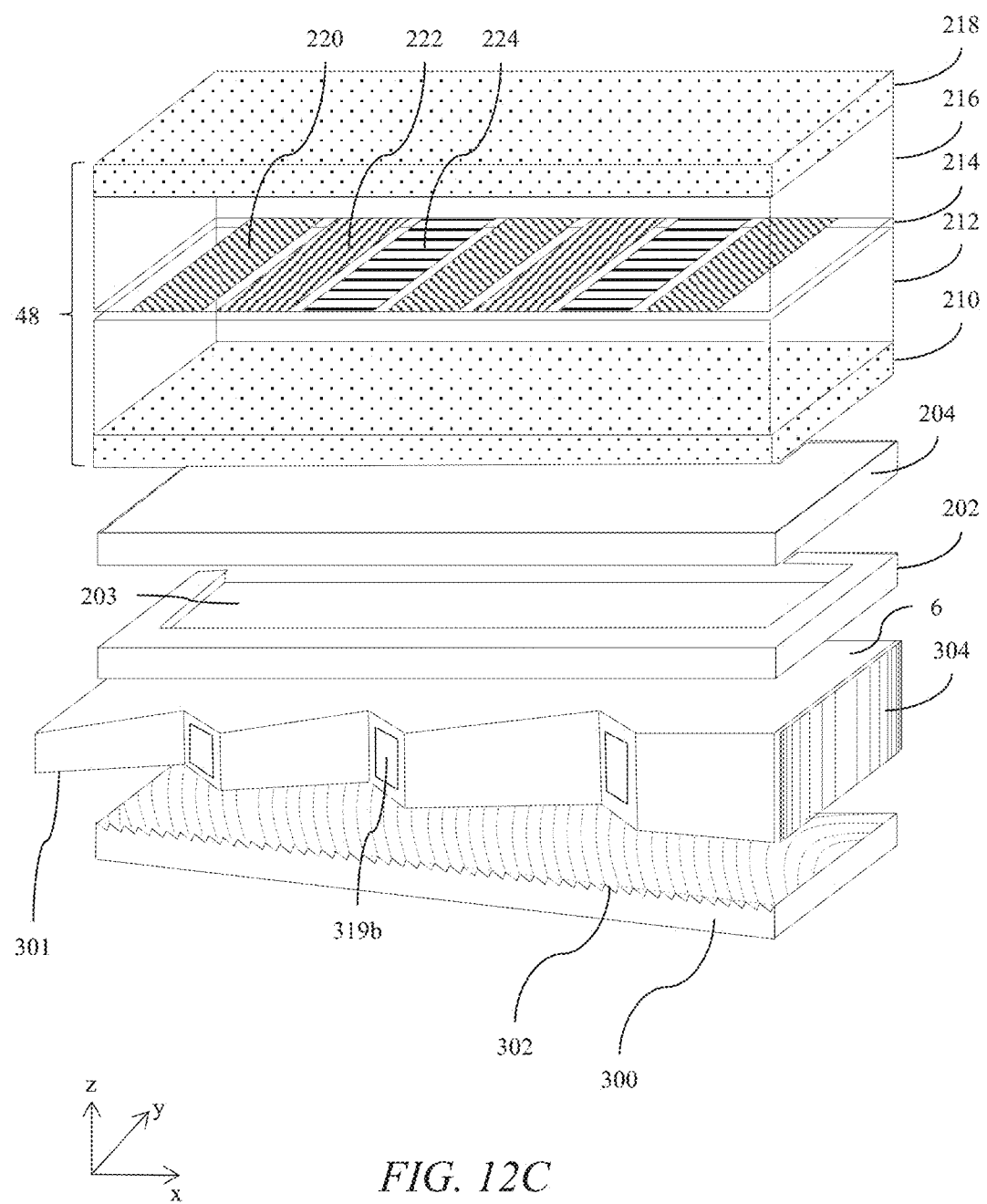
FIG. 12C is a schematic diagram illustrating a perspective view of a directional display apparatus optical stack comprising a directional waveguide with light input at a side that is adjacent a reflective side, in accordance with the present disclosure.

FIG. 12C is a schematic diagram illustrating a perspective view of a directional display apparatus optical stack comprising a directional waveguide with light input at a side that is adjacent a reflective side as described elsewhere in U.S. patent application Ser. No. 15/165,960, entitled "Wide angle imaging directional backlights," filed May 26, 2016 and incorporated by reference herein in its entirety. Waveguide 301 comprises input sides 322, 324 with aligned light sources 317a-n and 319a-n on respective sides. End 302 opposite reflective end 304 may be arranged to be absorbing or reflective to provide low levels of cross talk or increased efficiency respectively.

Figure 12D:
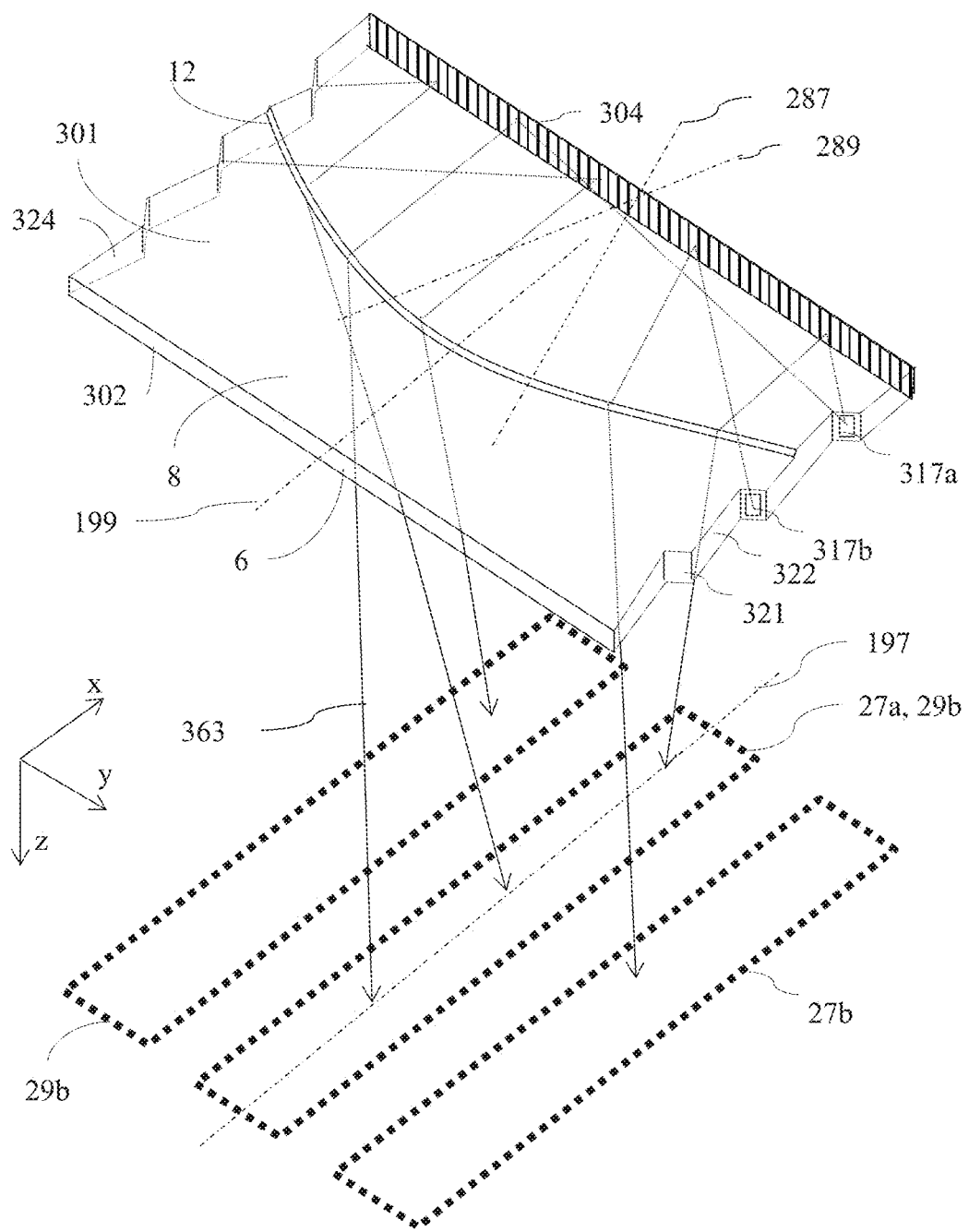
FIG. 12D is a schematic diagram illustrating a perspective view of the formation of optical windows by a directional display apparatus comprising a directional waveguide with light input at a side that is adjacent a reflective side, in accordance with the present disclosure.

FIG. 12D is a schematic diagram illustrating a perspective view of the formation of optical windows by a directional display apparatus comprising a directional waveguide with light input at a side that is adjacent a reflective side. Light sources 317a-n and 319a-n at input facets 321 are arranged to provide optical windows 27a-n and 29a-n respectively about an axis 197. Fresnel mirror 304 is arranged with first and second optical axes 287, 289. The input surface may thus be a side surface 322 of the waveguide 301 extending away from the reflective end 304.

A directional backlight thus comprises a first guide surface 6 arranged to guide light by total internal reflection and the second guide surface 8 comprising a plurality of light extraction features 12 oriented to direct light guided along the waveguide 1, 301 in directions allowing exit through the first guide surface 6 as the output light and intermediate regions 10 between the light extraction features 12 that are arranged to guide light along the waveguide 1, 301.

Considering the arrangements of FIGS. 12A-D, the second guide surface 6 may have a stepped shape in which said light extraction features 12 are facets between the intermediate regions 10. The light extraction features 12 may have positive optical power in a direction between the side surfaces 22, 24 or 322, 324 of the waveguide 1, 301 that extend between the first and second guide surfaces 6,8. The reflective end 4, 304 may have positive optical power in a direction extending between the sides 22,24 or 322, 324 of the reflective end 4, 304 that extend between the first and second guide surfaces 6,8.

Thus all sides 2, 4, 6, 8, 22, 24 provide reflections to achieve uniform illumination and low cross talk in privacy mode of operation. If features are applied to many areas of the surface then non-uniformities may be provided due to the spatial location of the waveguide extraction loss at the features.

It may be desirable to provide high image uniformity by means of illumination of the reflective end 4, 304.

Figure 13:
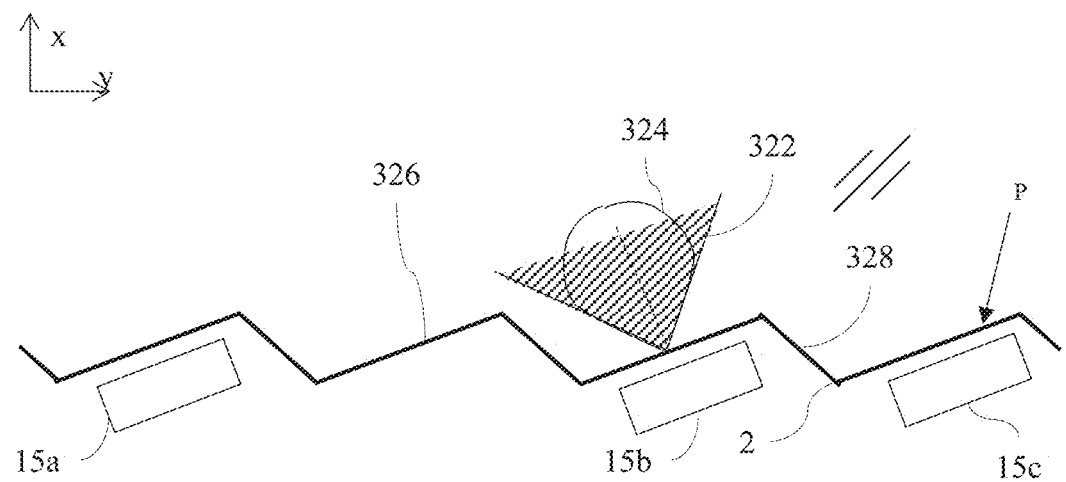
FIG. 13 is a schematic diagram illustrating a top view of light input into a directional waveguide at the input surface, in accordance with the present disclosure.

FIG. 13 is a schematic diagram illustrating a top view of light input into a directional waveguide at the input surface. Considering the arrangement of FIG. 12A, light cone 322 is provided by light source 15b by illumination through input facets 326, separated by draft facets 328 on side 2. Facet 326 may further comprise microstructures to vary the illumination angular profile 324 of input light. Facets 326 may be tilted to direct light to the reflective end 4.

Figure 14:
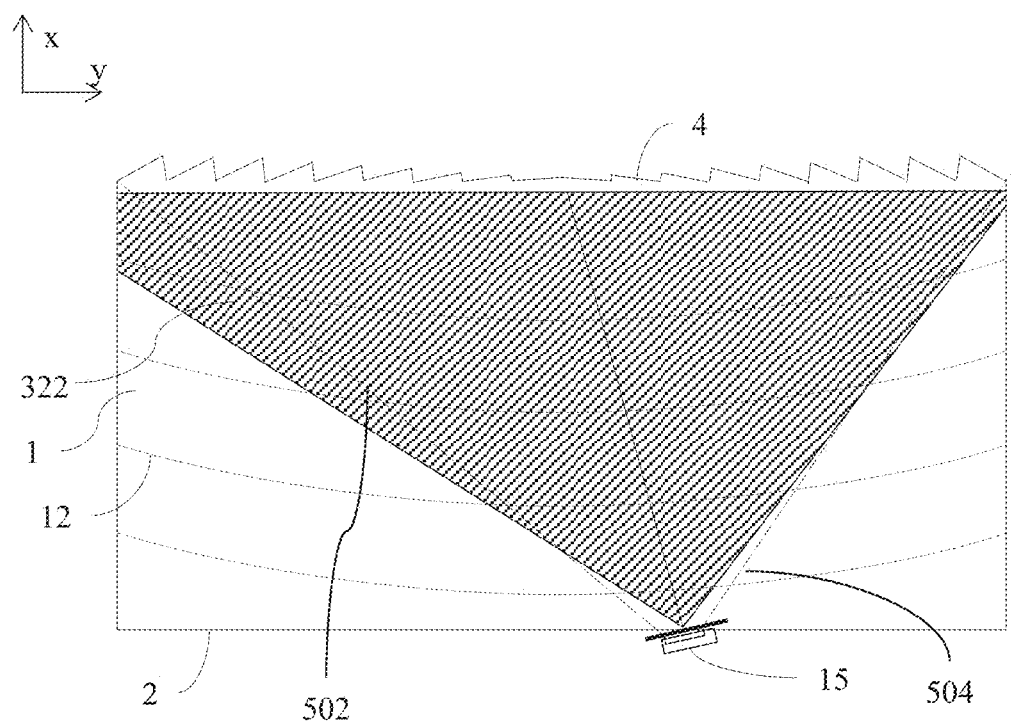
FIG. 14, FIG. 15, and FIG. 16 are schematic diagrams illustrating top views of illumination of a reflective end of a directional waveguide, in accordance with the present disclosure.
Figure 15:
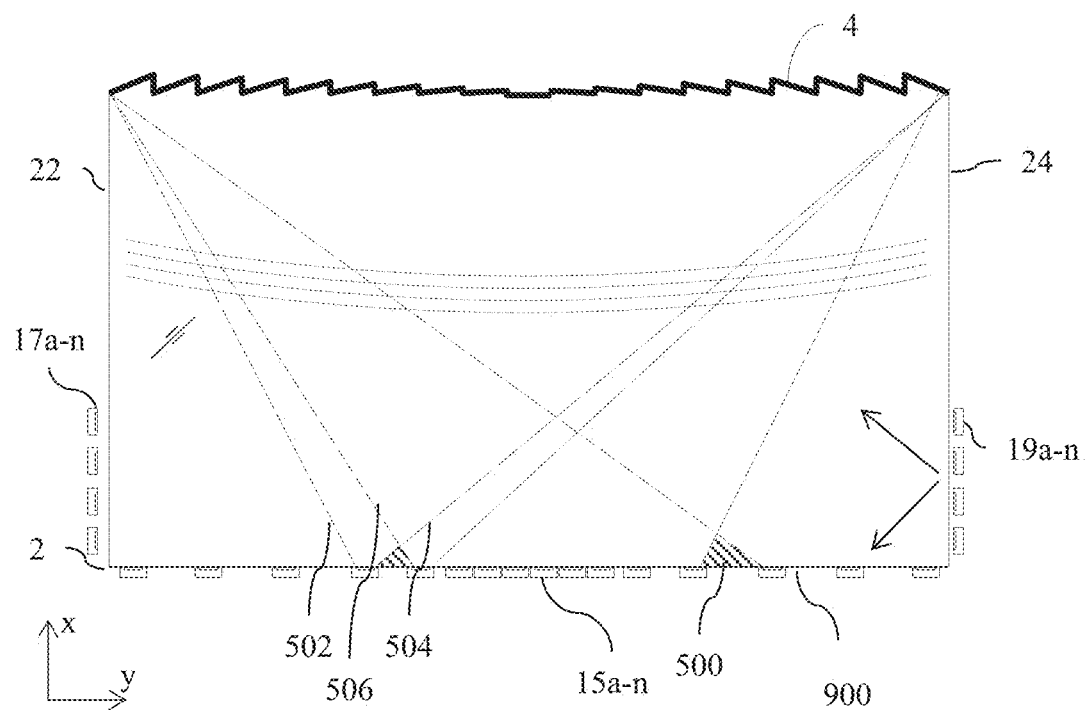
Figure 16:
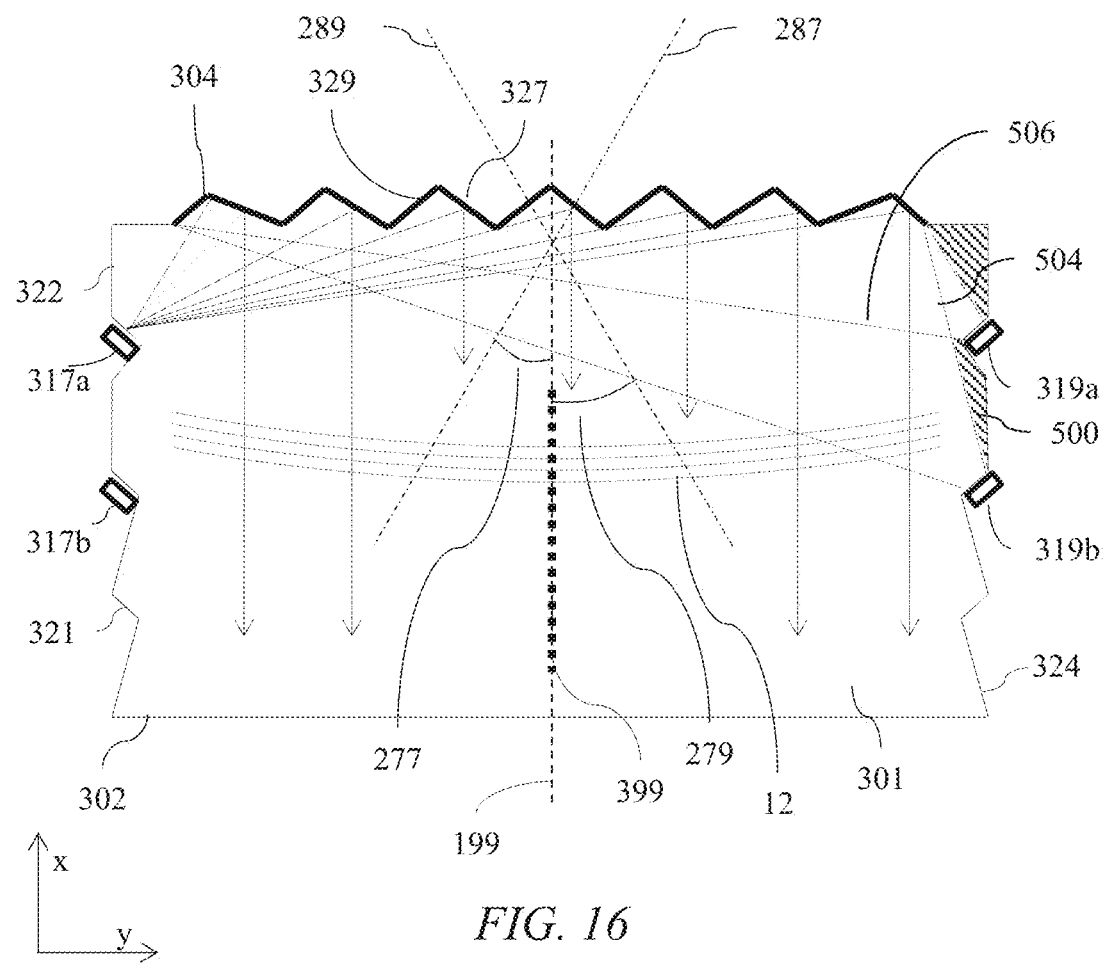

FIGS. 14-16 are schematic diagrams illustrating top views of illumination of a reflective end of a directional waveguide. Light source 15 is arranged to illuminate reflective end 4 from input surface 2. Rays 502,504 describe the limit of rays that are provided by light source and illuminate end 4. As shown in FIG. 15 regions 500 are regions of the input surface through which input light from light sources 15a-n to reflective end 4 does not propagate. Similarly for the arrangement of FIG. 16 regions 500 are regions of the input surface through which input light from light sources 317a-n and 319a-n to reflective end 304 does not propagate.

Figure 17:
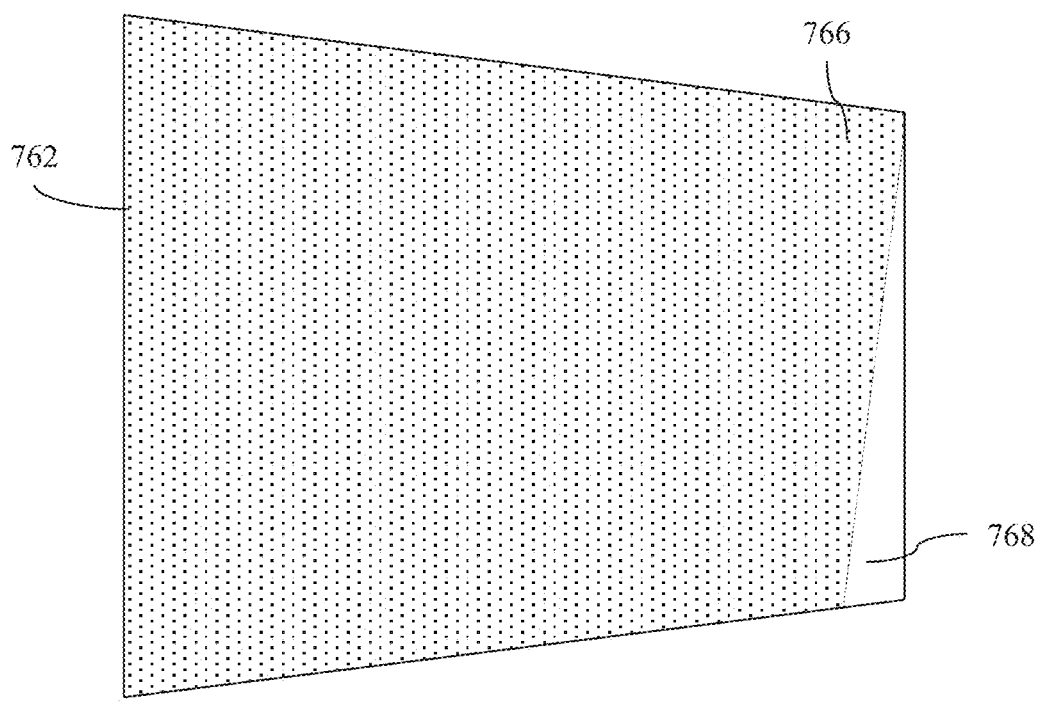
FIG. 17 is a schematic diagram illustrating a perspective view of light uniformity from a directional waveguide for an off-axis viewing position for a wide angle mode of operation, in accordance with the present disclosure.

FIG. 17 is a schematic diagram illustrating a perspective view of light uniformity from a directional waveguide for an off-axis viewing position for a wide angle mode of operation. Image 762 is illuminated by uniform light 766 and void 768. Void 768 can be filled by off-axis illumination as described in U.S. Patent Publ. No. 2016/0299281, entitled "Wide angle imaging directional backlights", which is incorporated by reference herein in its entirety. It may be desirable to maintain the uniformity of region 766.

Figure 18:
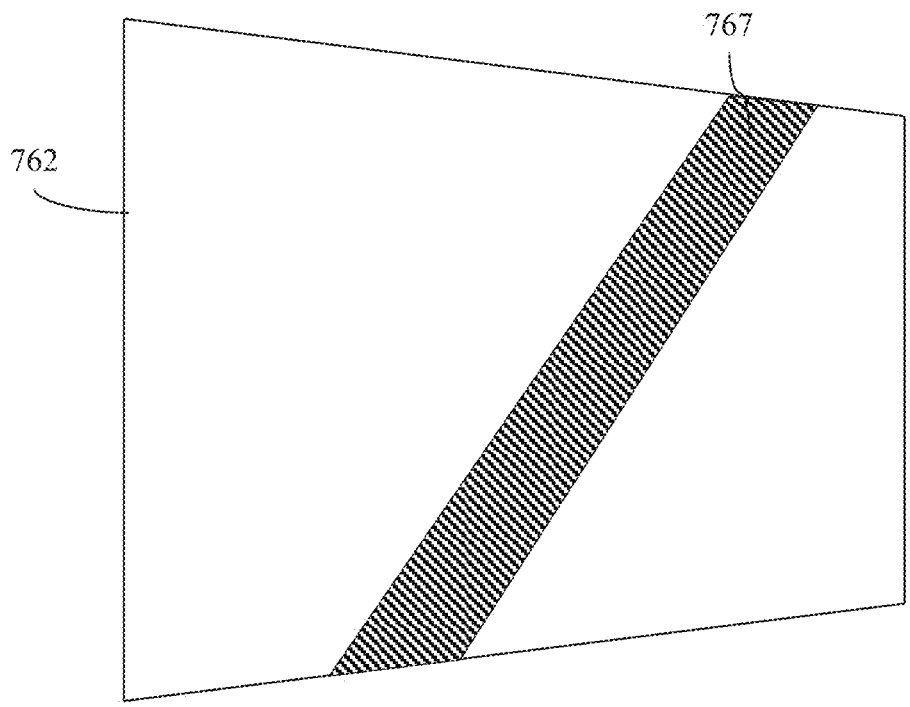
FIG. 18 is a schematic diagram illustrating a perspective view of light uniformity from a directional waveguide for an off-axis viewing position for a privacy mode of operation, in accordance with the present disclosure.

FIG. 18 is a schematic diagram illustrating a perspective view of light uniformity from a directional waveguide for an off-axis viewing position for a privacy mode of operation where only on-axis light sources are provided. High reflectivity regions on the input surface may provide light streaks such as streak 767. It may be desirable to reduce the intensity of streak 767, advantageously improving privacy performance.

The arrangements of FIGS. 12A and 12C desirable require alignment of multiple components such as waveguides, rear reflectors, optical stacks and LCD components. It may be desirable to reduce the cost and complexity of assembly of such components. Further such alignment methods should provide high image uniformity. It would further be desirable for alignment features to compensate for differential thermal expansion of components in the display apparatus.

Thus it would be further desirable to provide a directional backlight that reduces the amount of stray light seen in Privacy mode of operation.

Figure 19:
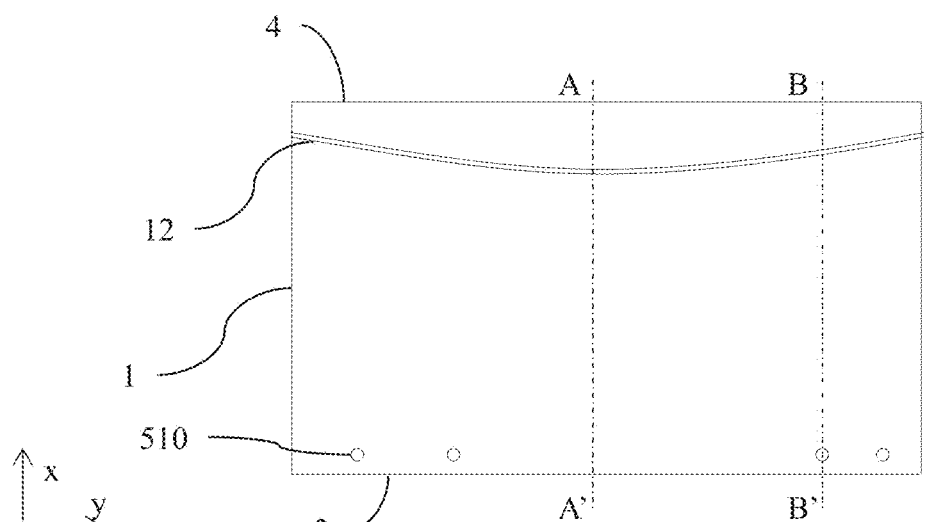
FIG. 19 is a schematic diagram illustrating a front view of a directional waveguide wherein the waveguide further comprises at least one surface relief feature formed on at least one of the first and second guide surfaces in a location adjacent the input surface, in accordance with the present disclosure.

FIG. 19 is a schematic diagram illustrating a front view of a directional waveguide wherein the waveguide further comprises at least one surface relief feature formed on at least one of the first and second guide surfaces in a location adjacent the input surface. Waveguide 1 is formed with a number of alignment features 510 in region that is close to input surface 2 as will be described. Sections A-A' and B-B' will be described elsewhere herein.

Figure 20:
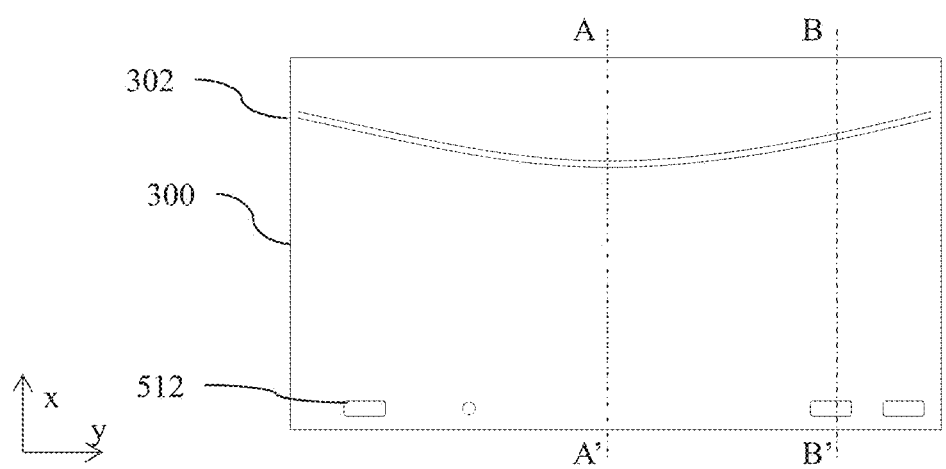
FIG. 20 is a schematic diagram illustrating a front view of a rear reflector comprising a linear array of reflective facets and further comprising alignment holes, in accordance with the present disclosure.

FIG. 20 is a schematic diagram illustrating a front view of a rear reflector comprising a linear array of reflective facets and further comprising alignment features 512. Features 512 may be circular, elongate slot or other shapes.

Figure 21:
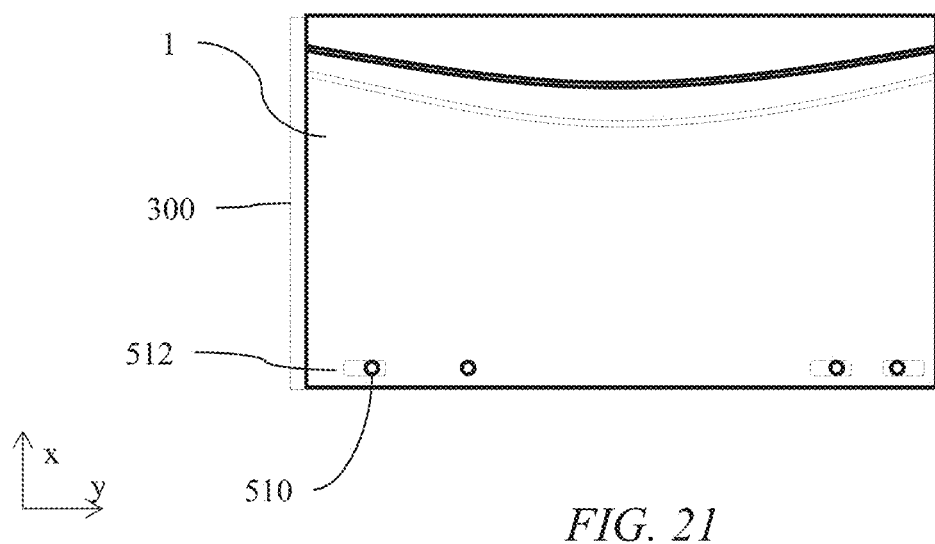
FIG. 21 is a schematic diagram illustrating alignment of the directional waveguide of FIG. 19 and the rear reflector of FIG. 20, in accordance with the present disclosure.

FIG. 21 is a schematic diagram illustrating alignment of the directional waveguide of FIG. 19 and the rear reflector of FIG. 20. Thus features 510, 512 may be aligned during an assembly step. The features 510 may be pins that align with features 512 that may be holes in the rear reflector.

Advantageously the waveguide 1 and rear reflector 300 may be aligned. Further differential thermal expansion in the lateral direction (y-axis), while maintaining alignment in the orthogonal direction (x-axis).

Figure 22:
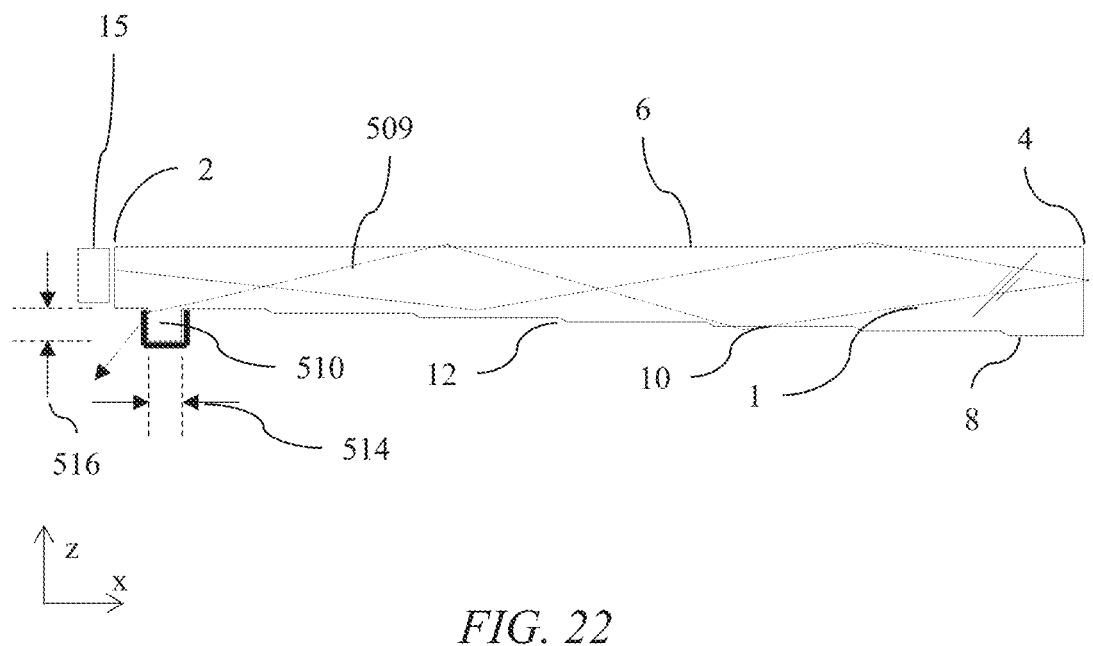
FIG. 22, FIG. 23A, and FIG. 23B are schematic diagrams illustrating a side view of a directional waveguide wherein the waveguide further comprises at least one surface relief feature, in accordance with the present disclosure.
Figure 23A:
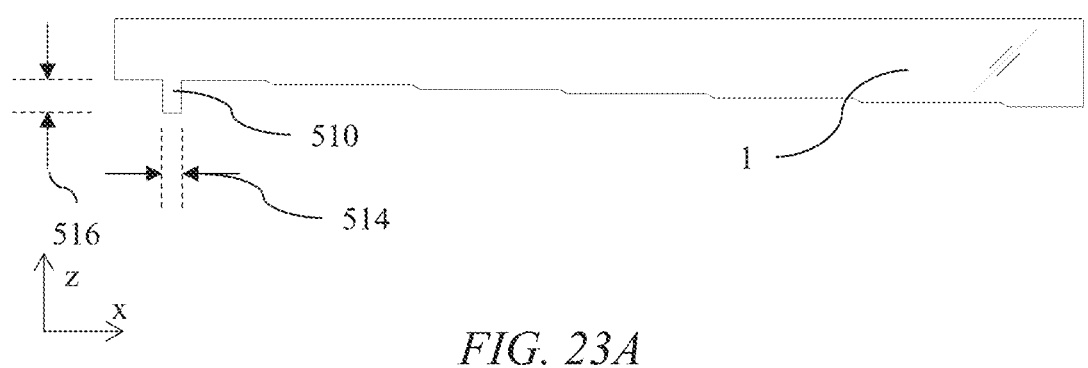
Figure 23B:

FIGS. 22-23B are schematic diagrams illustrating a side view of a directional waveguide wherein the waveguide further comprises at least one surface relief feature. Such side view may be a cross section of section B-B' in FIG. 19 for example. Thus a directional backlight may comprise: a waveguide 1 comprising first and second, opposed guide surfaces 6,8 for guiding light along the waveguide 1 and an input surface 2 extending between the first and second guide surfaces 6,8; and an array of light sources 15a-n arranged at different input positions along the input surface 2 of the waveguide 1 and arranged to input light into the waveguide 1, the light sources 15a-n having light emitting regions that are spaced apart, the waveguide 1 further comprising a reflective end 4 for reflecting input light from the light sources 15a-n back along the waveguide 1, the second guide surface 8 being arranged to deflect the reflected input light through the first guide surface 6 as output light, and the directional backlight being arranged to direct the output light into optical windows 26 in output directions that are distributed laterally in dependence on the input positions along the input surface 2 of the light sources that inputted the input light, wherein the waveguide 1 further comprises at least one surface relief feature 510 formed on at least one of the first and second guide surfaces 6,8.

Further the waveguide 1 may comprise a reflective end 2 for reflecting input light from the light sources back along the waveguide 1, the second guide surface 8 being arranged to deflect the reflected input light through the first guide surface as output light, and the waveguide being arranged to image the light sources so that the output light from the light sources is directed into respective optical windows in output directions that are distributed laterally in dependence on the input positions of the light sources, wherein the waveguide 1 further comprises at least one surface relief feature formed either on at least one of the first and second guide surfaces in a location adjacent the input surface and intermediate the light emitting regions of the light sources, and/or on the input surface intermediate the light emitting regions of the light sources.

Thus feature 510 may be a pin extending in the z-direction with width 514 and height 516. Advantageously such a feature 510 may be formed during moulding of waveguide 1. Alternatively the feature 510 could be separately attached to waveguide 1.

The surface relief feature 510 may further be arranged to remove from the waveguide 1 at least some of the reflected light that is incident thereon after reflection by the reflective end 4. The feature 510 may have an absorbing coating, or an absorbing layer may be arranged with the feature 510 to reduce stray light.

Advantageously light rays 509 from the input surface, reflected from the reflective end 4 and guided by feature 10 on side 8 and side 6 may be incident on the feature 510 and extracted before reaching the input surface 2. Such light thus is not reflected into the waveguide from side 1, so that the intensity of streaks 767 such as shown in FIG. 18 is reduced. Thus advantageously the Privacy performance may be achieved in cooperation with the mechanical arrangement of the optical stack.

FIG. 23A illustrates that the feature 510 may be arranged with a width 514 that is smaller or similar to height 516, to minimize guiding within the feature 510, and thus optimize the reduction of reflected light from feature 510. Advantageously the performance of the privacy mode may be increased.

FIG. 23B illustrates that the feature 510 may be a hole rather than the protrusion shown in FIGS. 22 and 23A. Such a hole may be black coated to reduce stray light reflections. Further the sides of the hole may be provided with a microstructure to minimize the directionality of the streaks 367 in privacy mode of operation.

Figure 24:
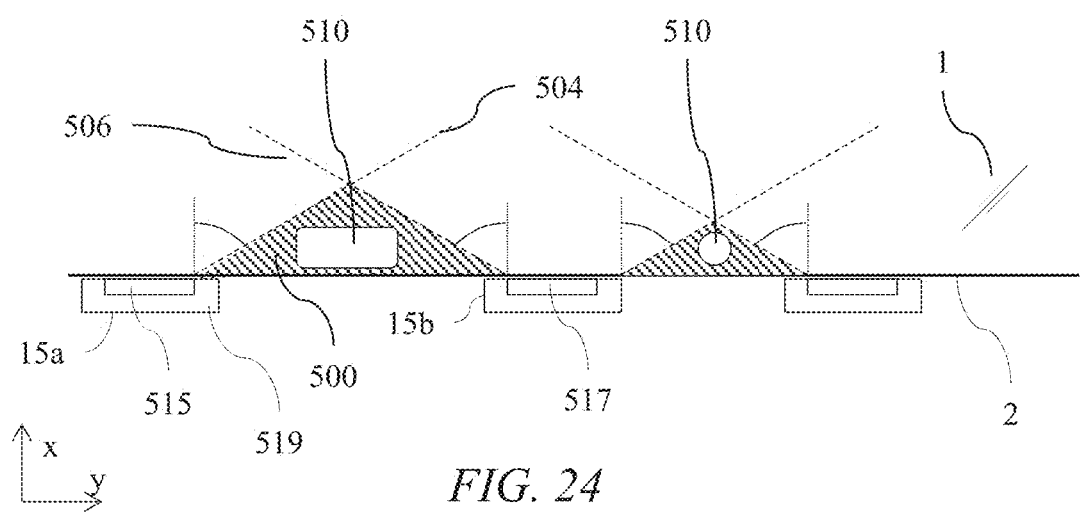
FIG. 24, FIG. 25A, and FIG. 25B are schematic diagrams illustrating front views of the input of light into a directional waveguide and bounding regions for surface relief features, in accordance with the present disclosure.
Figure 25A:
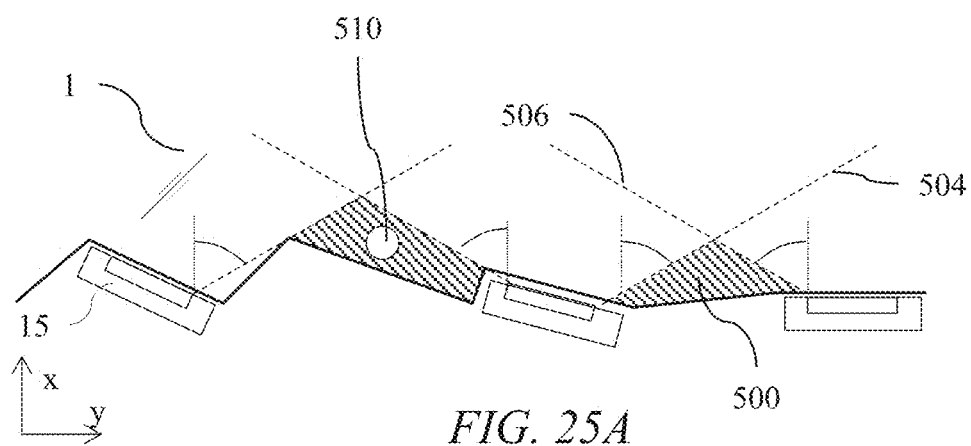
Figure 25B:
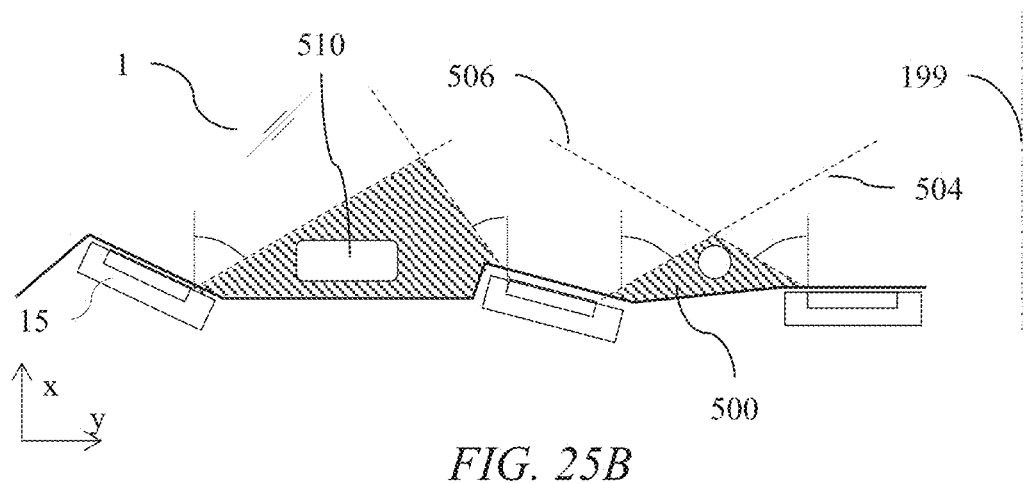

FIGS. 24-25B are schematic diagrams illustrating front views of the input of light into a directional waveguide and bounding regions for surface relief features. Thus at least one surface relief feature 510 is formed on at least one of the first and second guide surfaces 6,8 of the waveguide 1 in a location adjacent the input surface 2 and in regions 500 intermediate the light emitting regions 515, 517 of the light sources 15a-n. 2. The location of the surface relief feature 510 may be within a region 500 bounded by: a portion of the input surface 2 intermediate the light emitting regions of a pair of adjacent light sources 15a, 15b, and a pair of intersecting notional lines 504, 506 that extend from the respective edges of the light emitting regions 517, 519 of the pair of light sources 15a, 15b that are adjacent the portion of the input surface 2, to the respective sides of the reflective end 4 that extend between the first and second guide surfaces 6, 8.

Thus light sources 15a-n may have a package material 519 and light emitting region 515. Region 500 is formed by light rays 504, 506 from the edge of the region 515 to the edges of the reflective end 4, and input surface 2.

Advantageously the features 510 do not degrade the uniformity of the output. By way of comparison, features outside region 500 may create light loss such that some regions of the reflective end 4 are illuminated at lower intensity in comparison to other regions which have light rays that do not pass through features 510.

FIGS. 25A-25B illustrate different arrangements of input surfaces arranged to optimize area for features 510 without degrading efficiency while advantageously achieving high uniformity of illumination.

It may be desirable to provide a directional display with uniform appearance for off-axis viewing positions in a wide angle of viewing.

Figure 26A:
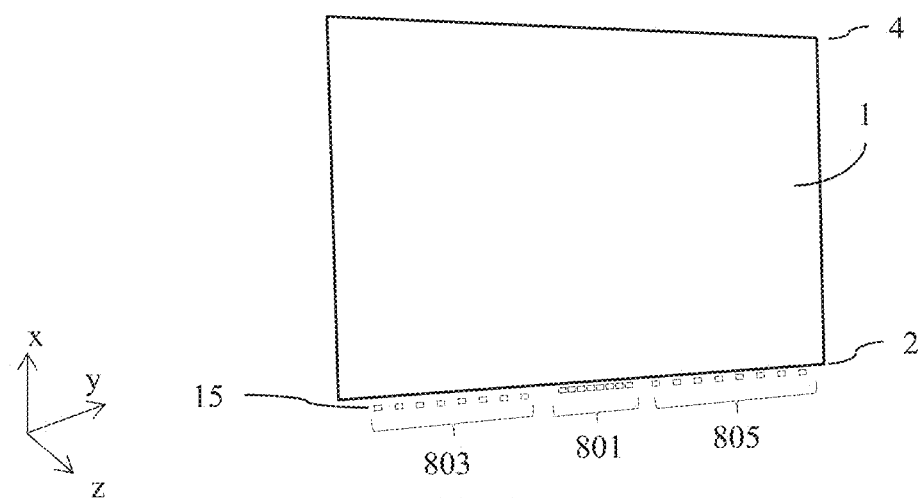
FIG. 26A is a schematic diagram illustrating a perspective front view of off-axis ray propagation in a directional backlight for a wide viewing mode of operation, in accordance with the present disclosure.
Figure 26B:
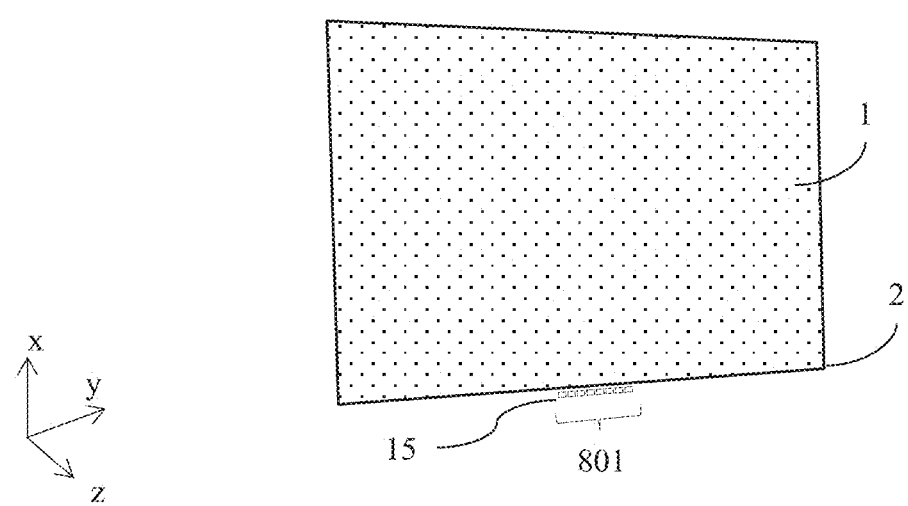
FIG. 26B is a schematic diagram illustrating a perspective front view of off-axis ray propagation in a directional backlight for a privacy viewing mode of operation, in accordance with the present disclosure.

FIG. 26A is a schematic diagram illustrating a perspective front view of off-axis ray propagation in a directional backlight for a wide viewing mode of operation and FIG. 26B is a schematic diagram illustrating a perspective front view of off-axis ray propagation in a directional backlight for a privacy viewing mode of operation.

In wide mode of operation groups of light sources 801, 803, 805 of array 15 are all operated and an image can be seen for an off-axis viewing position as shown in FIG. 26A.

In Privacy mode of operation only group 801 are operated so an image can be seen for a central viewing position but off-axis observers cannot see the image as shown in FIG. 26B.

It may be desirable to minimize the luminance of the off-axis image in the Privacy mode of operation.

Figure 26C:
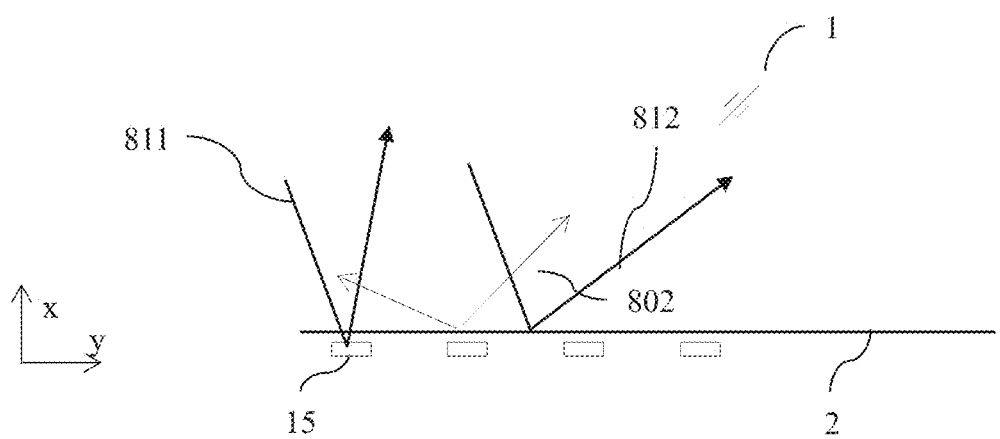
FIG. 26C is a schematic diagram illustrating a top view of light input and light reflection from the input side of the directional waveguide, in accordance with the present disclosure.

FIG. 26C is a schematic diagram illustrating a top view of light input and light reflection from the input side of the directional waveguide 1 in the region of groups 803, 805. Light sources of array 15 may be arranged with microstructures on the input side 2 such as described in U.S. patent application Ser. No. 15/290,543 filed Oct. 11, 2016 and incorporated by reference herein in its entirety.

In a wide mode of operation the light sources in groups 803, 805 are arranged to provide input rays 802 that provide uniform illumination for a wide range of viewing positions.

However, in Privacy mode light rays 811 that reflect from the light source package or rays 812 that reflect from the input microstructure at the input end create an effective illumination source. Such rays propagate back in the waveguide 1 and provide undesirable off-axis illumination thus reducing the effectiveness of the Privacy mode of operation.

It may be desirable to reduce the reflectivity of features at the input end 2 of the waveguide 2.

Modifications to the input end 2 are described in U.S. Pat. No. 9,350,980, which is incorporated by reference herein in its entirety. The thickness of the input end may be 0.5 mm or less. Applying light absorbing layers to such a low thickness is complex and increases cost. It may be desirable to provide a reduced cost arrangement to reduce reflections.

It would be further desirable to provide stable alignment of light source array 15 to the input end to increase coupling efficiency and to reduce hot spot visibility.

Figure 26D:
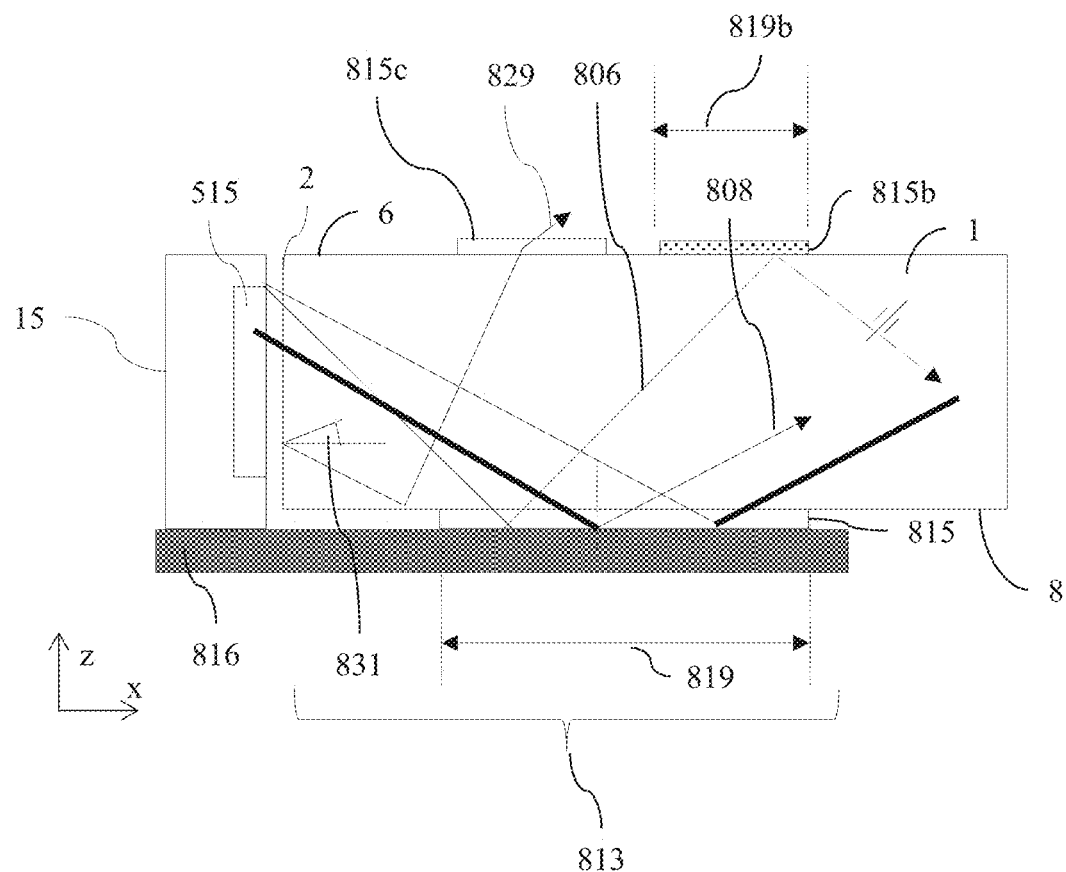
FIG. 26D and FIG. 26E are schematic diagrams illustrating side and top views respectively of a strip arranged to provide reduced reflection of light rays from an input end, in accordance with the present disclosure.
Figure 26E:
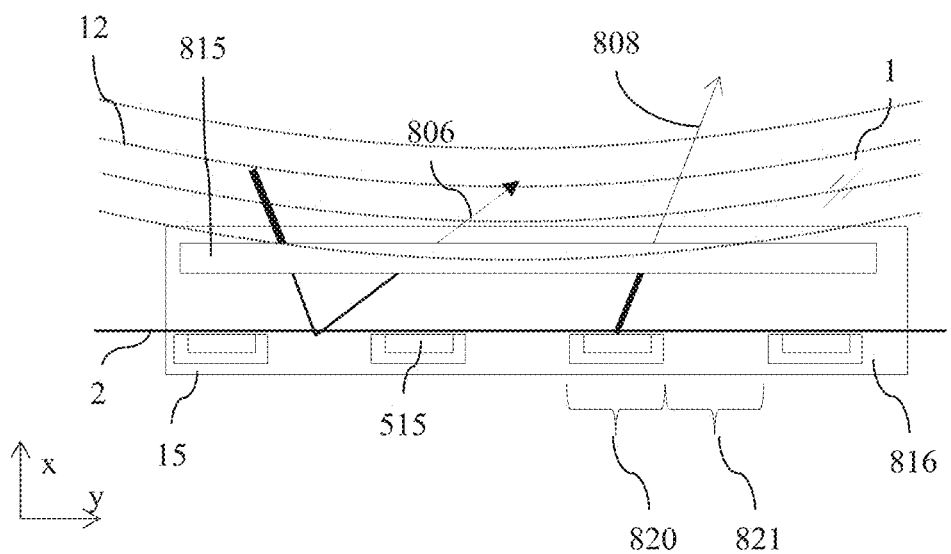

FIGS. 26D-E are schematic diagrams illustrating side and top views respectively of a strip arranged to provide reduced reflection of light rays from an input end 2.

A directional backlight may comprise a waveguide 1 comprising first and second, opposed guide surfaces 6,8 for guiding light along the waveguide 1 and an input surface 2 extending between the first and second guide surfaces 6,8; an array 15 of light sources 15a-n arranged at different input positions along the input surface 2 of the waveguide 1 and arranged to input input light into the waveguide 1, the light sources 15a-n having light emitting regions that are spaced apart, the waveguide 1 further comprising a reflective end 4 for reflecting input light from the light sources 15a-n back along the waveguide 1, the second guide surface 8 being arranged to deflect the reflected input light through the first guide surface 6 as output light, and the waveguide 1 being arranged to image the light sources 15a-n so that the output light from the light sources is directed into respective optical windows 26a-n in output directions that are distributed laterally in dependence on the input positions of the light sources 15a-n.

The directional waveguide 1 may further comprise a support 816 which supports the array 15 of light sources and has a portion 813 extending past the input surface 2 of the waveguide 1 across the first or second guide surface of the waveguide 1.

At least one strip 815 is adhered to at least one of the first guide surface 6 and the second guide surface 8 of the waveguide 1 and extending therealong adjacent to the input surface 2, the strip 815 being arranged to reduce reflection of light rays 806 incident thereon from inside the waveguide 1.

In operation light rays 806 that have been reflected at the reflective end 4 may be incident on the strip 815. Light may propagate into the strip 815 and the reflected ray intensity may be reduced by absorption or scattering as will be described herein. The light ray 806 that has been reflected by the input side may be incident on the strip 815 a second time and further absorption may take place. For illustrative purposes, the ray intensity on reflection at the input side is shown with the same line width to illustrate intensity. However, some light will be transmitted and absorbed at the input end 2, with some light reflected back into the waveguide towards the reflective end 4.

Advantageously, the rays 806 undergo losses at the strip 815, input end 2 and a second time at the strip 815. Light ray 806 may be advantageously reduced and privacy performance increased.

Further light rays directly from the light source of the array 15 may be incident on the strip 815 for a single pass. Thus the loss of input light rays 808 is advantageously lower than the loss of reflected light rays 806.

The support 816 is illustrated as being on the second guide surface 8, however the strip may be on the first guide surface 6. To further increase the reduction of reflected light a further strip 815*b* may be arranged on the first guide surface 6. The amount of reflection reduction may be further controlled by adjusting the widths 819, 819*b* of the strips 815, 815*b*. Advantageously the trade-off between input light loss and reflection reduction may be controlled to minimize wide mode power consumption and reduce privacy image luminance.

As illustrated in FIG. 26E the light sources may have light emitting regions 515 that are spaced apart, and the strip extends along the second guide surface waveguide across both locations 820 adjacent to the light emitting regions of the light sources and locations 821 intermediate the light emitting regions of the light sources.

Advantageously light reflections from light sources of the array 15 and reflections from the input end may be reduced.

It may be desirable to increase the efficiency of input light while minimizing the visibility of reflections from the input side in the regions intermediate the light sources.

Figure 26F:
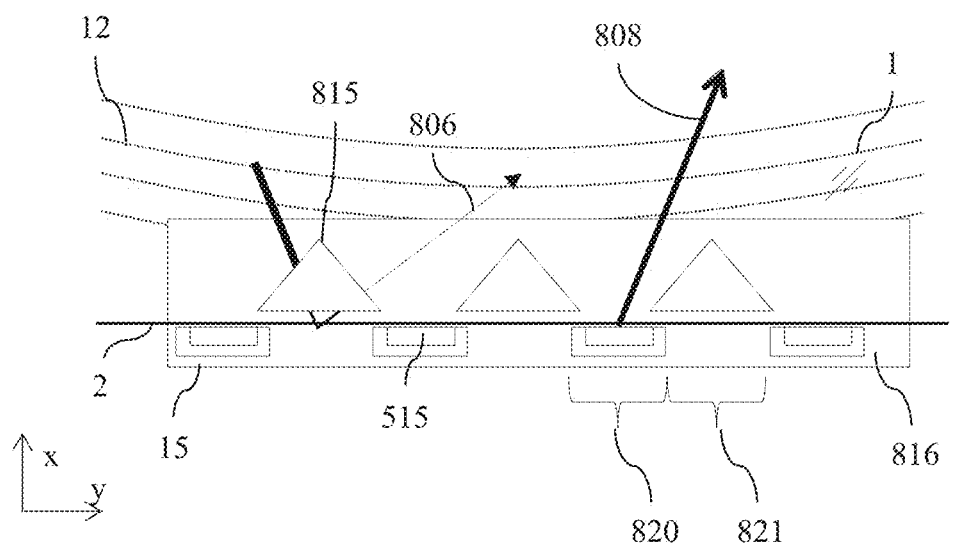
FIG. 26F is a schematic diagram illustrating a top view of a strip and support arranged on the first guiding surface, in accordance with the present disclosure.

FIG. 26F is a schematic diagram illustrating a top view of a strip 815 and support 816 arranged on the first guiding surface 6. The strip 815 may extend along only a part of the second guide surface 8 and may be for example triangular in shape for example. Advantageously reduced reflection of light rays 806 from an input end 2 may be provided while achieving increased efficiency for input light rays 808 in comparison to the arrangement of FIG. 26E.

Figure 26G:
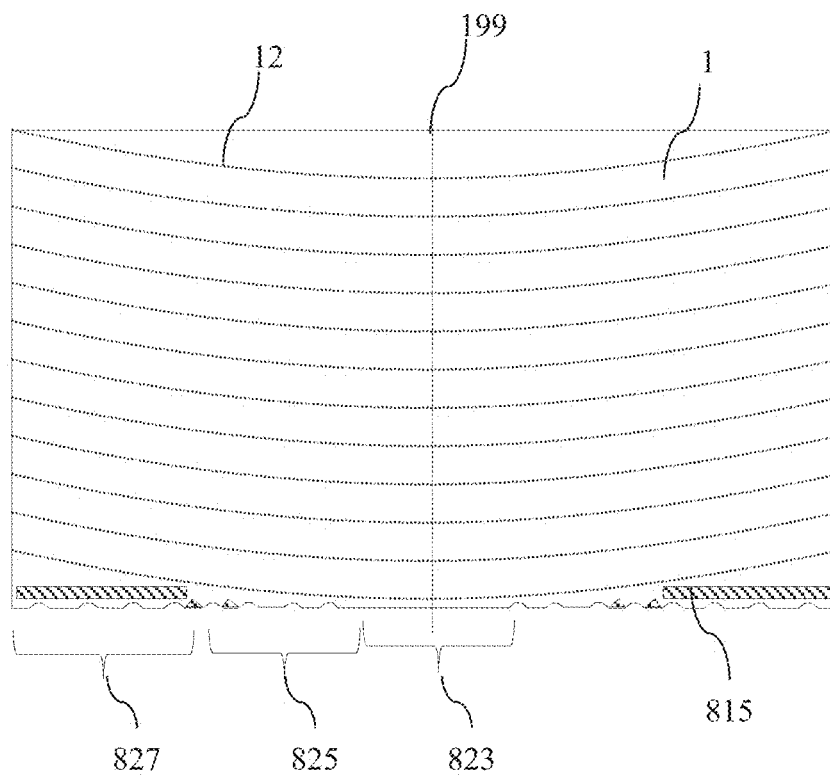
FIG. 26G is a schematic diagram illustrating a top view of the arrangement of strips on a waveguide, in accordance with the present disclosure.

FIG. 26G is a schematic diagram illustrating a top view of the arrangement of strips 815 on a waveguide 1. Said part of the first or second guide surface 6, 8 along which the strip 815 extends may be offset from the center (that may be the optical axis 199) of the input surface 2. Advantageously the efficiency of light input at the input end 2 for central light sources of the array 15 in regions 823 near the optical axis 199 is not reduced by the strip 815. The strips 815 may be arranged in the outer regions 827 which contribute to the luminance of the privacy mode in off axis viewing positions. In intermediate regions 825 strips 815 such as those shown in FIG. 26F may be arranged to reduce reflections from the input side 2 while minimizing input light loss from the LEDs, thus increasing wide angle mode efficiency but reducing luminance for intermediate positions in privacy mode of operation.

The strip 815 may be an adhesive tape or may be an adhesive material. For example the strip 815 may comprise a pressure sensitive adhesive (PSA), an optically clear adhesive (OCA) tape such as 3M™ Optically Clear Double-Sided Acrylic Adhesive Tape. Alternatively the strip 815 may comprise a cured liquid crystal material such as but not limited to UV or thermally cured resin materials. The optical properties of such materials will be described further herein.

It would further be desirable to achieve accurate and stable mechanical alignment of the light sources to the input side.

The strip 815 will now be described further with reference to FIG. 26D. A directional backlight may further comprise a support 816 which supports the array of light sources and has a portion 813 extending past the input surface 2 of the waveguide 1 across the first or second guide surface 6,8 of the waveguide 1, and wherein the at least one strip 815 comprises at least one strip adhered to the support 816 and to one of the first guide surface 6 and the second guide surface 8 of the waveguide 1 for holding the waveguide in position relative to the light sources of the array 15 supported on the support 816.

Advantageously privacy mode performance may be improved, and light sources aligned to the input of the waveguide 1 using the same strip 815, further achieving reduced cost and complexity.

The strip 815 may be adhered to the support 816 and to the first or second guide surface 6, 8 of the waveguide 1.

A directional backlight may further comprise at least one further strip 815*b* provided on the other of the first guide surface 6 and the second guide surface 8 of the waveguide 1 and extending therealong adjacent the input surface 2, the further strip 815*b* also being arranged to absorb light rays 806 incident thereon from inside the waveguide 1.

The at least one strip may comprise at least one strip 815*b* adhered to the first guide surface 6 and at least one strip 815 adhered to the second guide surface 8 of the waveguide 1.

The absorption of light rays 806 will now be described.

The strip 815 may be absorptive of light, whereby the strip reduces reflection of light incident thereon from inside the waveguide 1 by absorbing that light. For example, the strip 815*b* may comprise absorptive particles in its bulk. The strip may be absorptive of light throughout the wavelength range of the light from the array of light sources. For example a black pigment or dye may be incorporated in the strip 815*b*.

As illustrated by strip 815*c* the strip may be transmissive of light, whereby the strip reduces reflection of light incident thereon from inside the waveguide 1 by coupling that light out of the waveguide 1.

It may be desirable to provide further control of the light extraction from the strip 815.

In operation, light rays that are output in a normal direction may propagate at angle 831 within the waveguide with respect to the x axis at angles in the cone +/−20 degrees for example. Such rays may be reflected by the input to output in unwanted privacy directions. It would thus be desirable to reduce rays that are close to the x-axis.

The strip may have a refractive index that differs from the refractive index of the waveguide by no more than 0.02.

In an illustrative example, the waveguide may have a refractive index of 1.50 and the strip may have a refractive index of 1.48. The critical angle at the interface of the strip 815 and the waveguide 1 may be 80 degrees, so that only +/−10 degree light cone will be maintained within the waveguide by the interface. Rays from the waveguide 1 that have a small deflection in the vertical direction and output to off axis directions may be attenuated by the strip 815 and thus the privacy mode luminance may be reduced.

It would be advantageous to minimize the complexity of the support 816. The support may be a flexible printed circuit (FPC). The FPC may comprise the electrical connections to the array of light sources. Advantageously the cost and complexity of the support 816 may be reduced.

The support 816 may comprise an absorptive material. For example the support 816 may be an FPC that comprises a black solder mask layer. Light that is transmitted by strip 815 is incident on the black material on the support and absorbed.

It may be desirable to provide heat flow path and rigidity to the assembly of light source array 15, FPC 816 and waveguide 1.

Figure 26H:
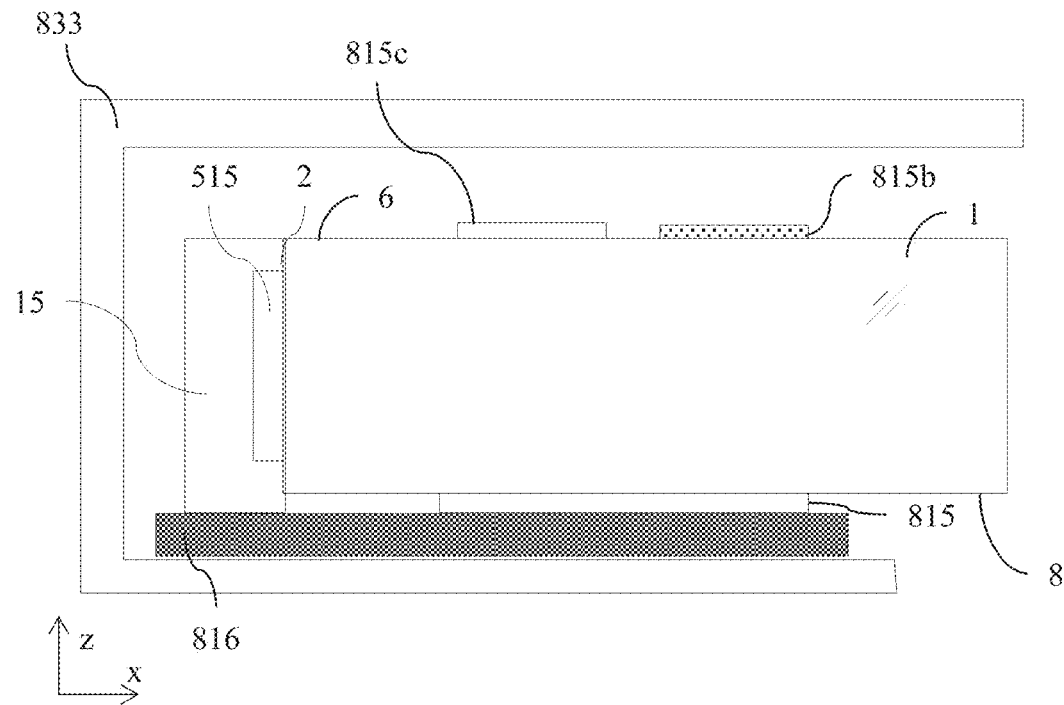
FIG. 26H is a schematic diagram illustrating in side view a directional backlight that further comprises a rigid holder portion to which the support is attached, in accordance with the present disclosure.

FIG. 26H is a schematic diagram illustrating in side view a directional backlight that further comprises a rigid holder portion 833 to which the support 816 is attached. The holder portion 833 may comprise a frame such as an aluminum or steel frame material. The holder may be anodized or black coated to reduce light scatter.

Figure 26I:
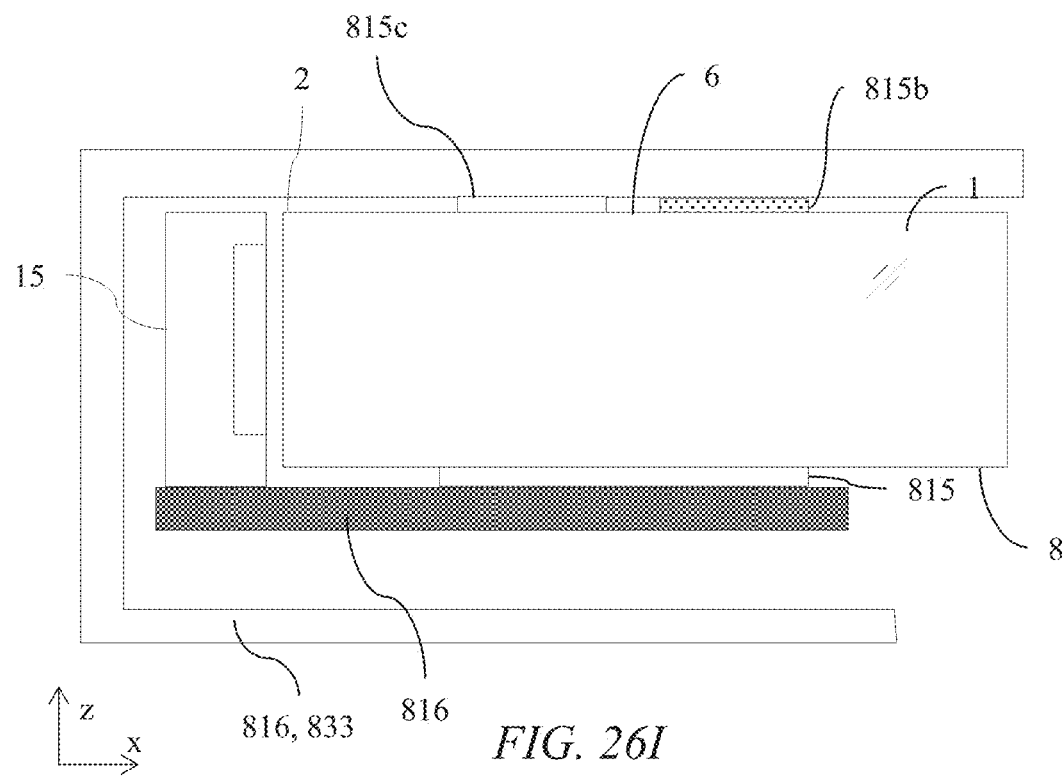
FIG. 26I is a schematic diagram illustrating in side view a directional backlight that illustrates that the support may be a rigid holder portion, in accordance with the present disclosure.

FIG. 26I is a schematic diagram illustrating in side view a directional backlight that illustrates that the support 816 may be a rigid holder portion 833.

The directional backlight may further comprise a resilient member 920 provided behind the light sources and resiliently biasing the light sources towards the waveguide 1 as will be described in further detail herein.

It may be desirable to provide preferential extraction of reflected light without the complexity of strip 815 and that can be provided during moulding of the waveguide 1.

Figure 26J:
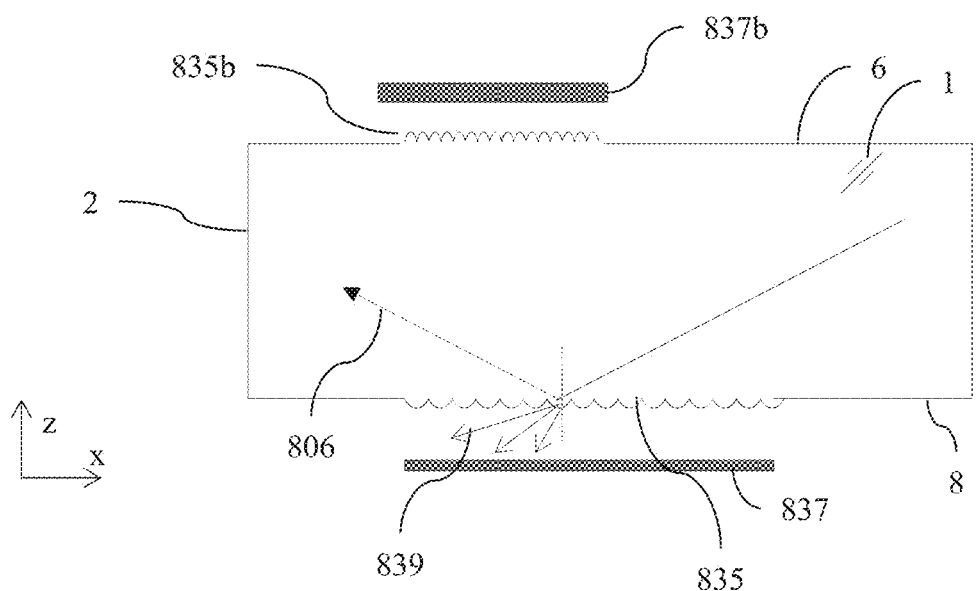
FIG. 26J and FIG. 26K are schematic diagrams illustrating in side and top views a directional backlight comprising diffusive light extraction regions that may be on the first guiding surface and and/or second guiding surface, in accordance with the present disclosure.
Figure 26K:
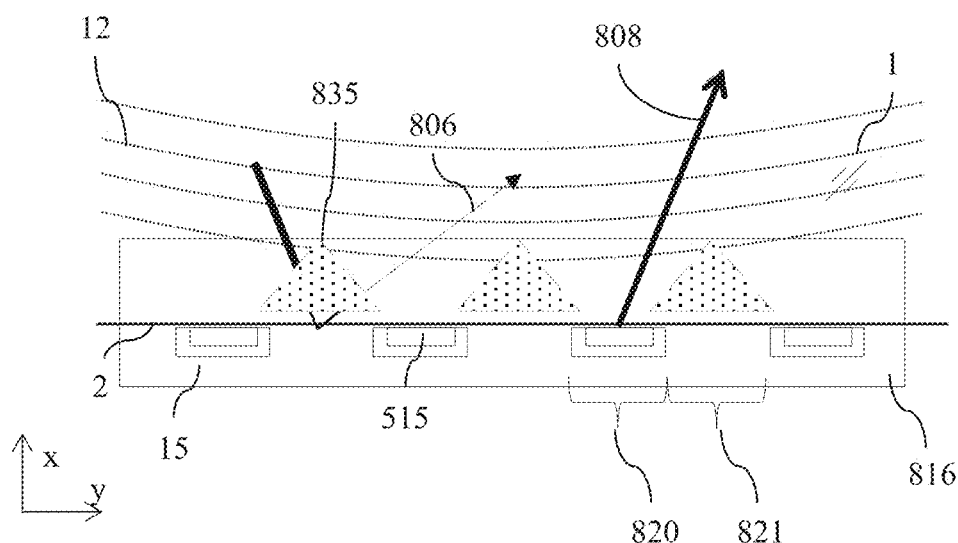

FIGS. 26J-K are schematic diagrams illustrating in side and top views a directional backlight comprising diffusive light extraction regions 835, 835b that may be on the first guiding surface 6 and and/or second guiding surface 8. Light rays 839 may be scattered onto absorber 837, 837b. Diffusing regions may for example comprise microstructured elements that may be provided by diamond tooling or laser engraving of a moulding tool.

Privacy performance may be improved while maintaining input light efficiency. Further complexity of assembly may be reduced. Absorbers 837 may for example comprise a black solder mask on an FPC or blackened surface of a substrate such as a rigid holder 833.

Figure 26L:
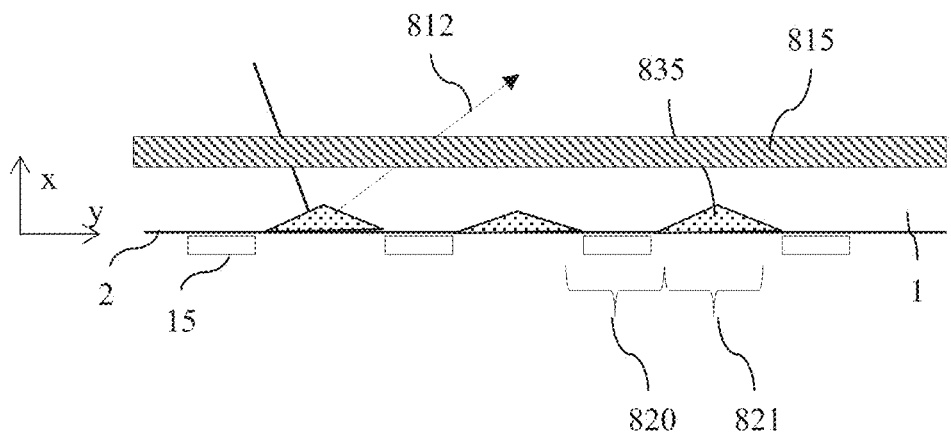
FIG. 26L, FIG. 26M, and FIG. 26N are schematic diagrams illustrating in top view further arrangements of strips and diffusing regions, in accordance with the present disclosure.
Figure 26M:
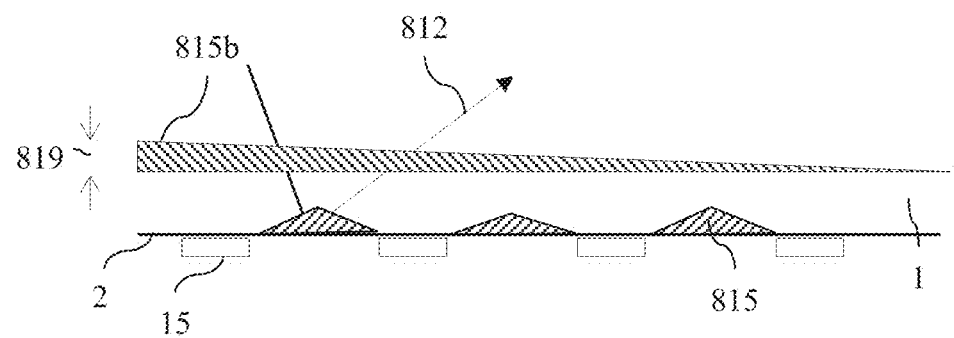
Figure 26N:
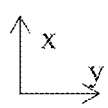
Figure 26N:
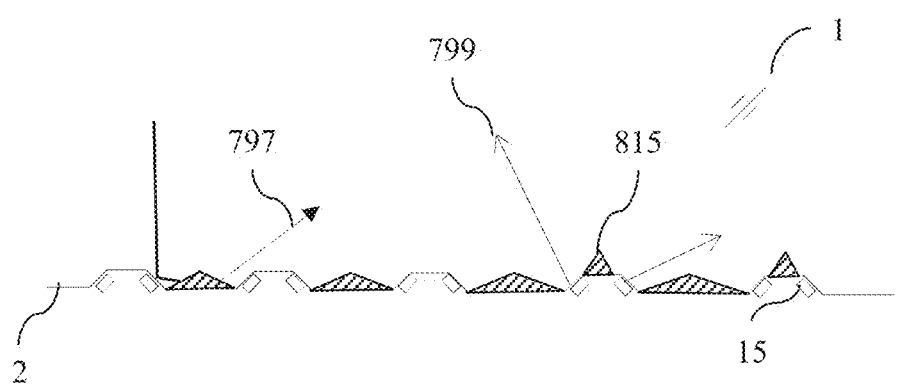

FIGS. 26L-N are schematic diagrams illustrating in top view further arrangements of strips 815 and diffusing regions 835. FIG. 26L illustrates an arrangement to reduce reflections in region 821 while providing some improvement from the strip 815 in region 820.

FIG. 26M illustrates that the trade-off between Privacy and input efficiency can be adjusted by varying the width 819 of the strips 815 in the lateral direction. Strips 815 and regions 835 may be arranged on the same or different guiding surfaces 6, 8 of the waveguide 1.

FIG. 26N illustrates that triangular strips 815 may be provided between "Mayan" LEDs to optimize output of rays 799 while minimizing reflection of rays 797. Mayan LEDs are typically arranged in outer regions 827 of waveguide 1 as illustrated in FIG. 26G and are advantageous for optimizing wide angle uniformity. However such structures have an increased reflectivity due to total internal reflection from the inclined surfaces and are positioned at locations to provide off axis illumination of the display. Thus the present embodiment advantageously improves privacy performance while allowing efficient illumination in wide angle mode.

It may be desirable to provide the light control advantages described above in arrangements wherein the width of the printed circuit has a small width.

Figure 26P:
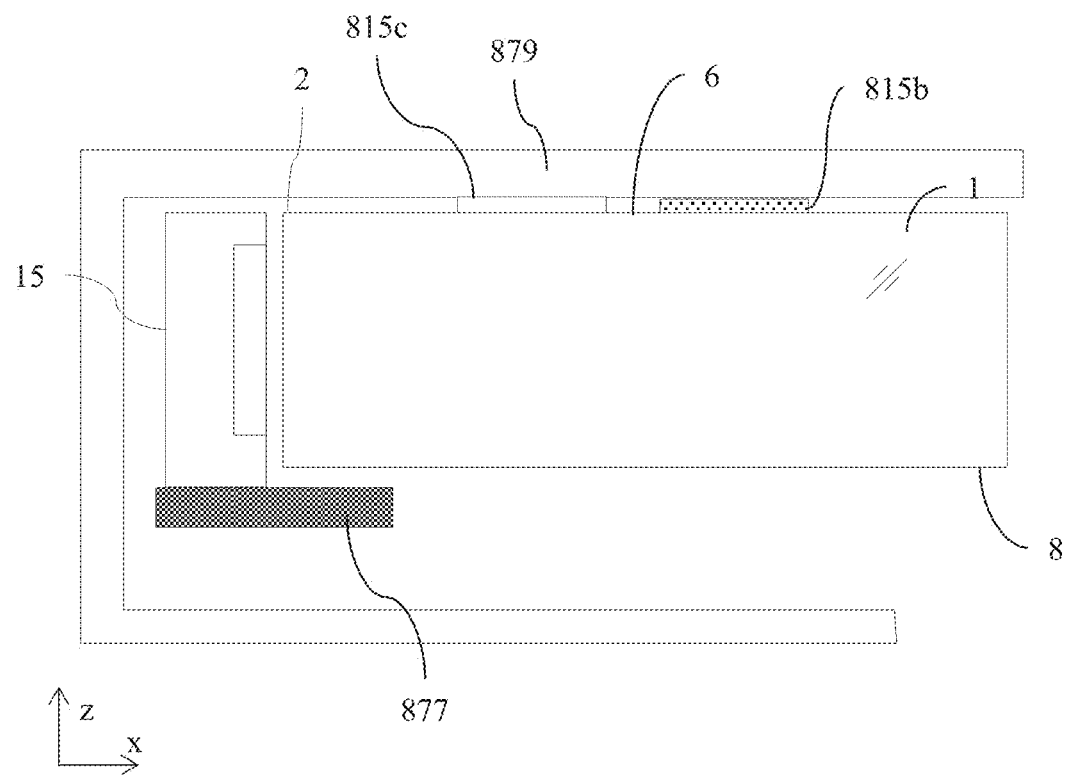
FIG. 26P is a schematic diagram illustrating in side view a directional backlight that further comprises a rigid holder portion to which the waveguide is attached, in accordance with the present disclosure.

FIG. 26P is a schematic diagram illustrating in side view a directional backlight that further comprises a rigid holder portion to which the waveguide 1 is attached. Printed circuit 877 may be provided with a low width that is not large enough to support sufficient width of strips 815. Strips 815c, 815b may be arranged in contact with holder 879. Advantageously smaller width FPC may be used.

Figure 27:
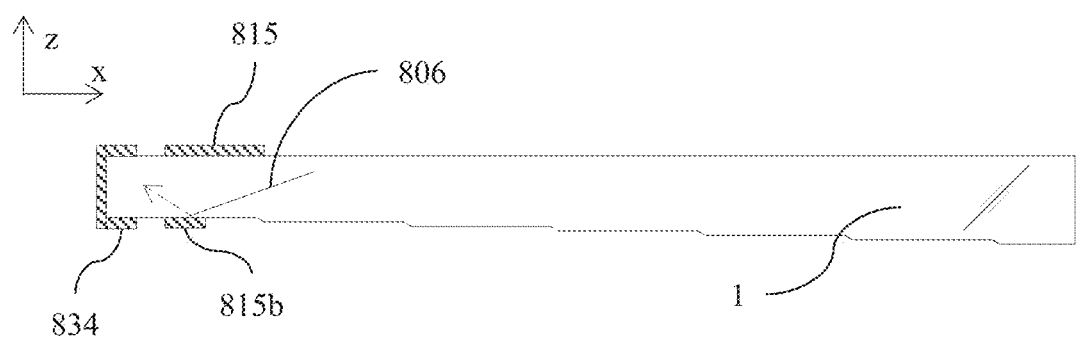
FIG. 27 is a schematic diagram illustrating in side view a directional backlight comprising further absorptive region on the input side in the region intermediate the light sources of the array, in accordance with the present disclosure.

FIG. 27 is a schematic diagram illustrating in side view a directional backlight comprising further absorptive region 834 on the input side in the region 821 intermediate the light sources of the array. Absorptive region may be provided by a tape or paint for example. Advantageously reflection from the input side can further be reduced and privacy mode performance increased.

The appearance and formation of input light streaks and hotspots will now be described.

Figure 28A:
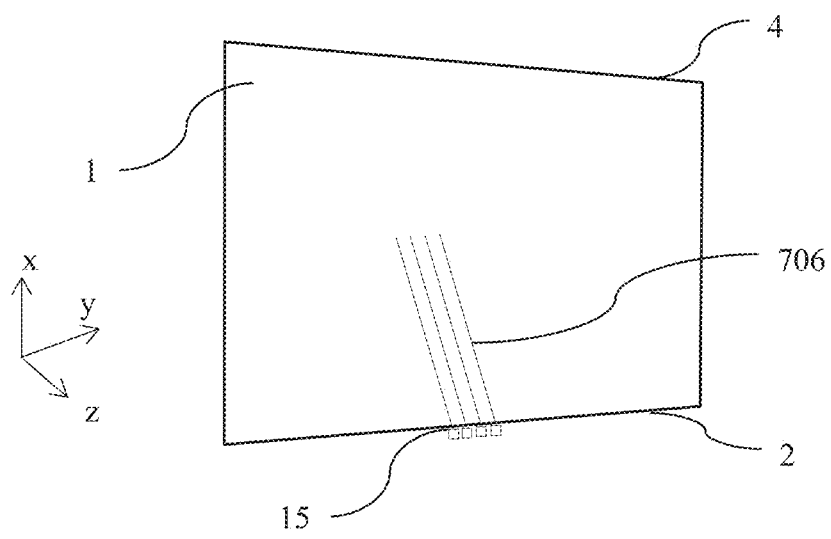
FIG. 28A is a schematic diagram illustrating a perspective front view of light streaking in a directional waveguide, in accordance with the present disclosure.

FIG. 28A is a schematic diagram illustrating a perspective front view of light streaking in a directional waveguide. Viewed from an off-axis viewing positions, particularly in Privacy mode of operation, streaks 706 may be visibility to an observer. Such streaks are associated with each light source of the array 15 of light sources and are inclined with a tilt that is directed from the center to a location to the near side of the reflective end, indicating that the origin of the light streak is for light that is propagating from the input end 2 to the reflective end 4.

One origin of light streaks 706 will now be described.

Figure 28B:
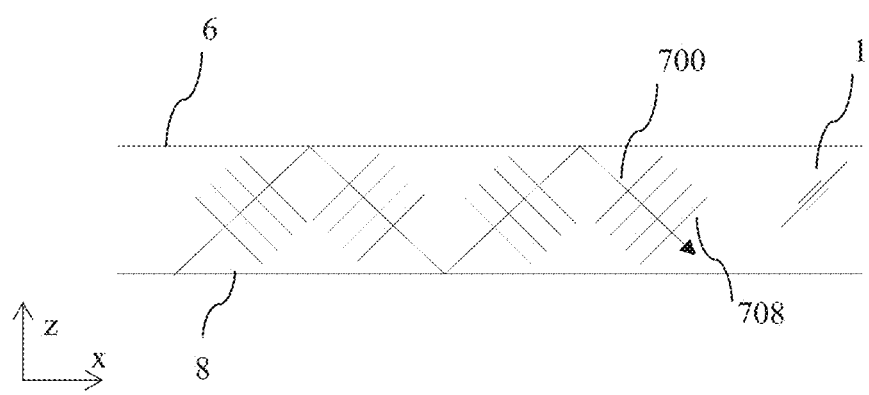
FIG. 28B is a schematic diagram illustrating in side view the propagation of light waves in a planar waveguide, in accordance with the present disclosure.

FIG. 28B is a schematic diagram illustrating in side view the propagation of light waves in a planar waveguide. Light rays 700 may be represented by wave fronts 708 propagating with the waveguide 1. When the surfaces 6, 8 are smooth then light does not escape the waveguide 1 and light streaks 706 are not created.

Figure 28C:
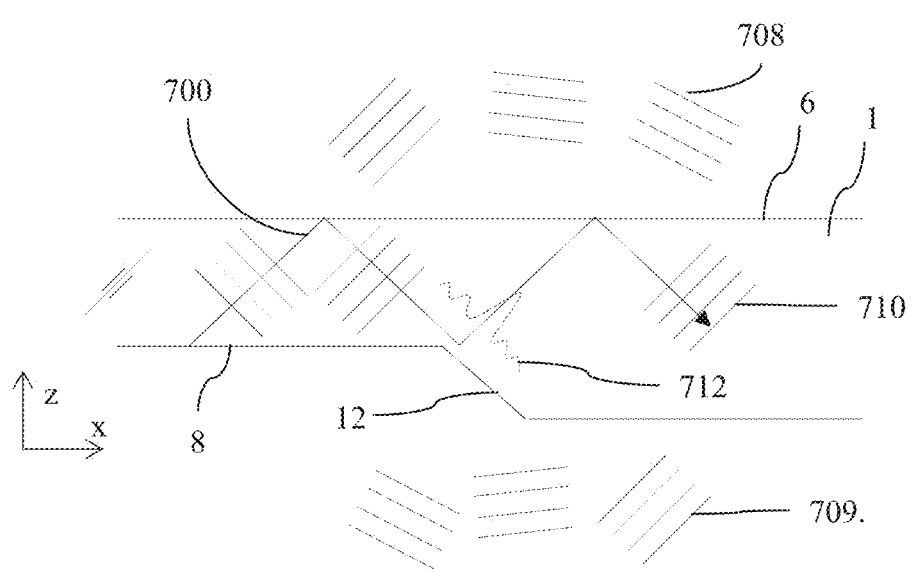
FIG. 28C is a schematic diagram illustrating in side view the propagation of light waves in a waveguide comprising an extraction feature, in accordance with the present disclosure.

FIG. 28C is a schematic diagram illustrating in side view the propagation of light waves in a waveguide comprising an extraction feature 12. The phase step at the extraction feature creates a diffraction effect such that wavefronts 708, 709 are created that may escape the waveguide, with an angular profile 712 that varies with direction of the ray 712. Thus diffraction at the feature 12 may create a light loss, the light may create streak 706.

Figure 28D:
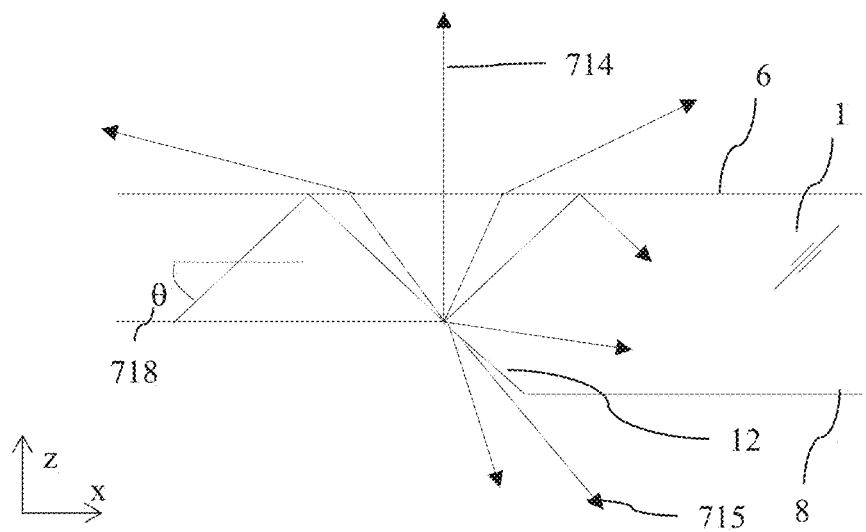
FIG. 28D is a schematic diagram illustrating in side view the propagation of light rays in a waveguide comprising an extraction feature, in accordance with the present disclosure.

FIG. 28D is a schematic diagram illustrating in side view the propagation of light rays in a waveguide comprising an extraction feature. Thus the diffracted waves 708, 709 may be represented by rays 714, 715.

Figure 29:
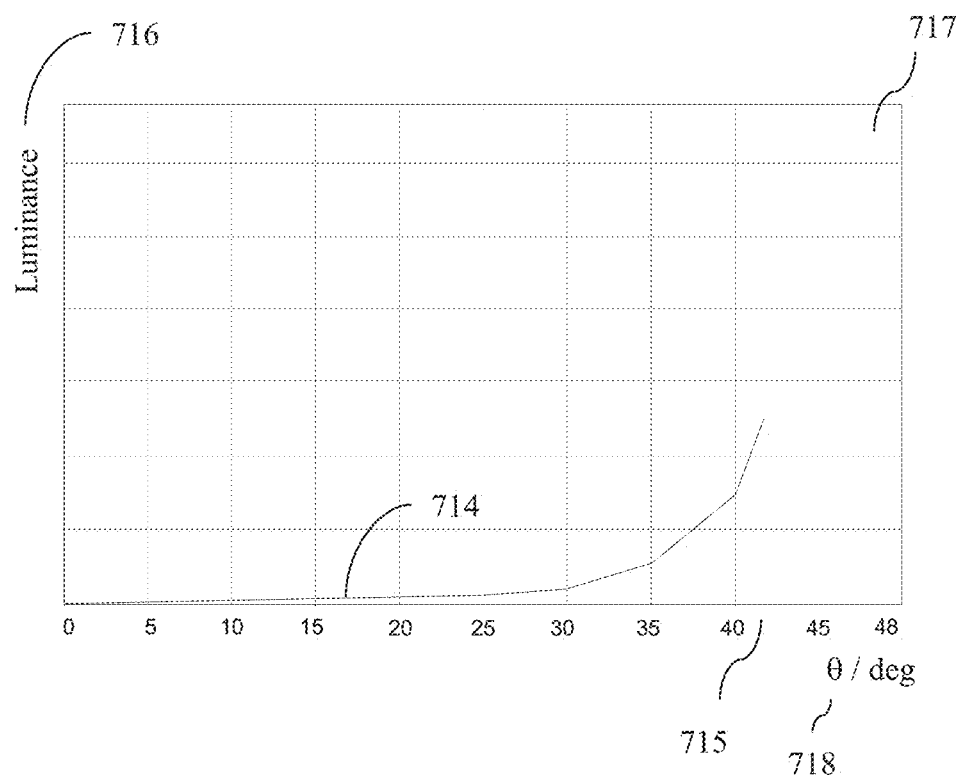
FIG. 29 is a schematic diagram illustrating a graph of extracted luminance at an extraction feature against angle of light rays within the waveguide, in accordance with the present disclosure.

FIG. 29 is a schematic diagram illustrating a graph of simulated extracted luminance 716 at an extraction feature 12 against angle θ, 718 of light rays within the waveguide 1. Thus at angles that are close to direct through the waveguide then very little light is diffracted by the extraction features 12. However, as the angle increases then the intensity of light extracted increases. In particular at angles close to the critical angle at the surfaces 6, 8 make the greatest contribution to diffracted light.

Another origin of light streaks 706 will now be described.

Figure 30A:
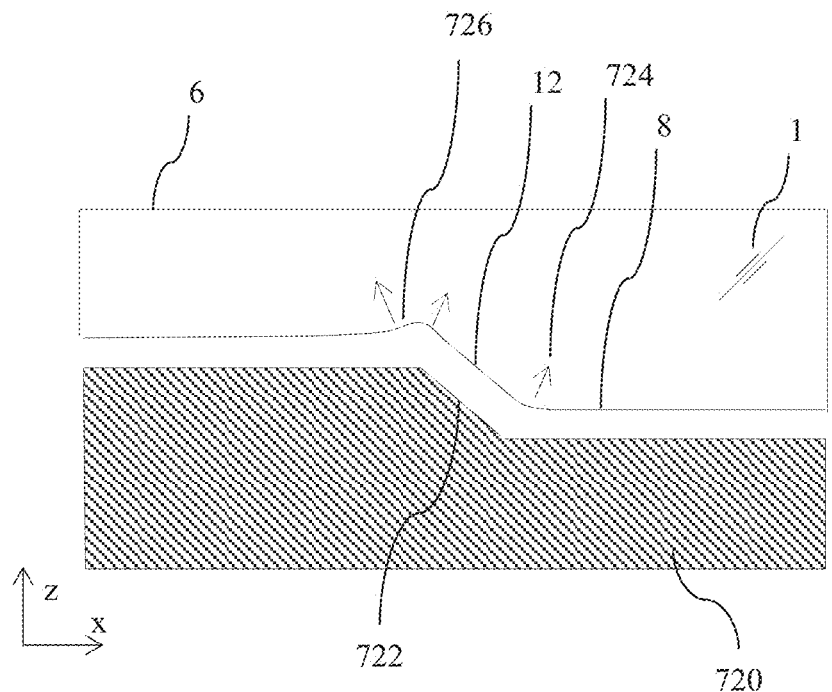
FIG. 30A is a schematic diagram illustrating in side view the moulding of an extraction feature, in accordance with the present disclosure.

FIG. 30A is a schematic diagram illustrating in side view the moulding of an extraction feature. Tool 720 that may have a sharply defined extraction feature surface 722 may be used to provide an injection moulded waveguide 1. During the cure of the injected transparent polymer material, differential shrinkage 724 may occur at the sharp features of the tool, such that rounded cusp 724 and facet dip 726 may be formed.

Figure 30B:
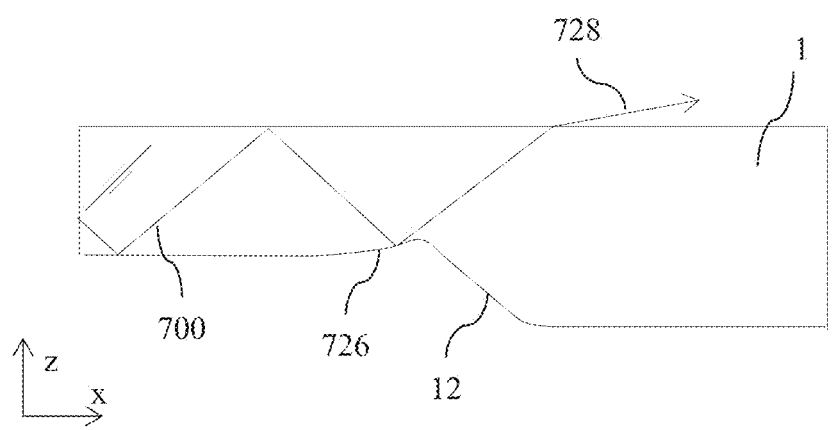
FIG. 30B is a schematic diagram illustrating in side view light extraction from a light extraction feature comprising a facet dip, in accordance with the present disclosure.

FIG. 30B is a schematic diagram illustrating in side view light extraction from a light extraction feature comprising a facet dip 726. In operation high angle light rays 728 that are incident on the facet dip may have an angular deflection that creates extraction from the waveguide at high angle, that may create input light streaks 706.

It may be desirable to reduce the appearance of light streaks by preferential removal of high angle light rays within the waveguide.

Figure 31A:
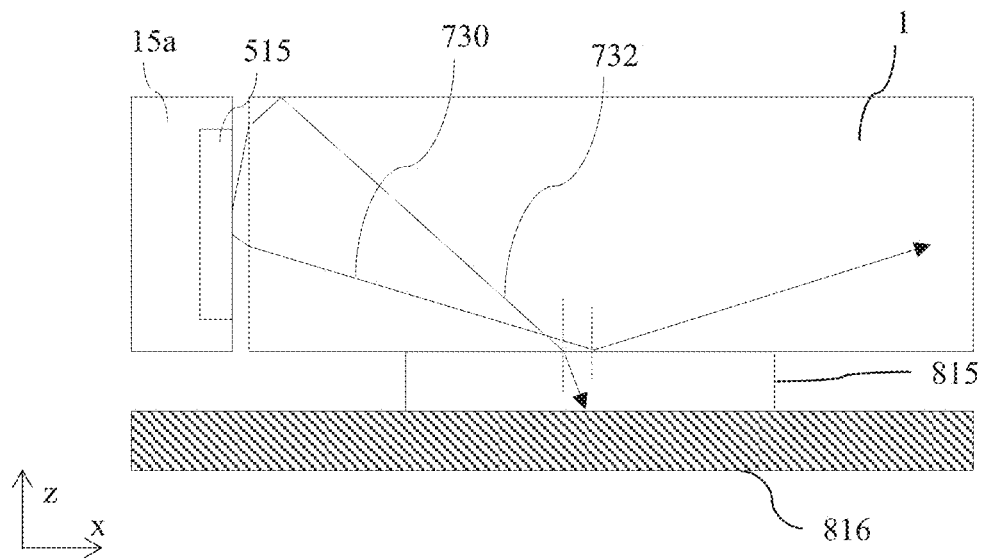
FIG. 31A is a schematic diagram illustrating in side view preferential extraction of high angle light in a waveguide, in accordance with the present disclosure.

FIG. 31A is a schematic diagram illustrating in side view preferential extraction of high angle light rays in a waveguide. Strip 815 may be provided with a refractive index that differs from the refractive index of the waveguide 1 by no less than 0.08. To continue the previous illustrative embodiment, the refractive index of the strip may be 1.42, providing a critical angle of 71° and a propagating cone angle of +/−19° for rays 730 in the waveguide 1. Higher angle rays such as shown by ray 732 are extracted and may be absorbed at the support 816 for example as described above.

More preferably the refractive index difference may be 0.14 or greater and most preferably 0.19 or greater, so that the cone angle of the light that remains trapped in the waveguide is increased, particularly for light that escapes in the normal direction. Such refractive index step can be provided for example by UV curable materials with refractive indices in the range 1.30 to 1.35.

Figure 31B:
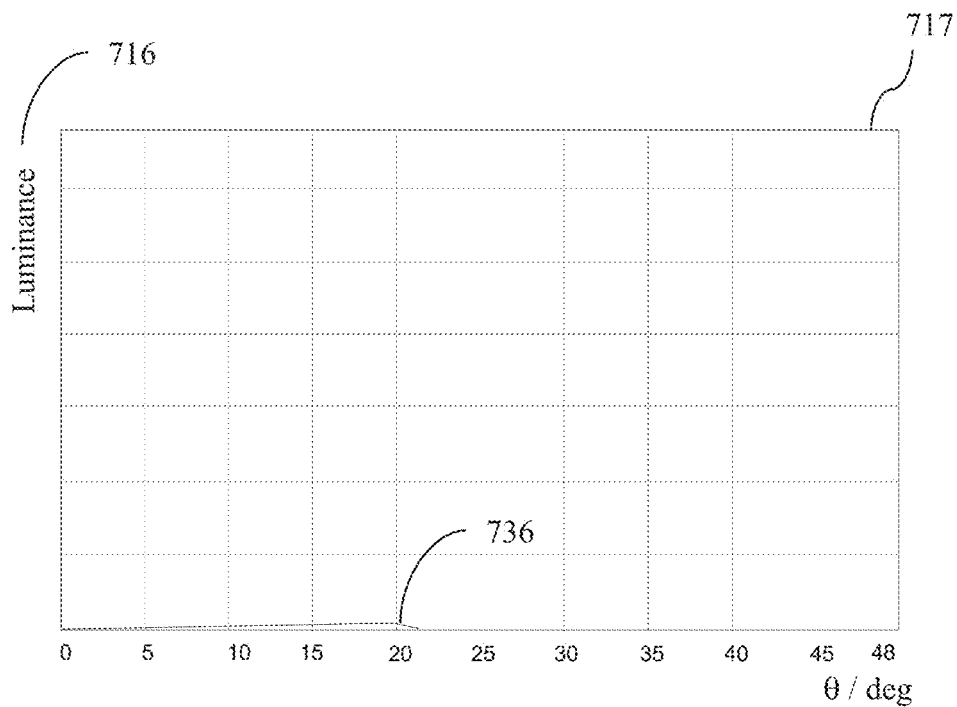
FIG. 31B is a schematic diagram illustrating a graph of extracted luminance at an extraction feature against angle of light rays within the waveguide of FIG. 31A, in accordance with the present disclosure.

FIG. 31B is a schematic diagram illustrating a graph of extracted luminance at an extraction feature against angle of light rays within the waveguide of FIG. 31A. Thus profile 736 for light rays may be substantially reduced, minimizing streak 706 visibility. Further light rays 728 that are extracted by facet dip are stripped from the waveguide near the light sources and so do not contribute to high angle light streaks 706.

Advantageously light streak appearance can be minimized.

It may be desirable to provide a uniform strip width 819.

Figure 31C:
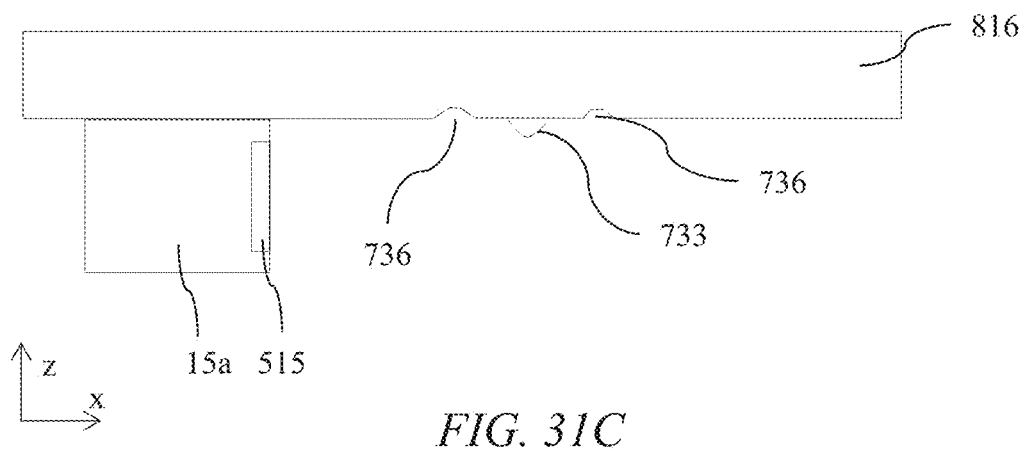
FIG. 31C and FIG. 31D are schematic diagrams illustrating in side view provision of a uniform width strip, in accordance with the present disclosure.
Figure 31D:
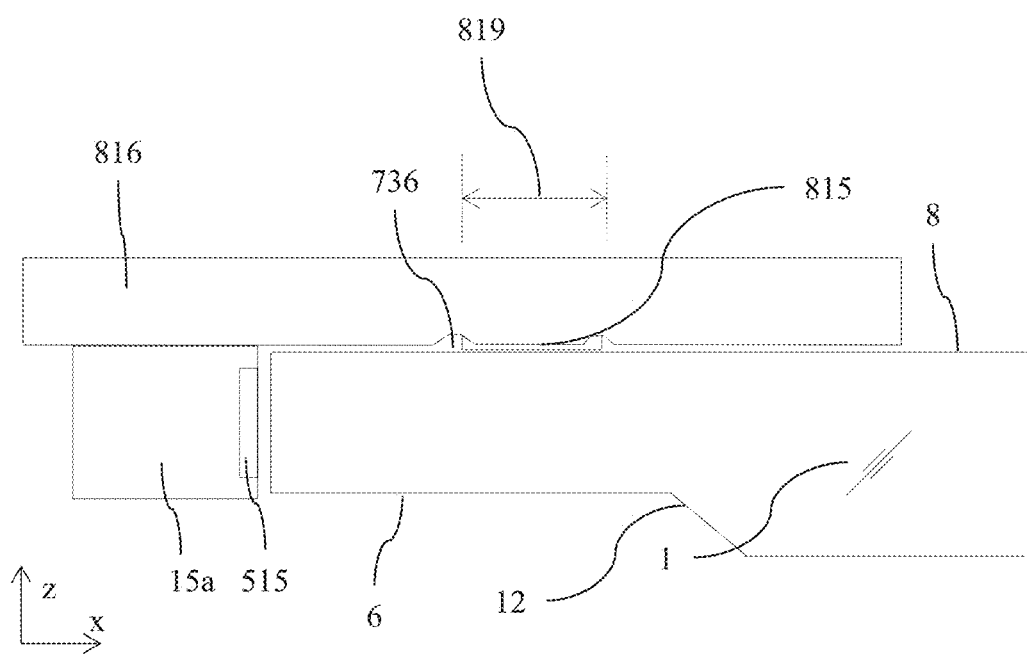

FIGS. 31C-D are schematic diagrams illustrating in side view provision of a uniform width strip. In a first step support 816 may be provided with dips 736 and a curable low index material 733 may be provided on the support 816 between the dips. In a second step waveguide 1 may be aligned to the array 15 and pushed against the support 816 to provide a thin layer of material 733. Excess material may be squeezed into the dips 736, and thus the width 819 of the strip 815 is determined by the separation of the dips 736. The material 733 may be cured by UV irradiation to provide strip 815. Advantageously a uniform width strip 815 may be provided.

It may be desirable to remove light streaks 706 for central light sources in region 823 while providing low reflectivity in outer regions. 827

Figure 32:
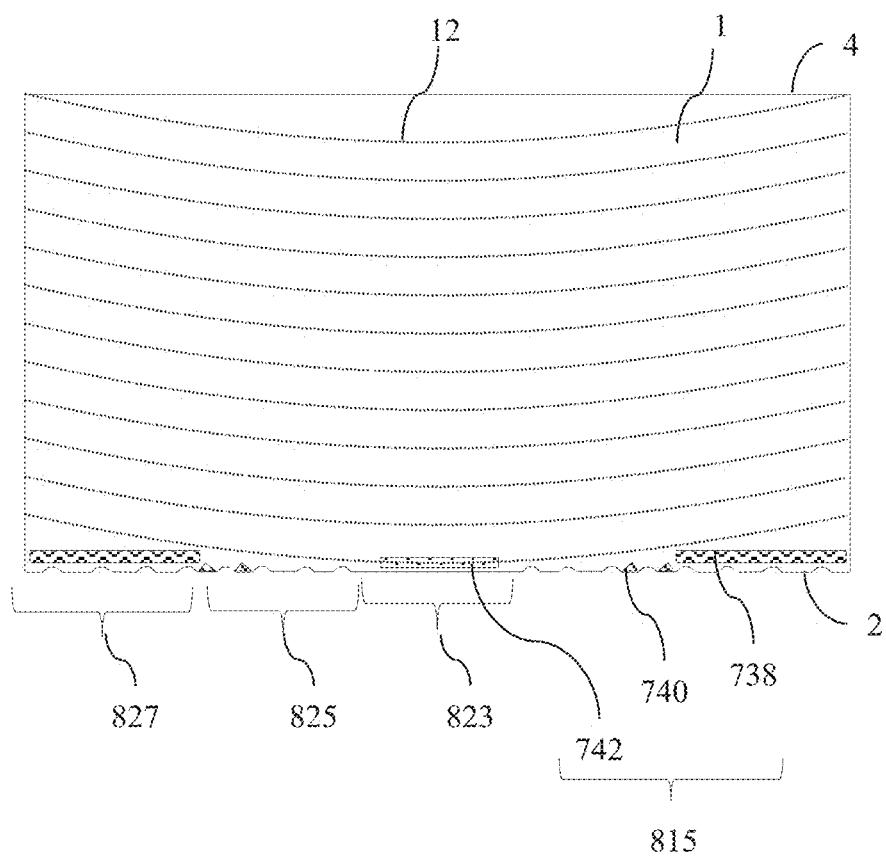
FIG. 32 is a schematic diagram illustrating in top view different strips aligned with a lateral array of light sources, in accordance with the present disclosure.

FIG. 32 is a schematic diagram illustrating in top view different strips aligned with a waveguide 1 input side 2. In an illustrative example, outer regions 738 may comprise a 3 mm width continuous strip of optically clear adhesive tape with refractive index 1.50. In intermediate region 825, triangular portions 740 may be arranged with the same adhesive tape arranged between light sources. In inner region 823 a UV cured optically clear adhesive with refractive index 1.30 may be arranged of 0.5 mm width. Thus said part of the first or second guide surface along which the strip extends across the center of the input surface.

Advantageously privacy levels, head on luminance and wide angle uniform can be optimized.

It would further be desirable to provide identification marking for purposes of monitoring the process conditions for fabrication of the waveguide 1.

Figure 33A:
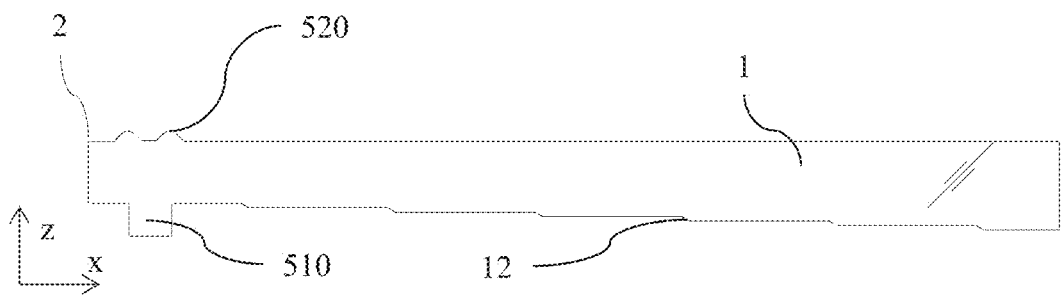
FIG. 33A is a schematic diagram illustrating a side view of a directional waveguide comprising identification markings, in accordance with the present disclosure.

FIG. 33A is a schematic diagram illustrating a side view of a directional waveguide comprising identification markings. The surface relief feature may thus be an identification mark 520.

Figure 33B:
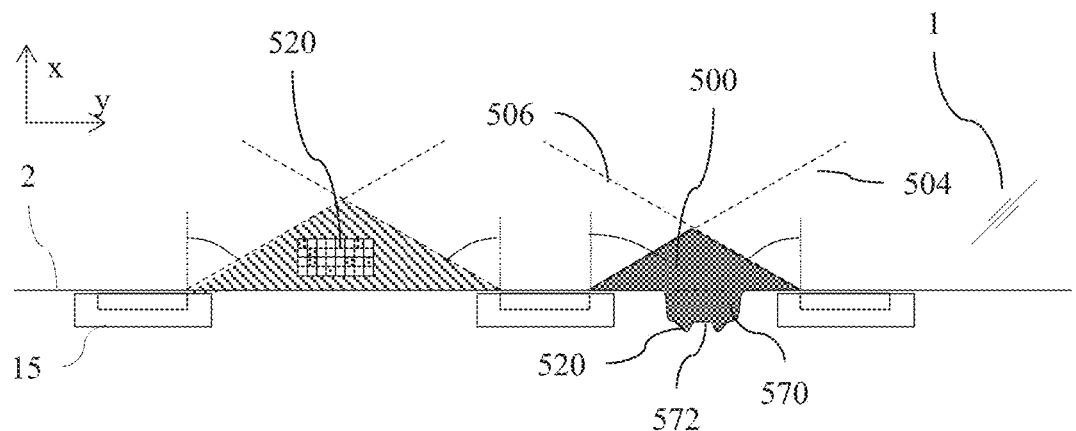
FIG. 33B is a schematic diagram illustrating a front view of the input of light into a directional waveguide and bounding regions for surface relief and printed identification features, further comprising protrusions from the input surface, in accordance with the present disclosure.

FIG. 33B is a schematic diagram illustrating a front view of the input of light into a directional waveguide and bounding regions for surface relief and printed identification features.

Figure 33C:
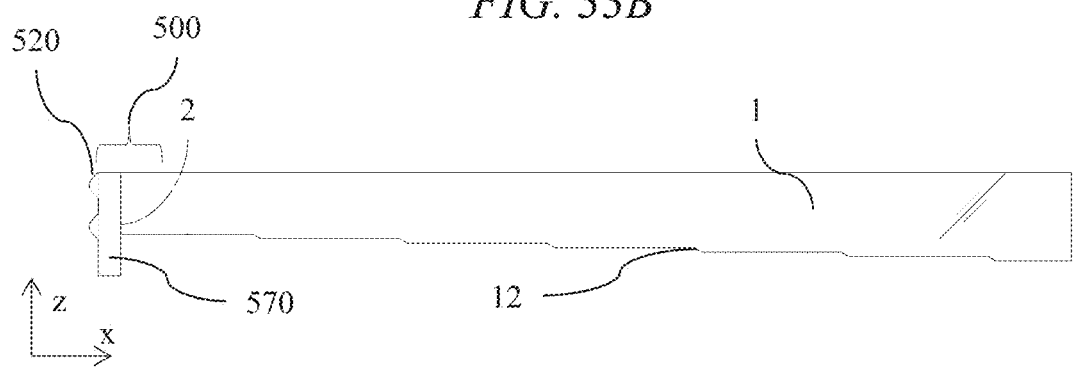
FIG. 33C is a schematic diagram illustrating a side view of a directional waveguide comprising identification markings and further protrusions, in accordance with the present disclosure.

FIG. 33C is a schematic diagram illustrating a side view of a directional waveguide comprising identification markings and further protrusions. Thus the waveguide 1 further comprises at least one surface relief feature 570 formed on the input surface 2 intermediate the light emitting regions of the light sources 15.

Thus the feature 520 may further by arranged in region 500. Advantageously waveguide 1 may be moulded with identification marks 520 to record its design and manufacturing conditions. Such identification marks may create waveguide losses that improve privacy performance but do not degrade uniformity characteristics. Such identification marks can be arranged further in cooperation with scattering marks in region 500 to increase scatter and light losses in such regions, advantageously improving privacy performance by reducing cross talk from reflected light from side 2.

The waveguide 1 may further comprise at least one surface relief feature 570 formed on the input surface 2 and intermediate the light emitting regions of the light sources 15a-n. The feature 570 may comprise further identification marks 520 that may be on the surface 6, surface 8, or may have surface relief in the x direction as shown in FIG. 33C.

The protrusion may thus extend into the waveguide as defined by region 500 and may extend rearwards from the surface 2. Advantageously the size of the region 500 may be increased and the size and strength of protrusion 570 can be increased. Further the area for identification marks 520 can be increased to improve visibility and ease of providing marks on the tool.

It may be desirable to record the metallization and waveguide 1 properties by printing onto the coated waveguide 1.

Figure 33D:
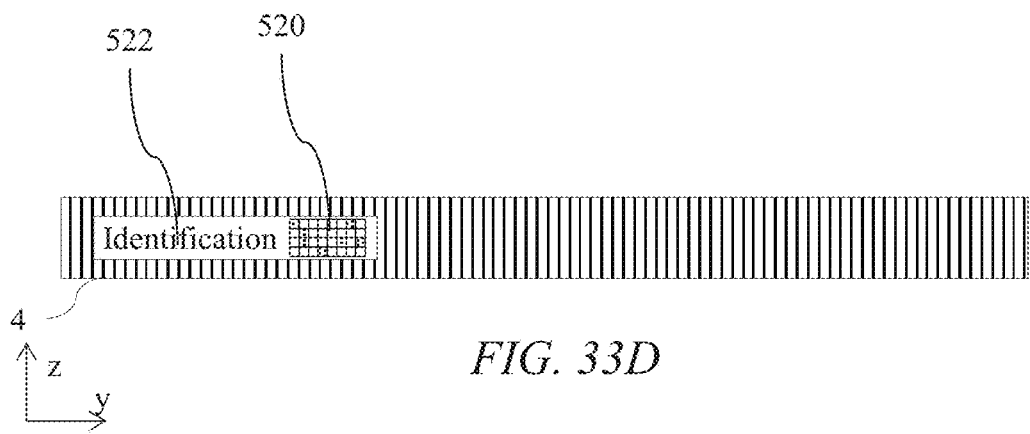
FIG. 33D is a schematic diagram illustrating a top view of a metallized reflector of a directional waveguide comprising identification markings, in accordance with the present disclosure.

FIG. 33D is a schematic diagram illustrating a top view of a metallized reflector of a directional waveguide comprising identification markings. Such markings may record optical design, process conditions, metal conditions, manufacturer and other information including alphanumeric characters 422 and barcodes 520 for example. Advantageously such markings can be provided on the metal of the reflective end, thus do not impact the optical performance of the waveguide 1. By providing access ports in mechanical mountings, such markings can be visible externally to a liquid crystal module, to achieve rapid diagnosis of failure modes of the backlight during operation.

It may be desirable o provide alignment of waveguide 1 to multiple optical elements.

Figure 34A:
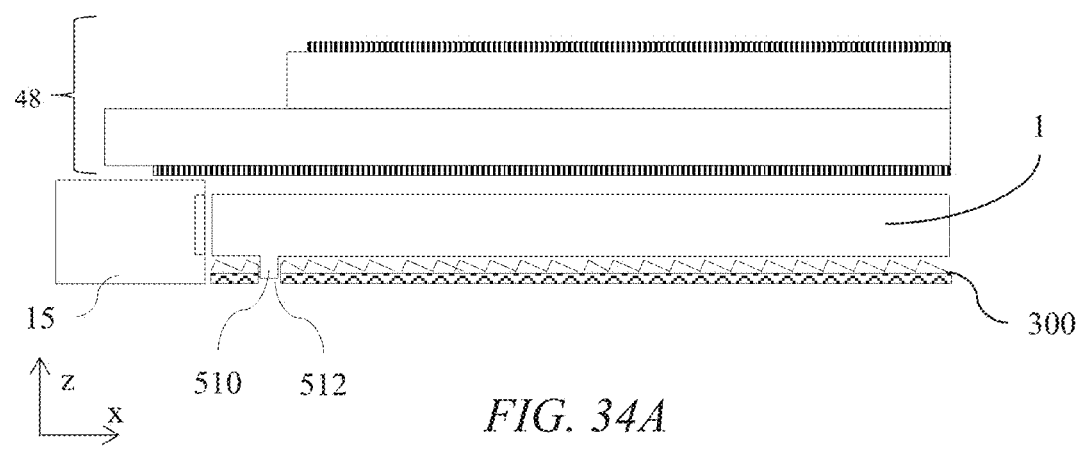
FIG. 34A is a schematic diagram illustrating a side view of a display apparatus comprising alignment of a directional waveguide comprising a male waveguide surface relief alignment feature and a rear reflector, in accordance with the present disclosure.

FIG. 34A is a schematic diagram illustrating a side view of a display apparatus comprising alignment of a directional waveguide comprising a male waveguide surface relief alignment feature and a rear reflector. Thus the surface relief feature 510 may be a mechanical fixing feature.

The directional backlight may further comprise a rear reflector 300 comprising a linear array of reflective facets 302 arranged to reflect light from the light sources, that is transmitted through the second guide surface 8 of the waveguide 1, back through the waveguide 1 to exit through the first guide surface 6, the rear reflector being said further component to which the mechanical fixing feature is fixed. A directional display device may thus comprise a directional backlight and a transmissive spatial light modulator 48 arranged to receive the output light from the waveguide 1, 301 and to modulate it to display an image.

Figure 34B:
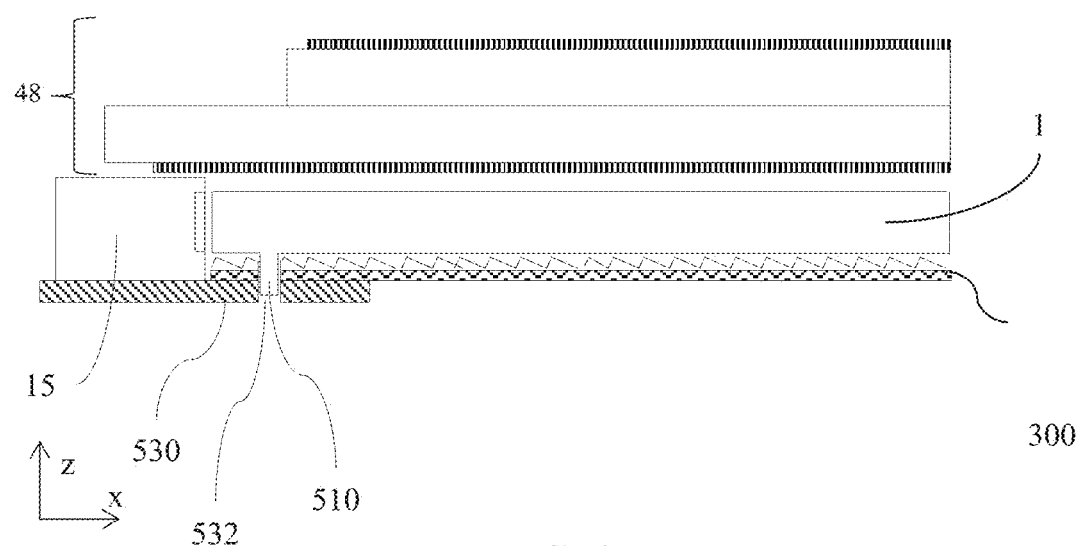
FIG. 34B is a schematic diagram illustrating a side view of a display apparatus comprising alignment of a directional waveguide, a rear reflector and a lightbar comprising an array of light emitting elements and a printed circuit in accordance with the present disclosure.
Figure 34C:
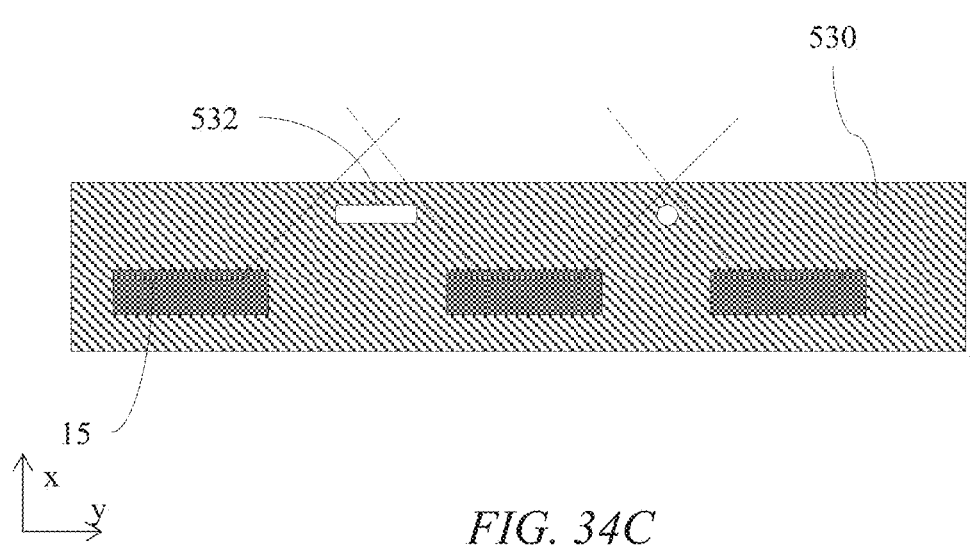
FIG. 34C is a schematic diagram illustrating a top view of a lightbar comprising alignment features, in accordance with the present disclosure.

FIG. 34B is a schematic diagram illustrating a side view of a display apparatus comprising alignment of a directional waveguide, a rear reflector and a lightbar comprising an array of light emitting elements and a printed circuit. FIG. 34C is a schematic diagram illustrating a top view of a lightbar comprising alignment features. The rear reflector 300 may be said further component to which the mechanical fixing feature is fixed. The surface relief feature 510 may be a protrusion. Thus the mechanical fixing feature 510 may be fixed to a further component of the directional backlight such as PCB 530 arranged to provide mounting of array 15 of light sources 15a-n. PCB may have a hole or slot feature 532 arranged to align to feature 510 of the waveguide. Further adhesive may be provided in feature 532 to affix the waveguide to the mechanical components of the backlight.

Figure 35A:
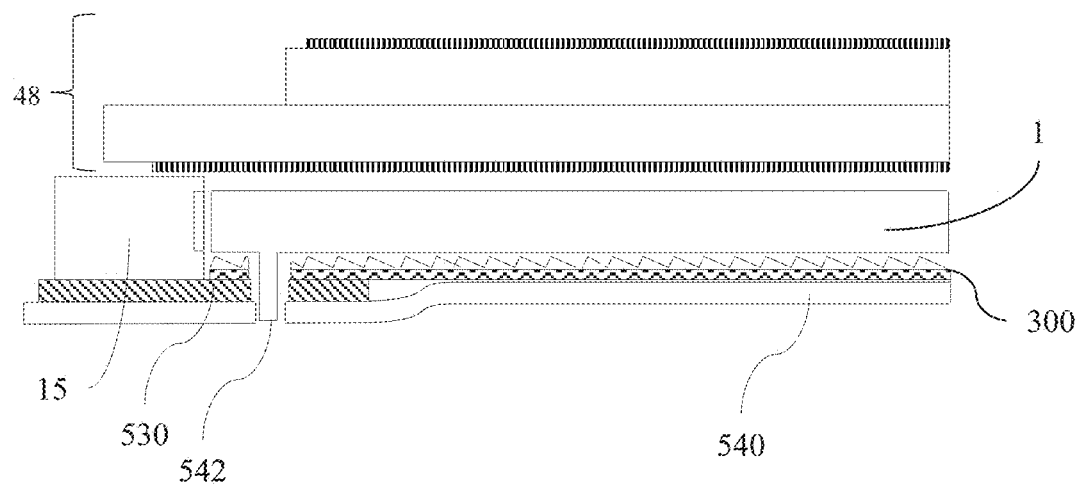
FIG. 35A is a schematic diagram illustrating a side view of a display apparatus comprising alignment of a directional waveguide, a rear reflector, a lightbar comprising an array of light emitting elements and a printed circuit and a rear frame, in accordance with the present disclosure.

FIG. 35A is a schematic diagram illustrating a side view of a display apparatus comprising alignment of a directional waveguide, a rear reflector, a lightbar comprising an array of light emitting elements and a printed circuit and a rear frame 540 with hole feature 542. Advantageously further mechanical stabilization of the mechanical stack can be achieved.

Figure 35B:
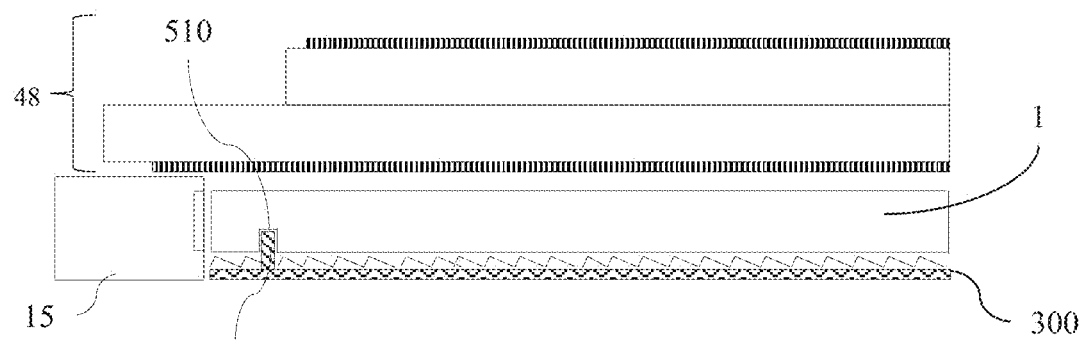
FIG. 35B is a schematic diagram illustrating a side view of a display apparatus comprising alignment of a directional waveguide comprising a female waveguide surface relief alignment feature and a rear reflector with a male surface relief feature, in accordance with the present disclosure.

FIG. 35B is a schematic diagram illustrating a side view of a display apparatus comprising alignment of a directional waveguide comprising a female waveguide surface relief alignment feature and a rear reflector with a male surface relief feature. Thus the surface relief feature 510 may be a recess.

Figure 35C:
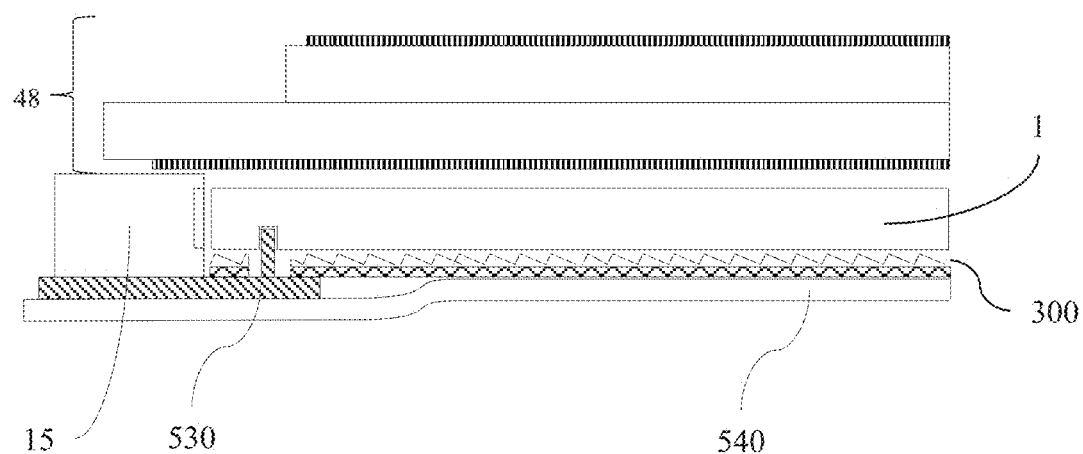
FIG. 35C is a schematic diagram illustrating a side view of a display apparatus comprising alignment of a directional waveguide comprising a female waveguide surface relief alignment feature and lightbar with a male surface relief feature, in accordance with the present disclosure.

FIG. 35C is a schematic diagram illustrating a side view of a display apparatus comprising alignment of a directional waveguide comprising a female waveguide surface relief alignment feature and lightbar with a male surface relief feature 550. Advantageously the strength of the pin feature can be increased in comparison to the material used to form the waveguide 1. Such feature 550 may be further coated to reduced reflectivity in privacy mode of operation.

Figure 36:
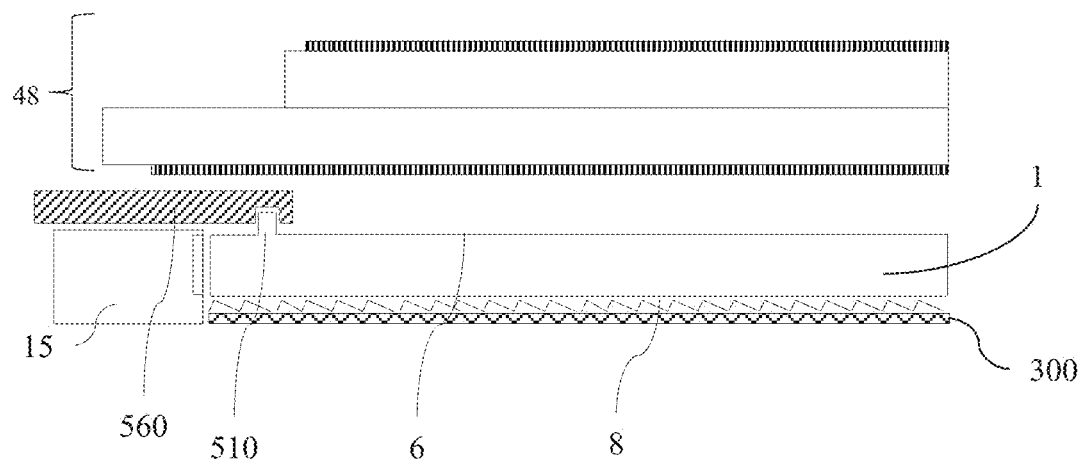
FIG. 36 is a schematic diagram illustrating a side view of a display apparatus comprising alignment of a directional waveguide comprising a male waveguide surface relief alignment feature and an internal frame with a female surface relief alignment feature, in accordance with the present disclosure.
Figure 37:
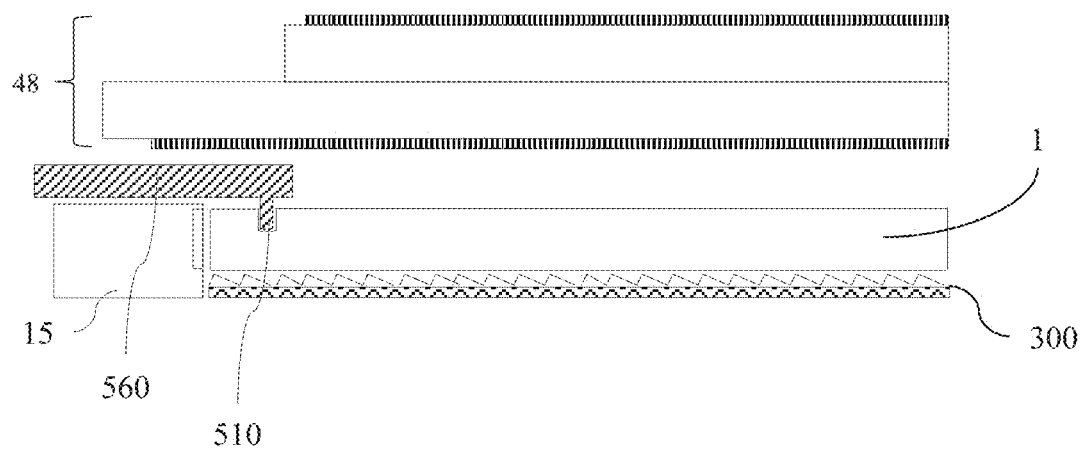
FIG. 37 is a schematic diagram illustrating a side view of a display apparatus comprising alignment of a directional waveguide comprising a female waveguide surface relief alignment feature and an internal frame with a male surface relief alignment feature, in accordance with the present disclosure.

FIG. 36 is a schematic diagram illustrating a side view of a display apparatus comprising alignment of a directional waveguide comprising a male waveguide surface relief alignment feature and an internal frame with a female surface relief alignment feature. FIG. 37 is a schematic diagram illustrating a side view of a display apparatus comprising alignment of a directional waveguide comprising a female waveguide surface relief alignment feature and an internal frame with a male surface relief alignment feature.

Thus the alignment feature may be provided on a side 6 of the waveguide that is opposite the side 8 of the waveguide on which the light extraction features are formed. Advantageously the mechanical alignment feature 510 does not interfere with the rear reflector 300.

Figure 38:
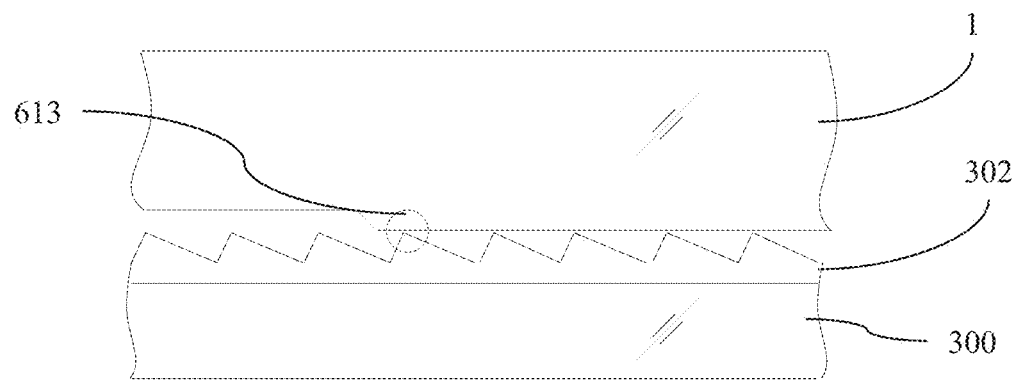
FIG. 38 is a schematic diagram illustrating a side view of a display apparatus comprising a rear reflector in contact with a directional waveguide, in accordance with the present disclosure.

FIG. 38 is a schematic diagram illustrating a side view of a display apparatus comprising a rear reflector in contact with a directional waveguide. It may be desirable to reduce damage to the waveguide 1 and rear reflector 300 from high pressure contact of the tips of the rear reflector microstructure 302 in region 613 for example.

Figure 39:
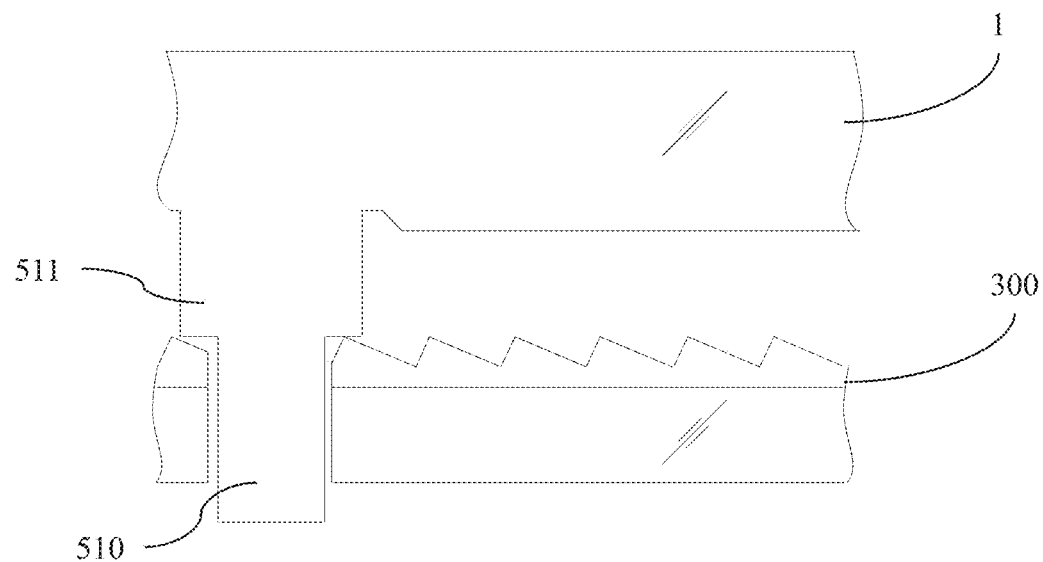
FIG. 39 is a schematic diagram illustrating a side view of a display apparatus comprising a surface relief feature arranged to provide separation of rear reflector and waveguide, in accordance with the present disclosure.

FIG. 39 is a schematic diagram illustrating a side view of a display apparatus comprising a surface relief feature arranged to provide separation of rear reflector and waveguide. Thus feature 510 may comprise further region 511 arranged to rest of the rear reflector 300 and provide gap 570 between the waveguide 1 and rear reflector 300, thus reducing damage to the waveguide 1 and rear reflector 300 during handling.

It may be desirable to minimize damage caused by impact and movement between waveguide 1 and rear reflector 300. In construction, the rear reflector microstructure 302 may be formed from a harder cross-linked material such as an acrylate than the moulded thermoplastic material such as PMMA or polycarbonate that may be used to form the waveguide 1. It may be desirable to provide similar hardness materials adjacent to waveguide 1 and rear reflector 300 to reduce damage between the two components.

Figure 40:
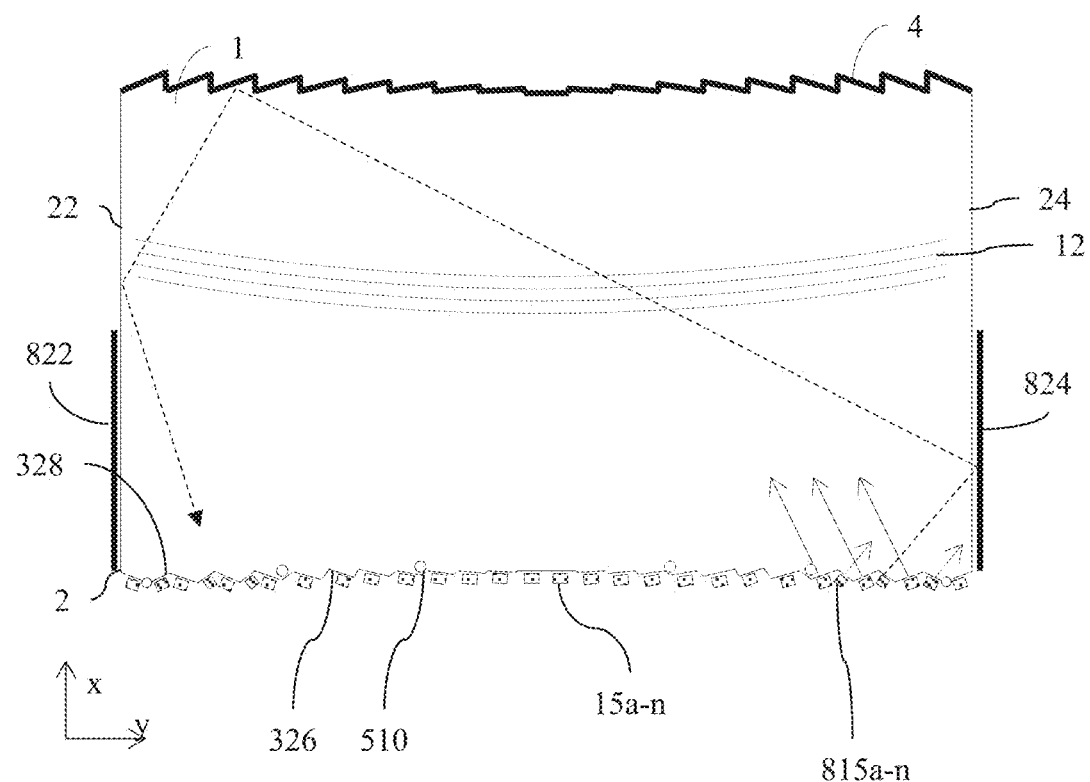
FIG. 40 is a schematic diagram illustrating in front view a directional waveguide and an array of light sources arranged to provide off-axis illumination of voids, in accordance with the present disclosure.

FIG. 40 is a schematic diagram illustrating in front view a directional waveguide and an array of light sources arranged to provide off-axis illumination of voids. Such an arrangement is described further in U.S. Patent Publ. No. 2016/0299281 entitled "Wide angle imaging directional backlights", incorporated herein in its entirety. Light from light sources 15a-n is arranged to provide direct illumination of reflective side 4. Reflected light illuminates extraction features 12 and is extracted to viewing windows 26 (not shown) as described elsewhere herein. For off-axis viewing positions voids are created that provide non-uniformities if not corrected. Voids can be filled by illumination from light source 815a-n by means of reflection from reflector 824. Thus primary input facets 326 and draft facets 328 may be populated by light sources 15a-n, 815a-n respectively.

During thermal cycling of the display the waveguide 1 may expand and contract differentially with respect to the lightbar comprising the arrays of light sources 15, 815. It may be desirable to limit the misalignment between light sources 15, 815 and waveguide 1 during thermal cycling.

Figure 41:
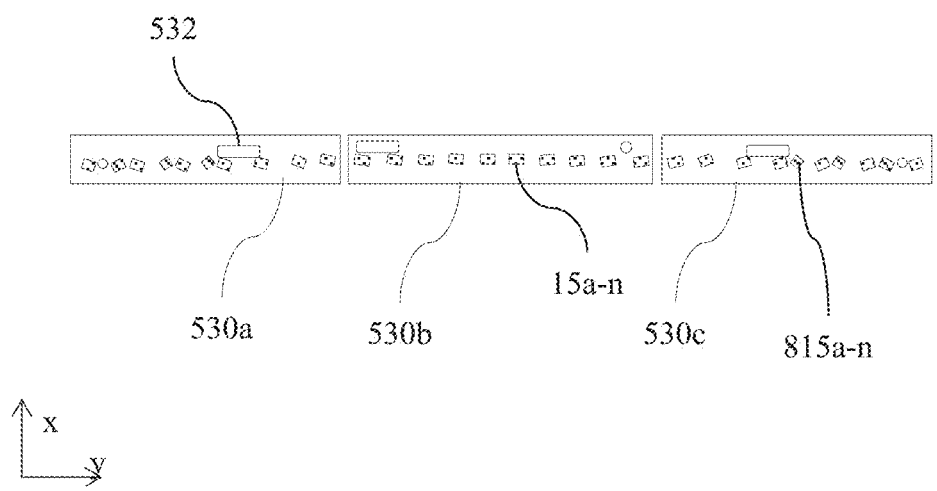
FIG. 41 is a schematic diagram illustrating in front view an array of lightbars for the directional waveguide of FIG. 40, in accordance with the present disclosure.

FIG. 41 is a schematic diagram illustrating in front view an array of lightbars for the directional waveguide of FIG. 40. Lightbars may comprise light source arrays 15, 815 and PCB 530. The PCBs may be continuous or may be divided into separate elements 530a-n. Each PCB 530a-n may comprise alignment features 532 such as holes that align with features 510 in regions 500 of the waveguide 1. In operation relative movement of the light sources 15a-n, 815a-n with respect to the waveguide is reduced while maintaining alignment of the waveguide 1 to the respective light sources. Advantageously the variation of input coupling efficiency and uniformity is minimized during thermal cycling.

It may be desirable to provide adhesive between the waveguide 1 and mechanical structure of the backlight.

Figure 42:
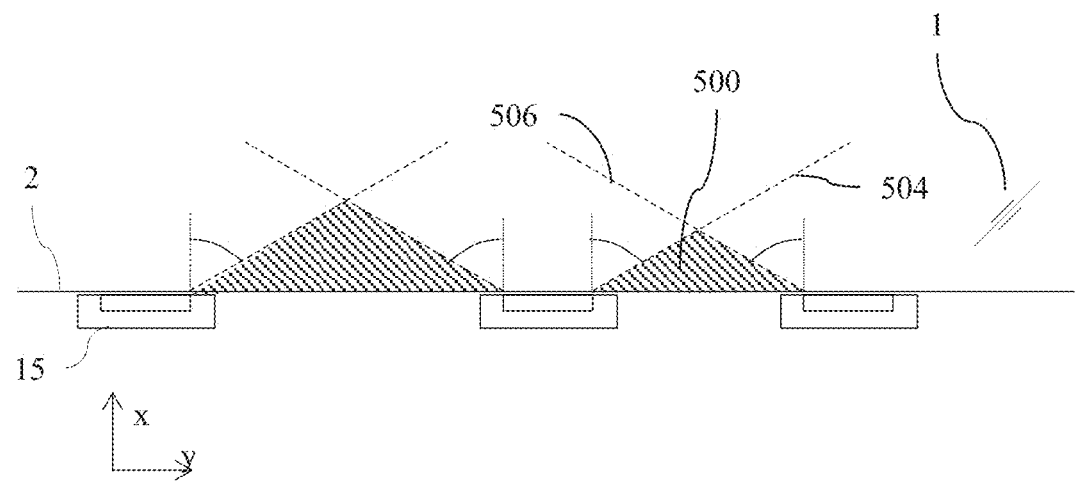
FIG. 42 is a schematic diagram illustrating a front view of the input of light into a directional waveguide and bounding regions for adhesion features, in accordance with the present disclosure.
Figure 43:
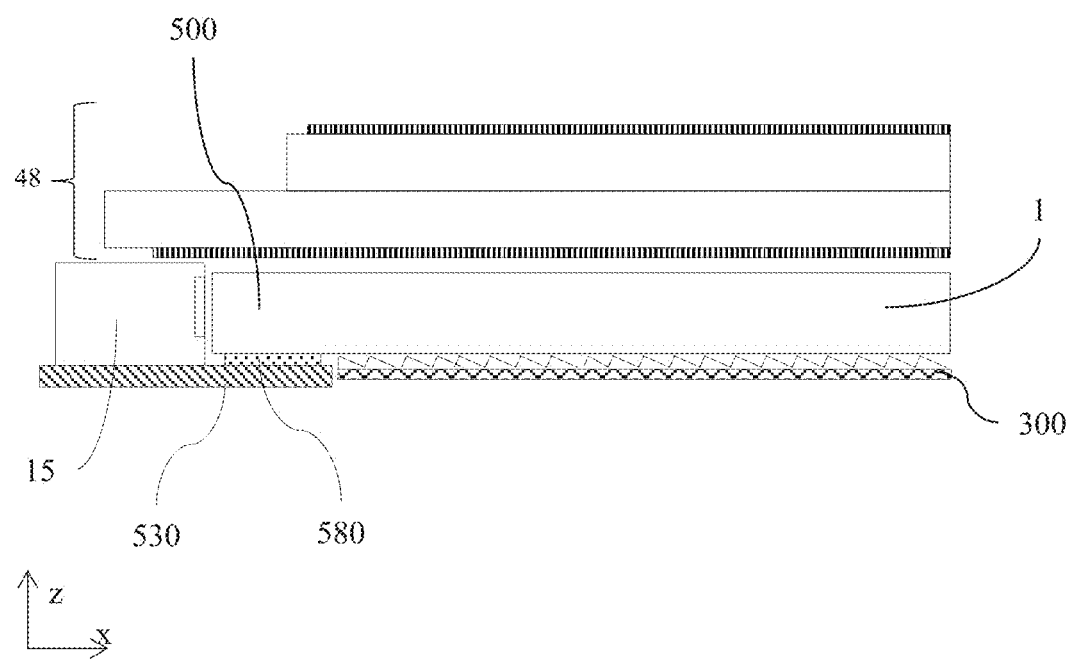
FIG. 43 is a schematic diagram illustrating a side view of a display apparatus comprising attachment of a directional waveguide to a mechanical arrangement comprising adhesion features, in accordance with the present disclosure.

FIG. 42 is a schematic diagram illustrating a front view of the input of light into a directional waveguide and bounding regions for adhesion features. FIG. 43 is a schematic diagram illustrating a side view of a display apparatus comprising attachment of a directional waveguide to a mechanical arrangement comprising adhesion features.

Thus the waveguide 1 further comprises adhesive 580 provided on at least one of the first and second guide surfaces 6,8 in a location within a region 500 bounded by a portion of the input surface 2 intermediate the light emitting regions of a pair of adjacent light sources 15, and a pair of intersecting notional lines 504, 506 that extend from the respective edges of the light emitting regions of the pair of light sources 15 that are adjacent the portion of the input surface 2, to the respective sides of the reflective end 4 that extend between the first and second guide surfaces 6,8.

Thus adhesive 580 may be provided in regions 500 described elsewhere herein. Adhesive arranged outside region 500 may absorb light and create non-uniformities and streaks in optical output. Adhesive 580 may be pressure sensitive adhesive or other types of adhesive material. Advantageously uniformity is maintained while adhesive materials are used, reducing the cost of mechanical alignment.

The moulding of a directional waveguide will now be described.

Figure 44:
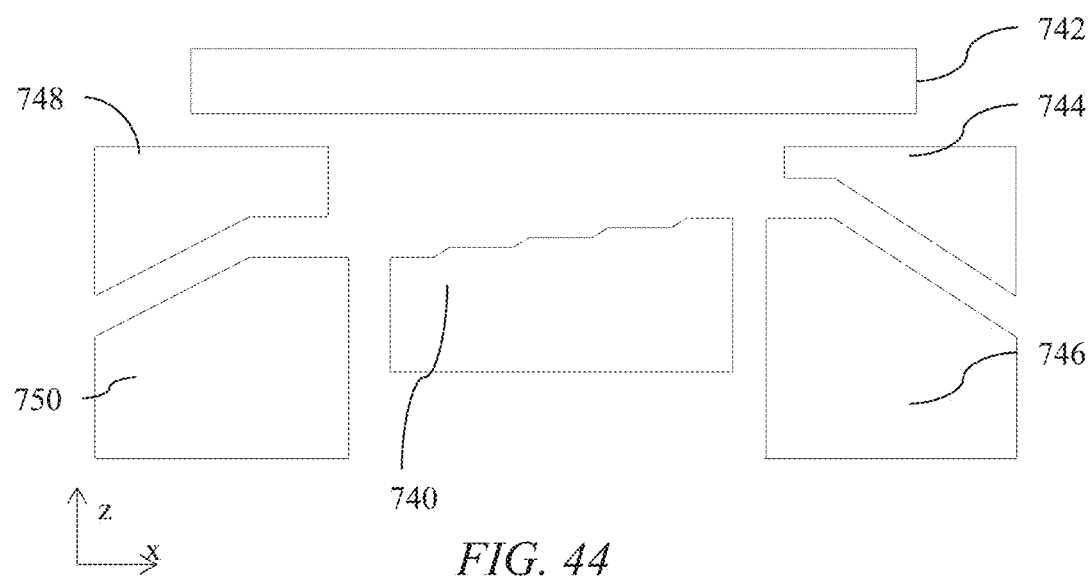
FIG. 44, FIG. 45, and FIG. 46 are schematic diagrams illustrating side views of a moulding method for a directional waveguide, in accordance with the present disclosure.
Figure 45:
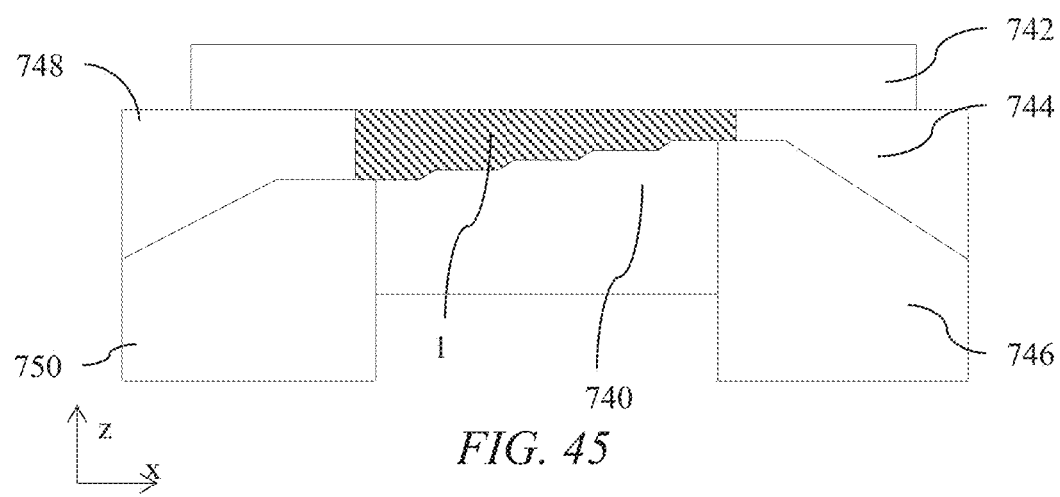
Figure 46:

FIGS. 44-46 are schematic diagrams illustrating side views of a moulding method for a directional waveguide. In a first step a mould is provided comprising core tool 740 (comprising features for the second guiding surface), cavity 742 740 (comprising features for the first guiding surface), input tool 748 and Fresnel mirror tool 744. Further support took 750 may be provided.

After alignment of the respective tools in a first step, in a second step material is injected to form the waveguide 1 and cured for example by cooling, as illustrated in FIG. 45. In a third step the waveguide 1 is extracted from the tool assembly as shown in FIG. 46 and in a fourth step features 752 such as strips 815, identification marks and other layers may be provided.

It may be desirable to incorporate features within the tool to reduce cost and complexity of assembly.

Figure 47:
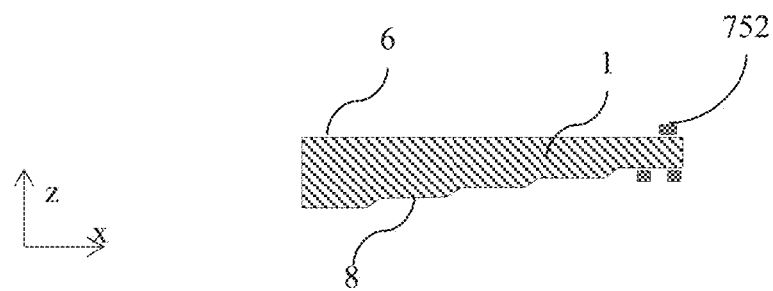
FIG. 47 is a schematic diagram illustrating a side view of a directional waveguide comprising printed identification features, in accordance with the present disclosure.
Figure 48:
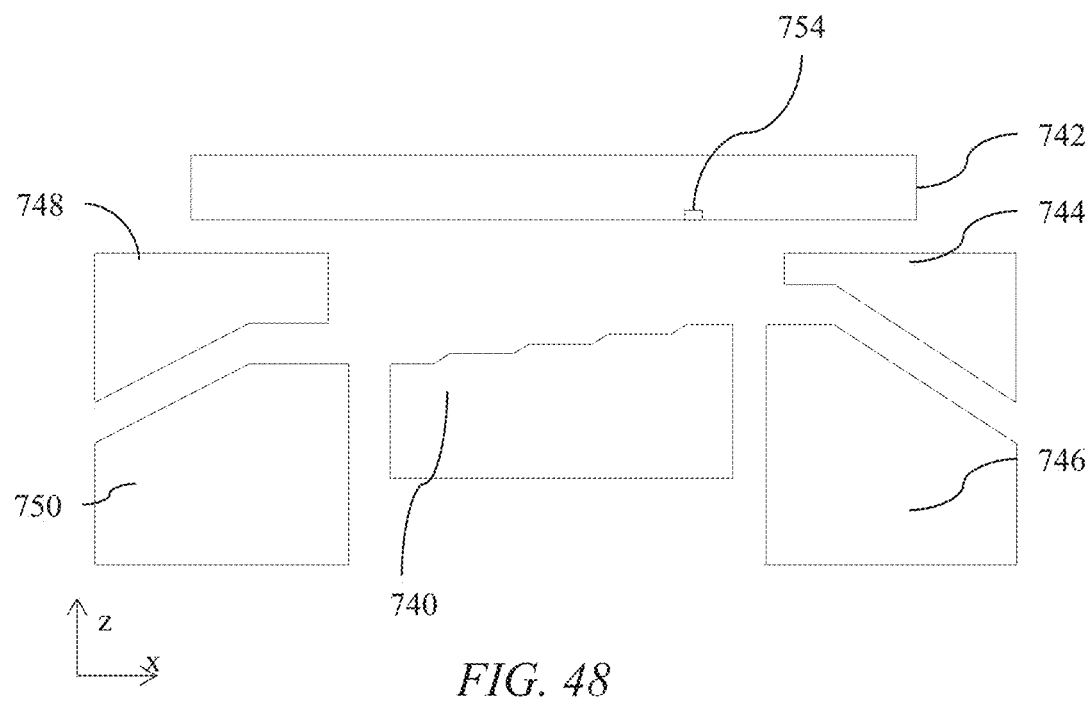
FIG. 48, FIG. 49, and FIG. 50 are schematic diagrams illustrating side views of a moulding method for a directional waveguide comprising mould inserts, in accordance with the present disclosure.
Figure 49:
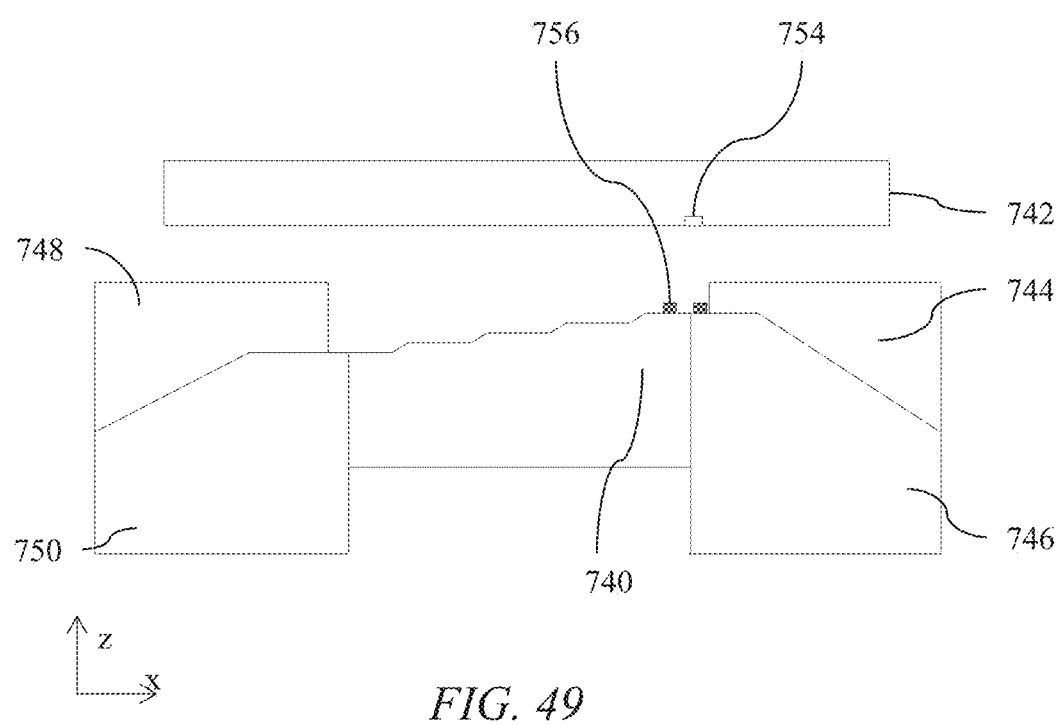
Figure 50:
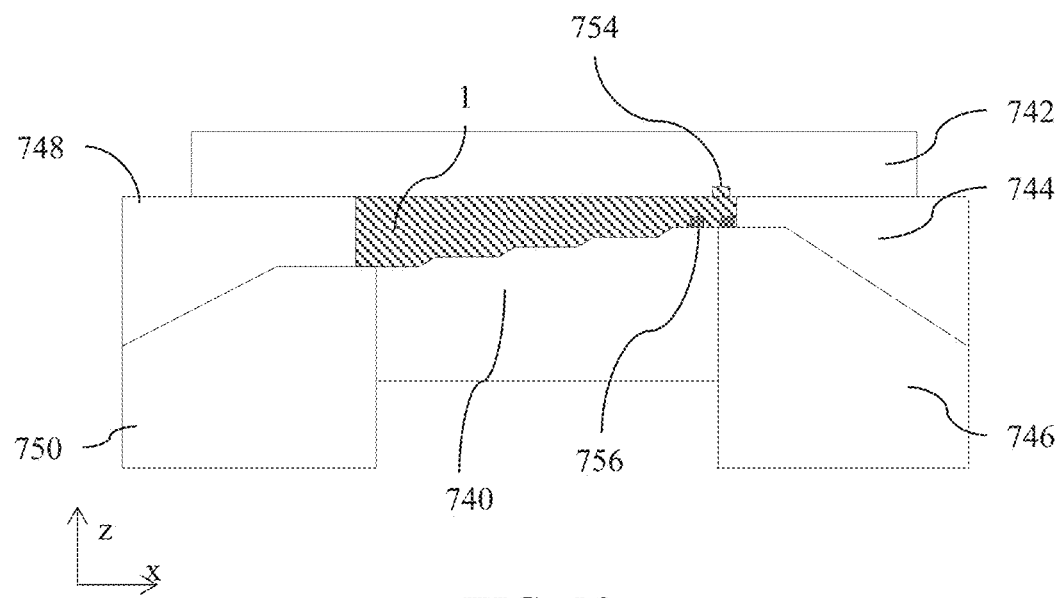
Figure 51:
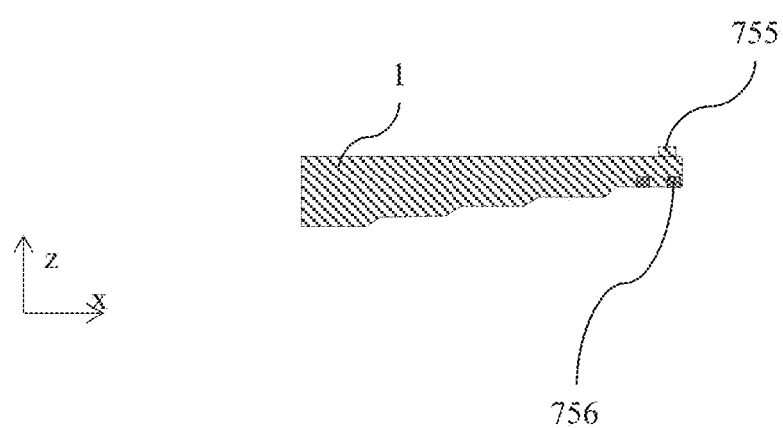
FIG. 51 is a schematic diagram illustrating a side view of a directional waveguide comprising moulded features from the mould inserts of FIGS. 48-50, in accordance with the present disclosure.

FIG. 47 is a schematic diagram illustrating a side view of a directional waveguide comprising printed identification features 754. FIGS. 48-50 are schematic diagrams illustrating side views of a moulding method for a directional waveguide comprising mould inserts 756. FIG. 51 is a schematic diagram illustrating a side view of a directional waveguide comprising moulded features from the mould inserts of FIGS. 48-50.

Advantageously features such as identification and absorptive features may be incorporated in the moulding process, reducing cost and complexity.

Damage to the surfaces of the waveguide 1 may result in light leakage for light that has not been reflected from the reflective end 4, reflected or refracted by the extraction features 12 and passes through the first guiding surface 6. Such damage may appear as white spots for example in Privacy mode of operation for off axis viewing positions. Damage to the peaks of the rear reflector may appear as dark or white spots.

Figure 52A:
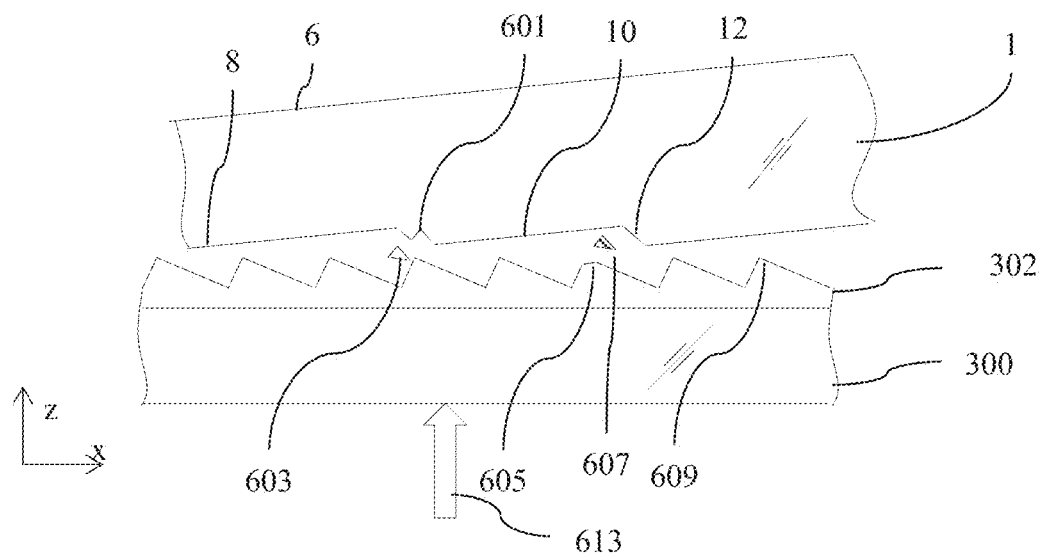
FIG. 52A is a schematic diagram illustrating a side view of a display apparatus comprising a rear reflector for a directional waveguide with damage artefacts, in accordance with the present disclosure.

FIG. 52A is a schematic diagram illustrating a side view of a display apparatus comprising a rear reflector 302 for a directional waveguide 1 with damage artefacts. Rear reflector 302 may comprise a metallized surface relief structure that may have further hard protection coating replied. The surface relief structure may comprise a cured acrylate polymer material for example. It would be desirable to maximize the efficiency of the rear reflector 302 by reducing the size of peaks 609. Smaller peaks 609 however provides increased pressure between the contact points of the rear reflector 302 and waveguide 1.

Waveguide 1 that may be a relatively soft material such as PMMA or polycarbonate for example. Pencil hardness of rear reflector 302 surface may be greater than 2H for example 4H, while pencil hardness of waveguide 1 may be less than 2H for example HB.

Force 613 may be applied to the substrate 300 of the rear reflector, providing direct contact between the two surfaces. Sharp peaks 609 in contact with waveguide 1 may form digs 601 in the material of the waveguide 1 and may form debris 603. Further peaks 609 may be damaged to form damage regions 605 and debris 607. Debris 603 and 607 may be deposited on surfaces of waveguide 1 and rear reflector 302.

Figure 52B:
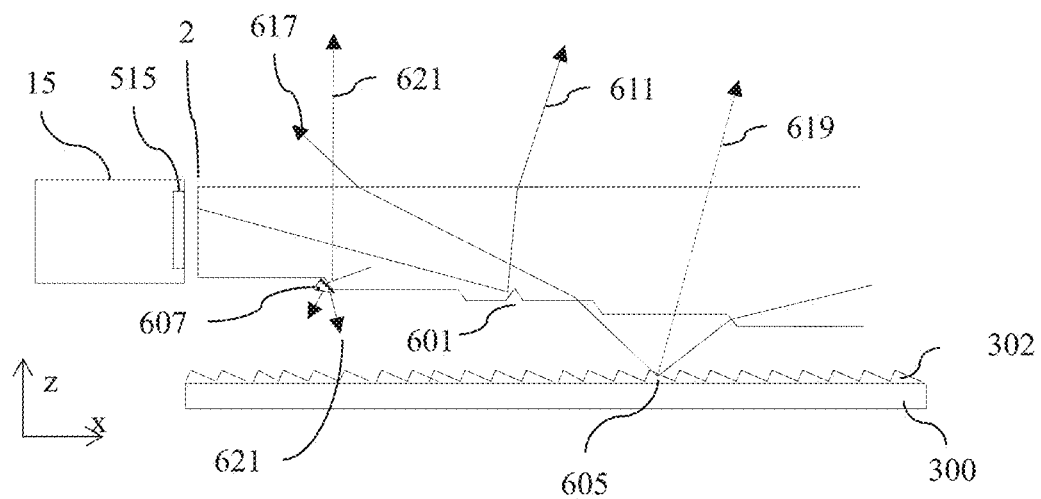
FIG. 52B is a schematic diagram illustrating a side view of a display apparatus comprising a rear reflector for a directional waveguide illustrating light propagation due to damage artefacts, in accordance with the present disclosure.
Figure 52C:
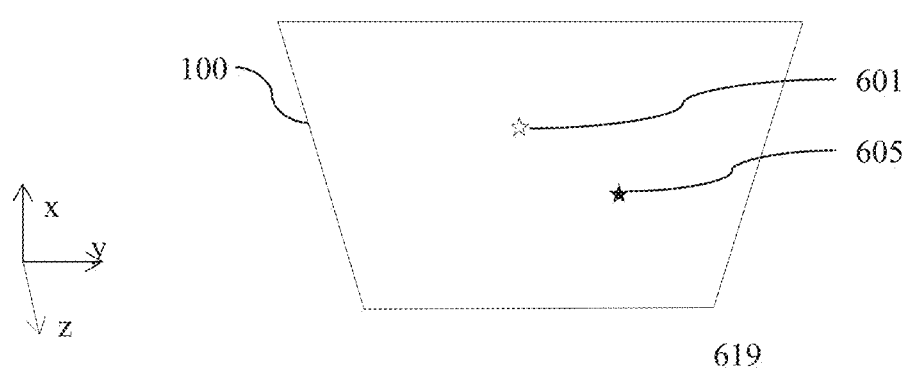
FIG. 52C is a schematic diagram illustrating a perspective look down view of a display apparatus comprising a rear reflector for a directional waveguide illustrating light propagation due to damage artefacts, in accordance with the present disclosure.

FIG. 52B is a schematic diagram illustrating a side view of a display apparatus comprising a rear reflector for a directional waveguide illustrating light propagation due to damage artefacts and FIG. 52C is a schematic diagram illustrating a perspective look down view of a display apparatus comprising a rear reflector for a directional waveguide illustrating light propagation due to damage artefacts.

In operation light rays 611 may be provided for dig 601. Thus for light propagating from the input end 2 towards the reflective end 4 light may be undesirably extracted, forming a bright spot 601 in the output image as illustrated in FIG. 52C. Further, damage regions 605 on the rear reflector 302 may provide rays 617, when rays 619 may be expected, so that black spot is provided in the output image. Debris 607 may introduce rays 617 providing white spots in some directions and preventing reflected rays 621 or reflections from the rear reflector, providing dark spots.

It would be desirable to reduce the number and size of damage features due to contact between the rear reflector 302 surface and the waveguide 1.

It would further be desirable to reduce Moiré artefacts between the repetitive extraction features 12 of the waveguide 1 and the facets of the rear reflector 302.

Figure 53A:
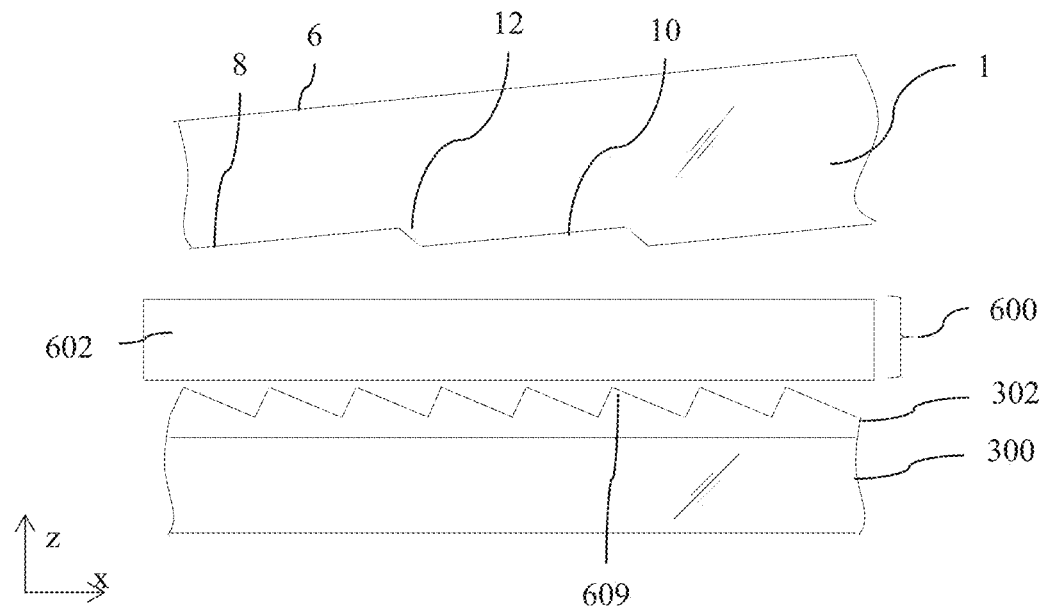
FIG. 53A, FIG. 53B, and FIG. 53C are schematic diagrams illustrating side views of a display apparatus comprising a rear reflector for a directional waveguide, further comprising an intermediate layer arranged between the waveguide and rear reflector, in accordance with the present disclosure.
Figure 53B:
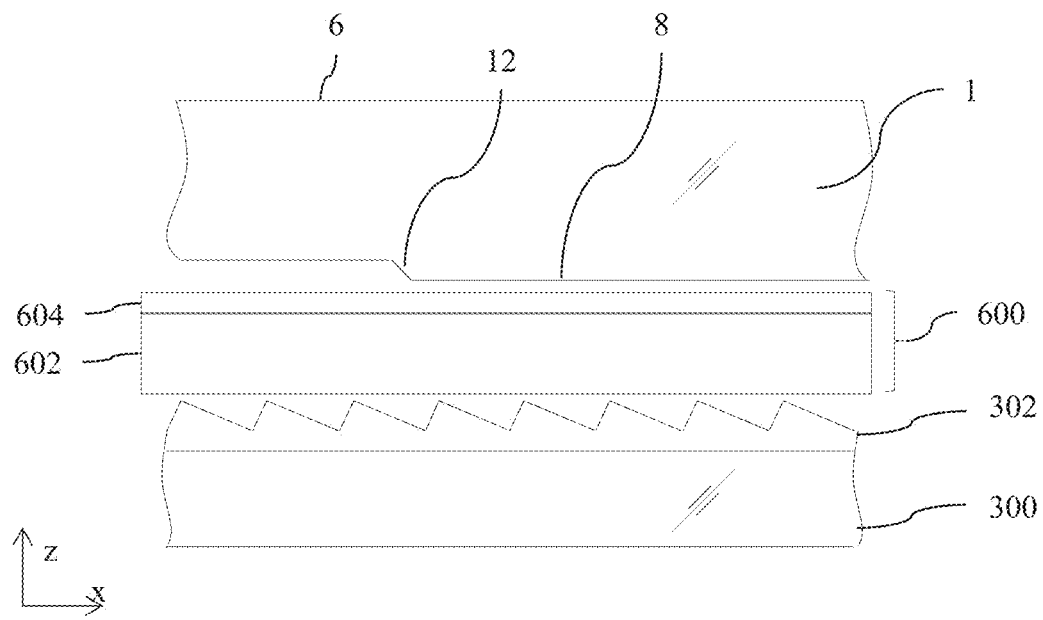
Figure 53C:
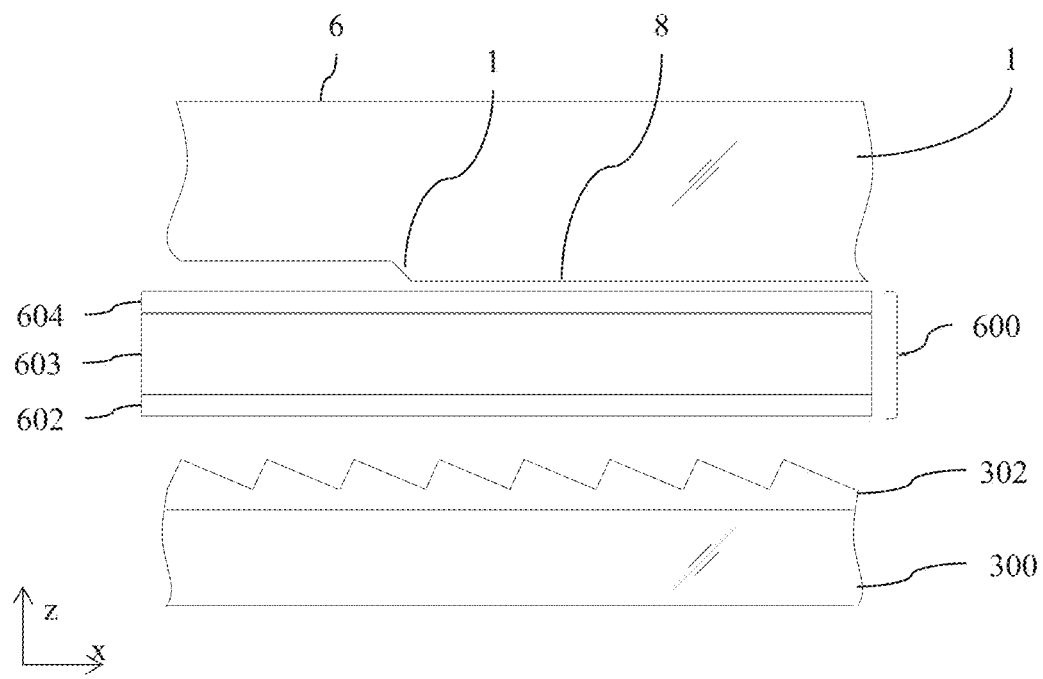

FIGS. 53A-C are schematic diagrams illustrating a side view of a display apparatus comprising a rear reflector for a directional waveguide, further comprising an intermediate layer 600 arranged between the waveguide 1 and rear reflector 302.

A directional backlight may comprise a waveguide 1 comprising first and second, opposed guide surfaces 6,8 for guiding light along the waveguide 1, an input surface 2 extending between the first and second guide surfaces 6,8 for receiving input light, and a reflective end 4 for reflecting input light from the light sources back along the waveguide 1. An array 15 of light sources is arranged at different input positions along the input surface of the waveguide 1 and arranged to input the input light into the waveguide 1. The first guide surface 6 is arranged to guide light by total internal reflection and the second guide surface 8 has a stepped shape comprising a plurality of extraction facets 12 oriented to reflect input light from the light sources 15, after reflection from the reflective end 4, through the first guide surface 6 as output light, and intermediate regions 10 between the facets 12 that are arranged to guide light along the waveguide 1, the waveguide 1 being arranged to image the light sources so that the output light is directed into respective optical windows 26 (not shown) in output directions that are distributed laterally in dependence on the input positions of the light sources. Further a rear reflector 302 comprising a linear array of reflective facets arranged to reflect light from the light sources, that is transmitted through the plurality of facets 12 of the waveguide 1, back through the waveguide 1 to exit through the first guide surface 6; and a transmissive sheet 600 arranged between the rear reflector and the second guide surface of the waveguide 1.

Transmissive sheet 600 may for example comprise a single planar layer 602 with for example similar hardness to rear reflector 302. Sheet 600 may be a glass sheet for example, or may be a polymer layer. Sheet 600 may be provided with an internal diffuser effect, for example by scattering particles.

Advantageously the pressure from peaks 609 may be reduced, thus providing reduced increase resistance to damage of the waveguide 1 and rear reflector 302. Further the separation of extraction features 12 from peaks 609 of the rear reflector 302 may be increased, reducing Moiré beating between the two structures.

FIG. 53B illustrates an additional layer 604 may be arranged on the upper surface of the layer 602. Thus the transmissive sheet 600 comprises plural layers 602, 603, 604. The additional layer 604 may achieve reduced damage to the waveguide 1 and/or may comprise a diffuser function for example that may reduce the visibility of Moiré. The plural layers of the transmissive sheet 600 include a front protective layer 604 adjacent the waveguide 1, the front protective layer 604 being made of a material that provides less damage to the waveguide 1 than the material of any other layer of the plural layers.

Advantageously damage to the waveguide 1 may be reduced.

As shown in FIG. 53C an additional layer 604 may be arranged on the lower surface of the layer 602. The plural layers of the transmissive sheet 600 may include a rear protective layer 602 adjacent the rear reflector 302, the rear protective layer 602 being made of a material that provides less damage to the rear reflector than the material of any other layer of the plural layers.

The plural layers of the transmissive sheet 600 may include a reinforcing layer 603 made of a material having a higher stiffness than the material than any other layer of the plural layers. Advantageously optical aberrations due to distortions of the transmissive sheet 600 may be reduced.

The reinforcing layer may have a thickness arranged to provide reduced Moiré beating between the waveguide 1 and rear reflector 302.

It may be desirable to reduce the damage from the peaks of a rear reflector 302 to the surface of waveguide 1 during relative movement of the two elements.

Figure 54:
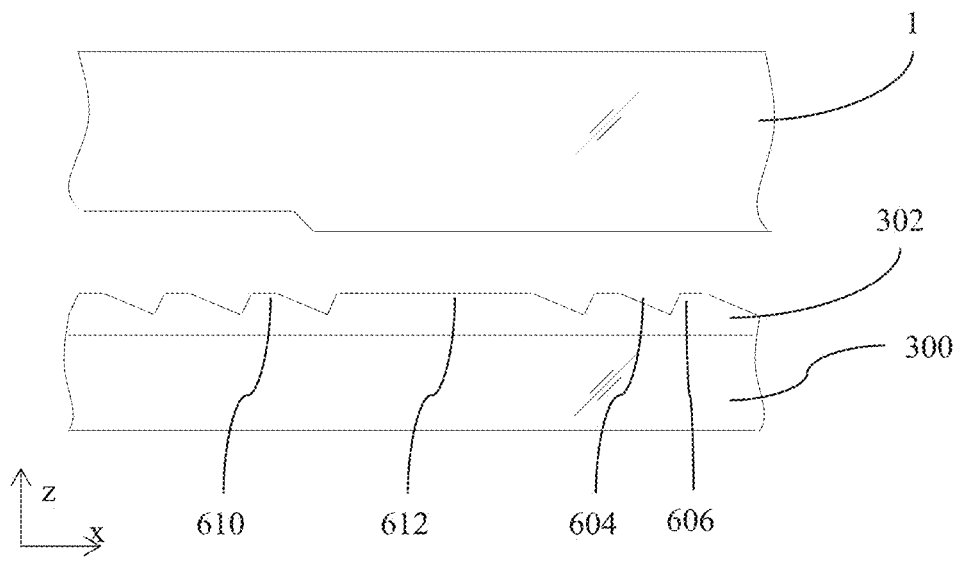
FIG. 54 is a schematic diagram illustrating a side view of a display apparatus comprising a rear reflector for a directional waveguide, wherein the rear reflector further comprises substantially coplanar flat regions, in accordance with the present disclosure.

FIG. 54 is a schematic diagram illustrating a side view of a display apparatus comprising a rear reflector for a directional waveguide, wherein the rear reflector further comprises substantially coplanar flat regions 610. Such regions 610, 612 may be arranged between reflective facets 604, 606 in order to reduce the pressure of peaks of the rear reflector 300 onto the waveguide 1.

Advantageously robustness of the assembled device can be improved.

It may be desirable to provide efficient coupling of light from the array 15 of light sources into the waveguide 1. In conventional non-directional waveguides a scattering adhesive element may be used to attach the waveguide to a substrate provided with an array of LEDs across the whole width of the light source array.

By way of comparison in directional waveguides such adhesive may increase hotspot visibility and may result in increased cross talk for some of the light sources in the array of light source. Thus although some light sources may be provided with adhesive strips as described elsewhere herein, other light sources in the array may desirably be provided with no adhesive strip between light source and array. It is desirable to provide high coupling efficiency between light sources and waveguides without the use of adhesives.

It would be further desirable to minimize the visibility of hotspots due to misalignment of the array 15 light sources and input end 2 of the waveguide 1. It would be further desirable to provide a thermal path from an array 15 of light sources to a frame to provide reduced junction temperature during operation.

Figure 55:
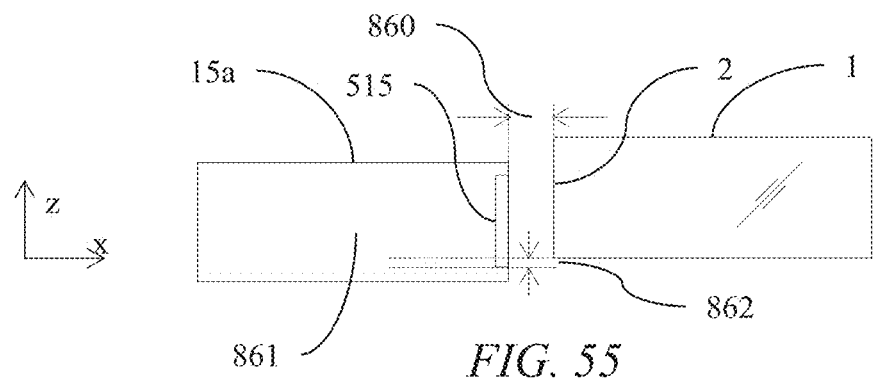
FIG. 55 is a schematic diagram illustrating a side view of misalignment of an LED with a valve input side, in accordance with the present disclosure.

FIG. 55 is a schematic diagram illustrating a side view of misalignment of a light source 15a comprising an LED package 861 with light emitting region 515 with a waveguide 1 input side 2. Longitudinal misalignment 860 and lateral misalignment 862 may provide efficiency loss as illustrated in FIG. 56 which is a schematic graph illustrating relative coupling efficiency 864 of light into a waveguide 1 corresponding longitudinal misalignment 860.

Figure 56:
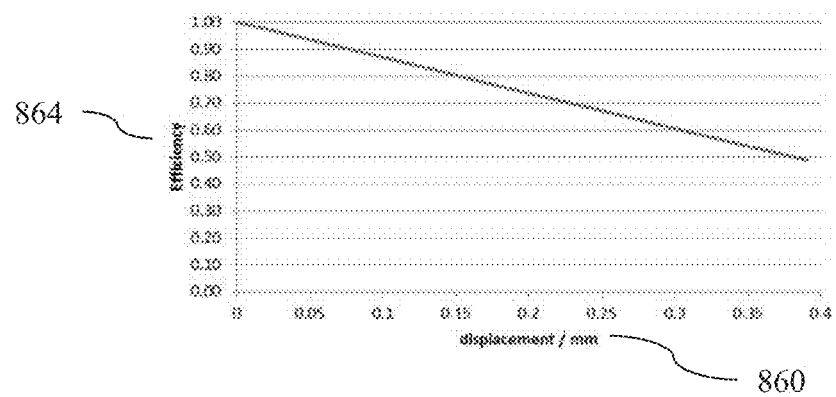
FIG. 56 is a schematic graph illustrating relative coupling efficiency of light into a waveguide corresponding horizontal misalignment, in accordance with the present disclosure.

In the illustrative embodiment of FIG. 56 a waveguide 1 with height 0.55 mm is aligned to an LED with height of the emitting aperture 515 of 0.45 mm and Lambertian emission profile. Light that is not incident on the input side 2 is assumed to be lost. A zero misalignment 862 is assumed (i.e. the LED is aligned in the z direction) and the misalignment 860 is adjusted. Desirably a coupling efficiency of greater than 95% is desirable providing a maximum desirable longitudinal displacement of approximately 40 microns. To achieve such alignment over the entire width of the array 15 may increase cost and complexity of the lightbar alignment system and impact waveguide yield, increasing cost.

It may be desirable to increase coupling efficiency at reduced cost.

Figure 57:
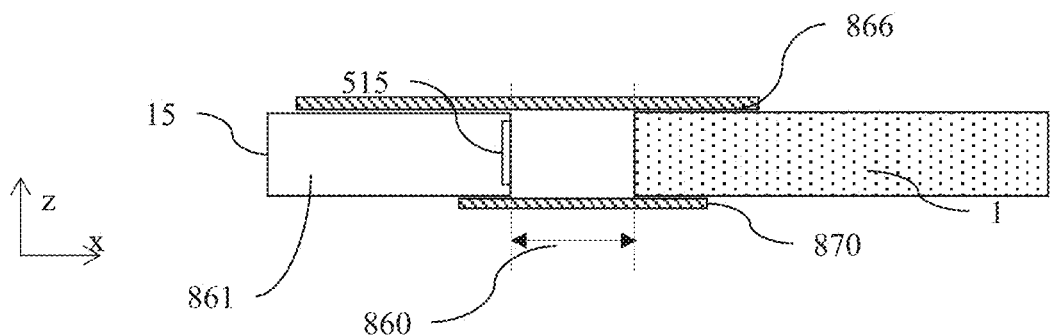
FIG. 57 is a schematic diagram illustrating a side view of misalignment of an LED with a valve input side comprising additional reflective elements, in accordance with the present disclosure.
Figure 58:
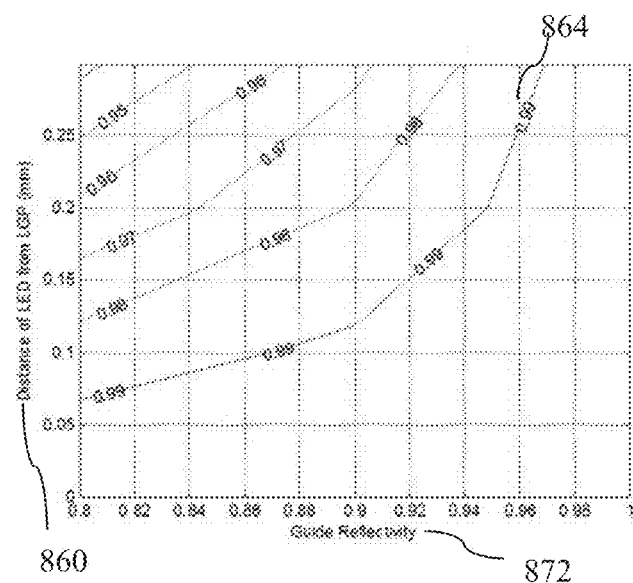
FIG. 58 is a schematic graph illustrating relative coupling efficiency of light into a waveguide further comprising additional reflective elements corresponding to vertical and horizontal misalignments, in accordance with the present disclosure.

FIG. 57 is a schematic diagram illustrating a side view of misalignment of an LED with a valve input side comprising additional reflective elements 866, 870. Reflective elements may be provided by reflective films, or may be coatings on support means. FIG. 58 is a schematic graph illustrating relative coupling efficiency 864 of light into a waveguide 1 further comprising additional reflective elements 866, 870 with reflectivity 872 and longitudinal misalignment 860. In comparison to FIG. 56, coupling efficiency may be improved. However, insertion of reflective elements 866, 870 may be complex and costly.

It may be desirable to provide increased coupling efficiency in a directional backlight in light sources that are desirably not wholly aligned by attachment to adhesive strips or other adhesive elements.

Figure 59A:
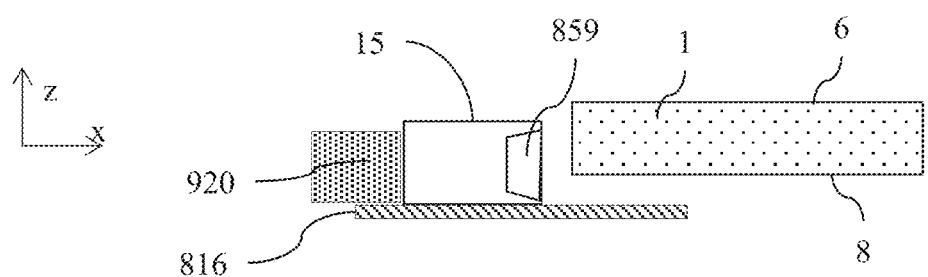
FIG. 59A is a schematic diagram illustrating side view of alignment of an LED array 15 with a waveguide 1 in a first step, in accordance with the present disclosure.

FIG. 59A is a schematic diagram illustrating side view of alignment of an LED array 15 with a waveguide 1 in a first step. A directional backlight may comprise a waveguide 1 comprising first and second, opposed guide surfaces 6, 8 for guiding light along the waveguide 1 and an input end 2 comprising an input surface extending between the first and second guide surfaces 6,8; an array of light sources 15a-n arranged at different input positions along the input end 2 of the waveguide 1 and arranged to input input light into the waveguide 1, the light sources 15a-n having light emitting regions that are spaced apart. The waveguide may further comprise a reflective end 4 for reflecting input light from the light sources back along the waveguide 1, the second guide surface 8 being arranged to deflect the reflected input light through the first guide surface 6 as output light, and the waveguide 1 being arranged to image the light sources 15a-n so that the output light from the light sources 15a-n is directed into respective optical windows 26 in output directions that are distributed laterally in dependence on the input positions of the light sources.

Figure 59B:
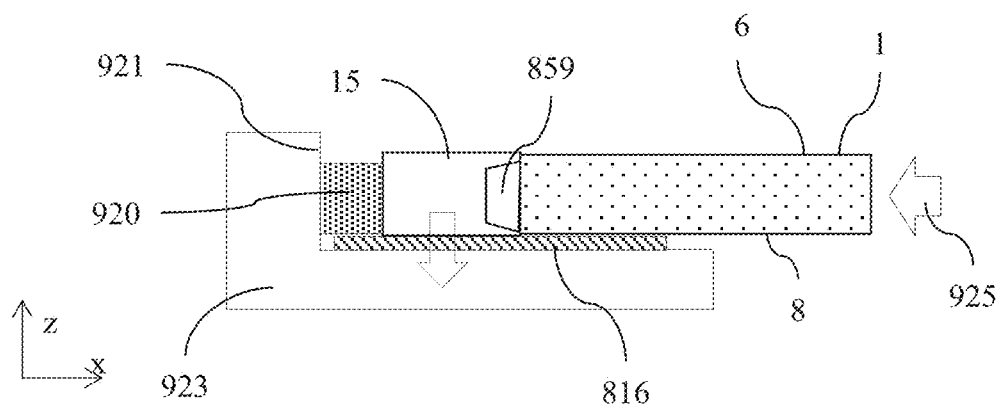
FIG. 59B is a schematic diagram illustrating side view of alignment of an LED array 15 with a waveguide 1 in a second step, in accordance with the present disclosure.

FIG. 59B is a schematic diagram illustrating a side view of alignment of an LED array 15 with a waveguide 1 in a second step.

A holder portion 923 may be provided extending across the light sources 15a-n and the waveguide 1, the holder portion 923 holding the light sources 15a-n and the waveguide 1 in position relative to each other. Further a resilient member 920 may be provided behind the light sources 15a-n and resiliently biasing the light sources 15a-n towards the input end 2 of the waveguide 1. The directional backlight may thus further comprise a stop 921 extending from the holder portion 923 behind the resilient member 920, the resilient member 920 engaging the stop 921. The stop 921 may be an integral part of the holder portion 923 as illustrated for example in FIG. 60A.

During assembly a force 925 may be applied to contact the waveguide 1 to the light source array 15 across the lateral direction, with the resilient member providing a resistant force that may vary across the array of light sources.

The support 816 may be a printed circuit, the printed circuit may be a flexible printed circuit. Thus the support 816 may be provided by a flexible printed circuit to which the light sources are soldered.

The resilient member 920 may for example be a sponge material that may be attached to the support 816 and may extend beyond behind the support 816.

Advantageously, each light source of the array of light sources may be aligned with respect to the input to the waveguide 1 and coupling efficiency improved. An adhesive may not be inserted between the waveguide 1 and support 816, that may reduce light losses in comparison to arrangements using adhesives.

Figure 60A:
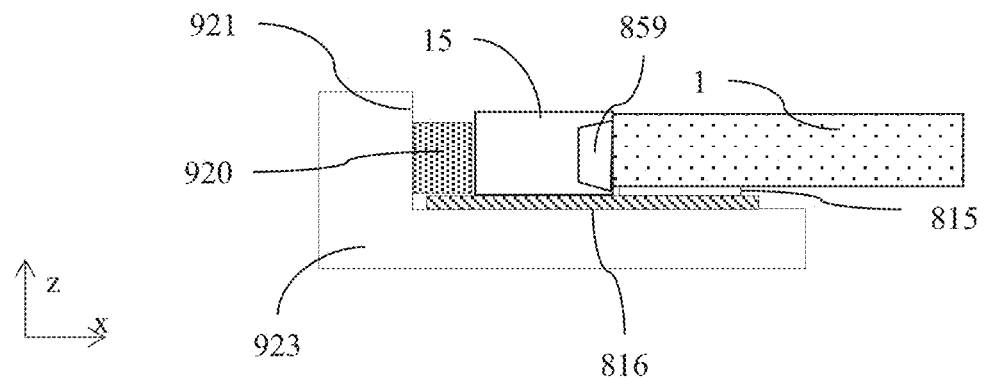
FIG. 60A and FIG. 60B are schematic diagrams illustrating side views of alignment of an illumination assembly with a mechanical support that is a stop further comprising an adhesive strip, in accordance with the present disclosure.
Figure 60B:
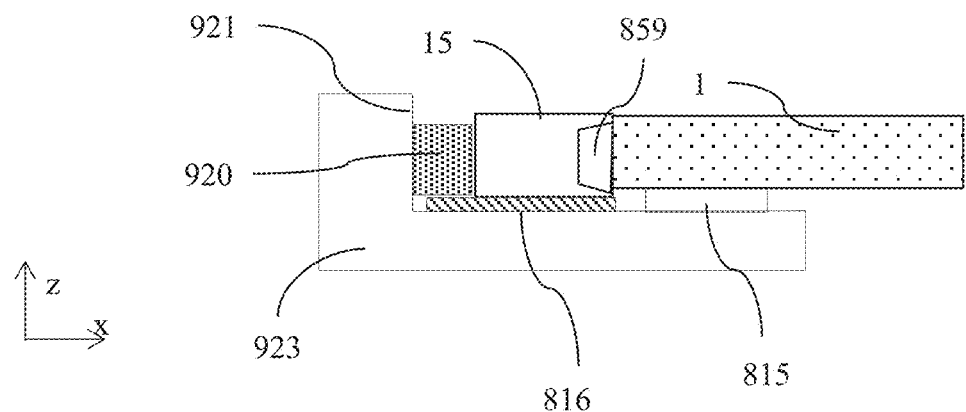

FIGS. 60A-B are schematic diagrams illustrating side views of alignment of an illumination assembly with a mechanical support further comprising adhesive layers.

A support 923 may be provided which supports the array of light sources, the support being attached to the holder portion 530. The stop 921 may be an integral part of the support 923 as illustrated in FIG. 60B for example.

The support 816 may have a portion extending past the input end 2 of the waveguide 1 across the first guide surface 6 or second guide surface 8 of the waveguide 1, and the directional backlight may further comprise at least one strip 815 adhered to at least one of the first guide surface and the second guide surface of the waveguide and extending therealong adjacent to the input surface 2, the strip 815 being arranged for holding the waveguide 1 in position relative to the light sources 15 supported on the support 816, the light-absorptive adhesive strip 815 extending along the second guide surface 8 of waveguide 1 adjacent to the input end 2.

Figure 61A:
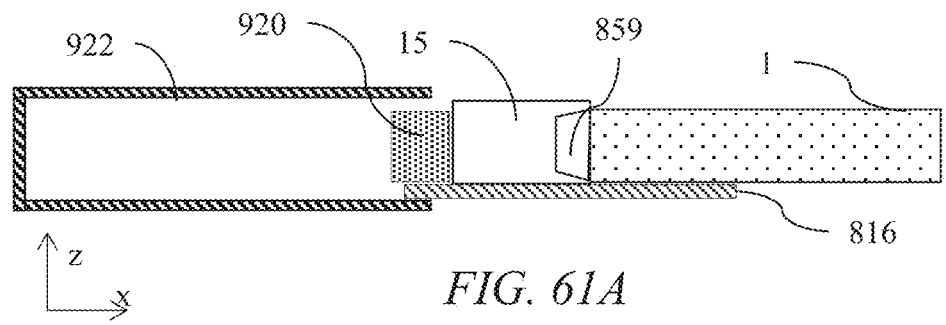
FIG. 61A and FIG. 61B are schematic diagrams illustrating a side view of alignment of an illumination assembly with a slotted mechanical support, in accordance with the present disclosure.
Figure 61B:
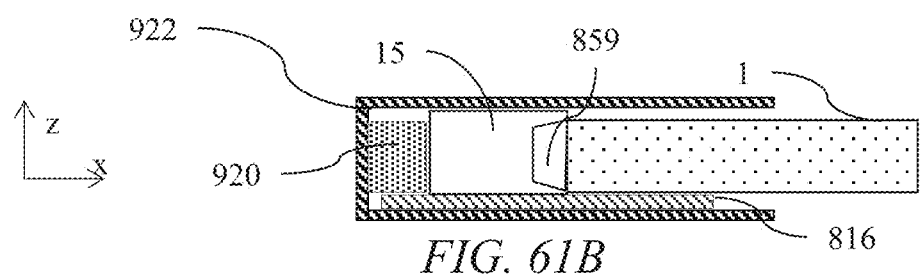

FIGS. 61A-B are schematic diagrams illustrating a side view of alignment of an illumination assembly with a slotted mechanical support. FIG. 61A illustrates that a holder portion 923 may be provided as a slotted frame 922 and arranged to receive the light source array 15, support 816 and waveguide 1. FIG. 61B illustrates that the rear of the slotted frame 922 may act as a stop for the resilient member.

Advantageously the slotted frame 922 may conveniently provide a support for assembly of the directional backlight into a frame for a directional display.

It may be desirable to provide alignment of the waveguide 1 and light source array 15 in the normal direction (z-direction).

Figure 62A:
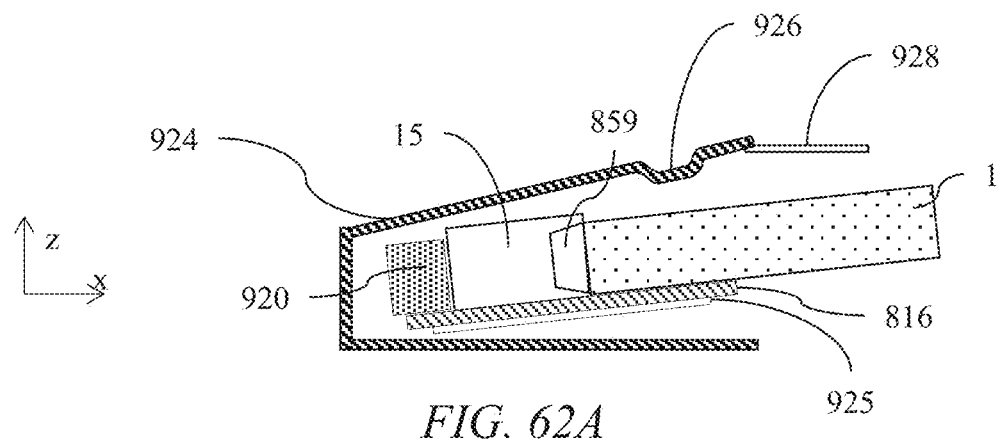
FIG. 62A and FIG. 62B are schematic diagrams illustrating a side view of alignment of an illumination assembly with a sprung mechanical support, in accordance with the present disclosure.
Figure 62B:
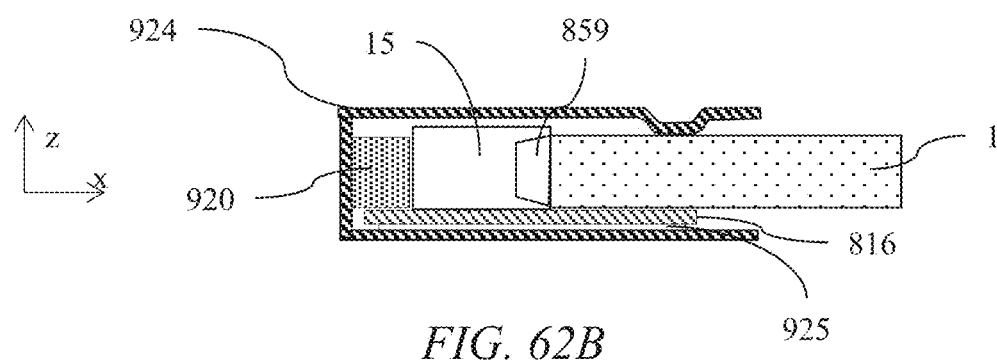

FIGS. 62A-B are schematic diagrams illustrating a side view of alignment of an illumination assembly with a sprung mechanical support. Adhesive layer 925 such as an adhesive tape may be provided to attach the support 816 to a frame 924 that may be sprung. Recessed feature 926 may be provided to apply a vertical force to the waveguide 1 against the support 816 such that alignment is achieved in the normal (z-axis) direction. Advantageously coupling efficiency may be increased.

It would be advantageous to reduce possible damage to the waveguide 1 during assembly.

Figure 63A:
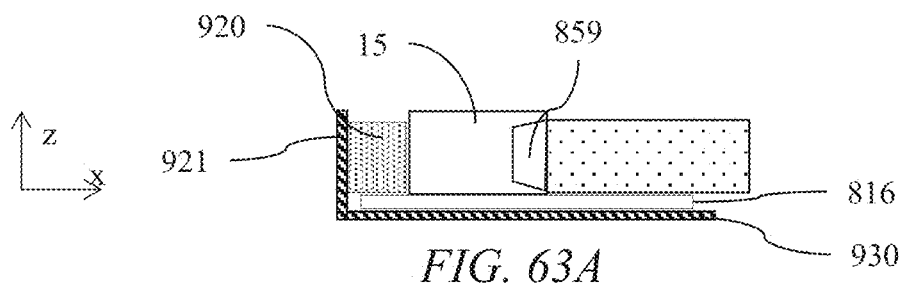
FIG. 63A, FIG. 63B, and FIG. 63C are schematic diagrams illustrating a side view of alignment of an illumination assembly with a clipped mechanical support, in accordance with the present disclosure.
Figure 63B:
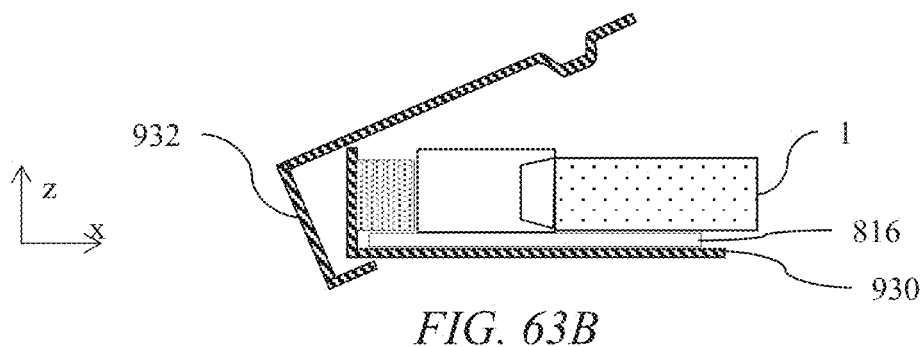
Figure 63C:
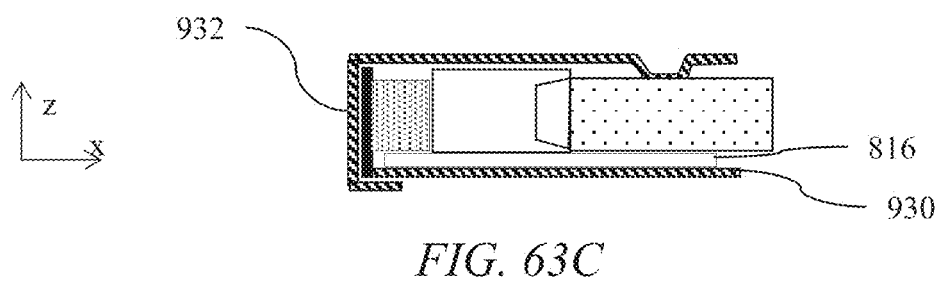

FIGS. 63A-C are schematic diagrams illustrating a side view of alignment of an illumination assembly with a clipped mechanical support. In a first step stop 921 of holder portion 930 may be arranged to provide longitudinal alignment of the light sources of the array 15 as described above. In a second step, clip 932 may be attached to provide clamping force in the normal (z-axis) direction.

Advantageously possible damage during assembly may be reduced.

It may be advantageous to further combine the resilient member into the frame of the directional backlight.

Figure 64A:
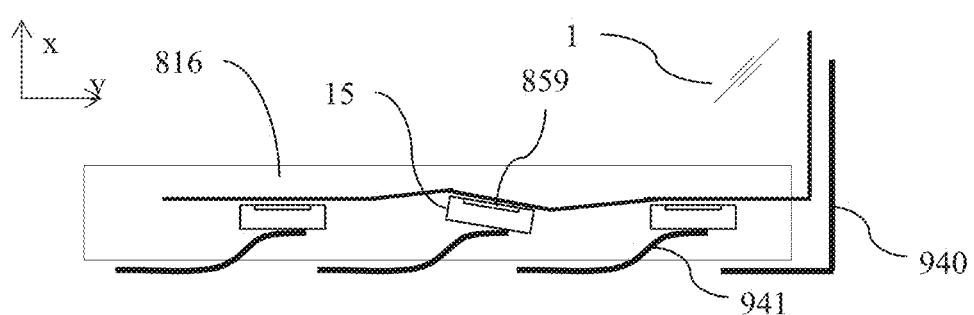
FIG. 64A and FIG. 64B are schematic diagrams illustrating top and side views respectively of alignment of an LED array with a waveguide comprising a deformable mechanical support, in accordance with the present disclosure.
Figure 64B:
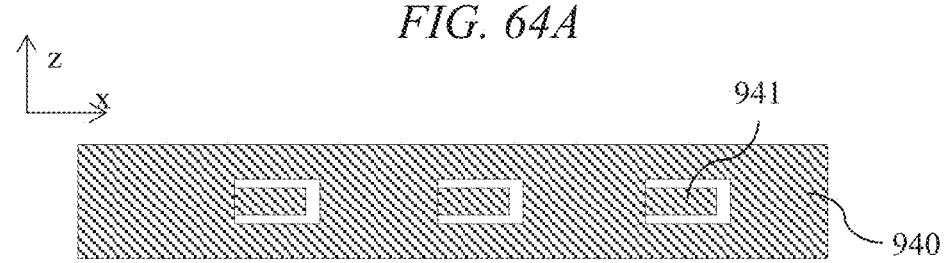

FIGS. 64A-B are schematic diagrams illustrating top and side views respectively of alignment of an LED array with a waveguide comprising a deformable mechanical support as a holder portion 923. Frame 940 may for example be formed in a bendable metal such as aluminum. Resilient member 920 may be provided by bendable lugs 941 that may be provided in the frame 940 and used to push the light sources of the array 15 against the input side 2 of the waveguide 1.

Advantageously the resilient member is incorporated in the frame 940, reducing cost and complexity.

In some arrangements side mirrors 827 may be provided on the sides 24, 26 of the waveguide 1. It may be desirable to provide mechanical alignment of the side mirrors 827 to the sides 24, 26 of the waveguide 1.

Figure 65A:
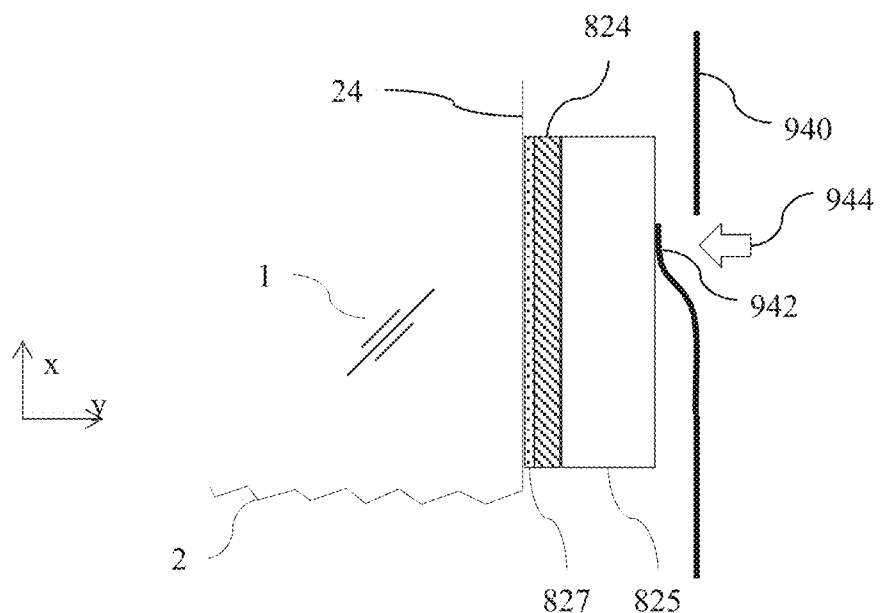
FIG. 65A and FIG. 65B are schematic diagrams illustrating top and side views respectively of alignment of side mirror with a waveguide comprising a deformable mechanical support, in accordance with the present disclosure.
Figure 65B:
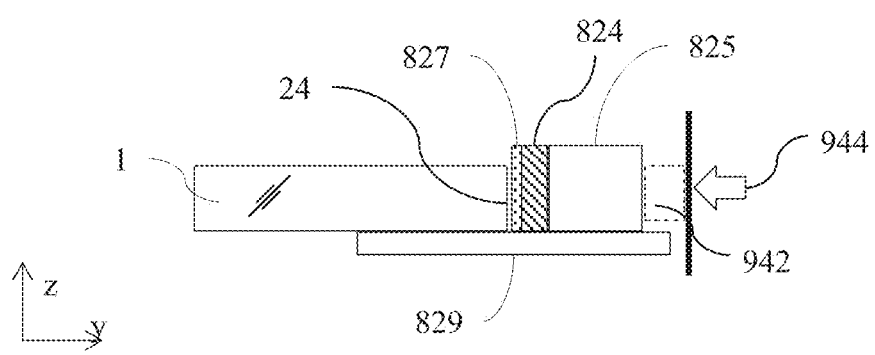

FIGS. 65A-B are schematic diagrams illustrating top and side views respectively of alignment of side mirror with a waveguide comprising a deformable mechanical support. Side mirrors 827 may comprise in addition to a reflective surface a substrate 824 and support 825. Lugs 924 in frame 940 may provide resilient member 920 to apply force 944 between the side mirror 827 and mirror.

Advantageously leakage of light at the side mirrors and coupling efficiency may be optimized.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight comprising:
   a waveguide comprising first and second, opposed guide surfaces for guiding light along the waveguide, an input surface extending between the first and second guide surfaces for receiving input light, and a reflective end for reflecting input light from the light sources back along the waveguide;

an array of light sources arranged at different input positions along the input surface of the waveguide and arranged to input the input light into the waveguide, wherein the first guide surface is arranged to guide light by total internal reflection and the second guide surface has a stepped shape comprising a plurality of extraction facets oriented to reflect input light from the light sources, after reflection from the reflective end, through the first guide surface as output light, and intermediate regions between the facets that are arranged to guide light along the waveguide, the waveguide being arranged to image the light sources so that the output light is directed into respective optical windows in output directions that are distributed laterally in dependence on the input positions of the light sources;

a rear reflector comprising a linear array of reflective facets arranged to reflect light from the light sources, that is transmitted through the plurality of facets of the waveguide, back through the waveguide to exit through the first guide surface; and a transmissive sheet arranged between the rear reflector and the second guide surface of the waveguide.

2. A directional waveguide according to claim 1, wherein the transmissive sheet comprises plural layers.

3. A directional waveguide according to claim 2, wherein the plural layers include a rear protective layer adjacent the rear reflector, the rear protective layer being made of a material that provides less damage to the rear reflector than the material of any other layer of the plural layers.

4. A directional waveguide according to claim 2, wherein the plural layers include a front protective layer adjacent the waveguide, the front protective layer being made of a material that provides less damage to the waveguide than the material of any other layer of the plural layers.

5. A directional waveguide according to claim 2, wherein the plural layers include a reinforcing layer made of a material having a higher stiffness than the material than any other layer of the plural layers.

6. A directional waveguide according to claim 1, wherein the extraction facets are laterally curved have positive optical power in a direction between sides of the waveguide that extend between the first and second guide surfaces.

7. A directional waveguide according to claim 1, wherein the reflective end has positive optical power in a direction extending between sides of the waveguide that extend between the first and second guide surfaces.

8. A directional backlight according to claim 1, wherein the input surface is an end of the waveguide opposite to the reflective end.

9. A directional backlight according to claim 1, wherein the input surface is a surface of a side of the waveguide extending away from the reflective end.

10. A directional display device comprising:
a directional backlight according to claim 1; and
a transmissive spatial light modulator arranged to receive the output light from the waveguide and to modulate it to display an image.

11. A directional display apparatus comprising:
a directional display device according to claim 10; and
a control system arranged to control the light sources.

* * * * *